(12) United States Patent
Praisner et al.

(10) Patent No.: US 7,319,986 B2
(45) Date of Patent: Jan. 15, 2008

(54) DYNAMIC PAYMENT CARDS AND RELATED MANAGEMENT SYSTEMS AND ASSOCIATED METHODS

(75) Inventors: C. Todd Praisner, Austin, TX (US); James R. Holland, IV, Driftwood, TX (US); Roy H. Kipp, Jr., Austin, TX (US); Melissa T. Balbach, Wilmette, IL (US); William R. Leiserowitz, Austin, TX (US)

(73) Assignee: Bank of America Corporation, Charlotte, NC (US)

( * ) Notice: Subject to any disclaimer, the term of this patent is extended or adjusted under 35 U.S.C. 154(b) by 1283 days.

(21) Appl. No.: 10/083,445

(22) Filed: Oct. 19, 2001

(65) Prior Publication Data

US 2002/0174030 A1 Nov. 21, 2002

Related U.S. Application Data

(63) Continuation-in-part of application No. 09/409,316, filed on Sep. 28, 1999, now abandoned, which is a continuation-in-part of application No. 09/717,728, filed on Nov. 21, 2000, now abandoned.

(60) Provisional application No. 60/276,819, filed on Mar. 16, 2001, provisional application No. 60/242,493, filed on Oct. 23, 2000.

(51) Int. Cl.
*G06Q 40/00* (2006.01)
(52) U.S. Cl. .............................. 705/39; 705/44; 705/40
(58) Field of Classification Search ................... 705/39
See application file for complete search history.

(56) References Cited

U.S. PATENT DOCUMENTS 4,799,156 A 1/1989 Shavit et al.
(Continued)

FOREIGN PATENT DOCUMENTS

EP 0 485 090 A2 10/1991
(Continued)

OTHER PUBLICATIONS

"Your Turn". San Antonia Express-News. San Antonio, Texas: Aug. 26, 1998, p. 4B. (4 pages).*

(Continued)

*Primary Examiner*—Kambiz Abdi
*Assistant Examiner*—Jennifer Liversedge
(74) *Attorney, Agent, or Firm*—Moore & Van Allen, PLLC; Steven B. Phillips

(57) ABSTRACT

Dynamic payment cards and related dynamic payment card management systems and associated methods are disclosed that allow for the efficient management of corporate purchasing needs. The dynamic payment cards can be traditional payment cards with card control settings that are dynamically managed. In addition, a dynamic card management system can automatically interface with card processor systems to dynamically modify these card control settings, and a purchasing management system or other request and approval workflow engine can provide an interface between a company and the dynamic card management system. More generally, an advantageous solution for purchasing management is disclosed that utilizes dynamically or actively managed approval parameters to help control transaction authorization determinations associated with purchasing mechanisms. These dynamic approval parameters can be generated and/or managed through the application of configurable company purchasing policies and rules, and these dynamic approval parameters can be stored, for example, by a processing system that makes authorization determinations when transactions are initiated using the purchasing mechanisms.

29 Claims, 20 Drawing Sheets

U.S. PATENT DOCUMENTS

| | | | |
|---|---|---|---|
| 4,812,628 A | 3/1989 | Boston et al. | |
| 5,177,342 A | 1/1993 | Adams | |
| 5,224,034 A | 6/1993 | Katz et al. | |
| 5,283,829 A | 2/1994 | Anderson | 380/24 |
| 5,287,267 A | 2/1994 | Jayaraman et al. | |
| 5,336,870 A | 8/1994 | Hughes et al. | 235/379 |
| 5,361,199 A | 11/1994 | Shoquist et al. | |
| 5,383,113 A | 1/1995 | Kight et al. | 364/401 |
| 5,420,405 A | 5/1995 | Chasek | 235/379 |
| 5,465,206 A | 11/1995 | Hilt et al. | 364/406 |
| 5,500,513 A | 3/1996 | Langhans et al. | 235/380 |
| 5,621,201 A * | 4/1997 | Langhans et al. | 235/380 |
| 5,649,116 A | 7/1997 | McCoy et al. | 395/238 |
| 5,704,046 A | 12/1997 | Hogan | 395/239 |
| 5,721,832 A | 2/1998 | Westrope et al. | 395/227 |
| 5,734,890 A | 3/1998 | Case et al. | |
| 5,740,425 A | 4/1998 | Povilus | 395/611 |
| 5,745,681 A | 4/1998 | Levine et al. | 395/200.3 |
| 5,758,327 A | 5/1998 | Gardner et al. | |
| 5,822,737 A | 10/1998 | Ogram | 705/26 |
| 5,826,242 A | 10/1998 | Montulli | 705/27 |
| 5,850,446 A | 12/1998 | Berger et al. | 380/24 |
| 5,884,288 A | 3/1999 | Chang et al. | 705/40 |
| 5,889,863 A | 3/1999 | Weber | 380/25 |
| 5,890,175 A | 3/1999 | Wong et al. | 707/505 |
| 5,898,594 A | 4/1999 | Leason et al. | 364/479.01 |
| 5,903,878 A | 5/1999 | Talati et al. | 705/26 |
| 5,905,973 A | 5/1999 | Yonezawa et al. | 705/27 |
| 5,914,472 A | 6/1999 | Foladare et al. | |
| 5,920,847 A | 7/1999 | Kolling et al. | 705/40 |
| 5,953,710 A | 9/1999 | Fleming | |
| 5,956,700 A | 9/1999 | Landry | 705/40 |
| 5,970,465 A | 10/1999 | Dietrich et al. | |
| 5,970,471 A | 10/1999 | Hill | 705/26 |
| 5,970,475 A | 10/1999 | Barnes et al. | |
| 5,991,750 A | 11/1999 | Watson | |
| 6,000,832 A | 12/1999 | Franklin et al. | |
| 6,016,504 A | 1/2000 | Arnold et al. | 709/200 |
| 6,029,890 A | 2/2000 | Austin | |
| 6,032,133 A | 2/2000 | Hilt et al. | 705/40 |
| 6,032,136 A | 2/2000 | Brake, Jr. et al. | |
| 6,038,552 A | 3/2000 | Fleischl et al. | |
| 6,052,675 A | 4/2000 | Checchio | |
| 6,072,870 A | 6/2000 | Nguyen et al. | 380/24 |
| 6,097,834 A | 8/2000 | Krouse et al. | 382/137 |
| 6,115,690 A | 9/2000 | Wong | |
| 6,134,557 A | 10/2000 | Freeman | 707/102 |
| 6,141,653 A | 10/2000 | Conklin et al. | |
| 6,154,738 A | 11/2000 | Call | 707/4 |
| 6,226,624 B1 * | 5/2001 | Watson et al. | 705/44 |
| 6,295,536 B1 | 9/2001 | Sanne | |
| 6,304,915 B1 | 10/2001 | Nguyen et al. | 709/250 |
| 6,324,525 B1 | 11/2001 | Kramer et al. | 705/40 |
| 6,327,578 B1 | 12/2001 | Linehan | 705/65 |
| 6,343,279 B1 | 1/2002 | Bissonette et al. | 705/41 |
| 6,360,211 B1 | 3/2002 | Anderson et al. | 705/40 |
| 6,363,362 B1 | 3/2002 | Burfield et al. | 705/40 |
| 6,401,131 B1 | 6/2002 | Haverstock et al. | |
| 6,408,284 B1 | 6/2002 | Hilt et al. | 705/40 |
| 6,418,441 B1 | 7/2002 | Call | 707/10 |
| 6,434,607 B1 | 8/2002 | Haverstock et al. | |
| 6,438,690 B1 | 8/2002 | Patel et al. | |
| 6,460,020 B1 | 10/2002 | Pool et al. | 705/26 |
| 6,460,072 B1 | 10/2002 | Arnold et al. | 709/203 |
| 6,488,204 B1 | 12/2002 | Morooka et al. | 235/379 |
| 6,519,571 B1 | 2/2003 | Guheen et al. | 705/14 |
| 6,601,759 B2 | 8/2003 | Fife et al. | 235/375 |
| 6,604,089 B1 | 8/2003 | Van Horn et al. | 705/26 |
| 6,604,679 B2 | 8/2003 | Morooka et al. | 235/379 |
| 6,609,106 B1 | 8/2003 | Robertson | 705/26 |
| 6,611,818 B1 | 8/2003 | Mersky et al. | 705/40 |
| 6,757,710 B2 | 6/2004 | Reed | 709/203 |
| 6,766,306 B1 | 7/2004 | Matsuyama | 705/53 |
| 6,796,497 B2 | 9/2004 | Benkert et al. | 235/380 |
| 2001/0037295 A1 | 11/2001 | Olsen | 705/40 |
| 2002/0016765 A1 | 2/2002 | Sacks | 705/39 |
| 2002/0019808 A1 | 2/2002 | Sharma | 705/40 |
| 2002/0023055 A1 | 2/2002 | Antognini et al. | 705/40 |
| 2003/0033248 A1 | 2/2003 | Shimada | 705/40 |
| 2003/0212630 A1 | 11/2003 | Kahr | 705/40 |
| 2004/0006536 A1 | 1/2004 | Kawashima et al. | 705/39 |

FOREIGN PATENT DOCUMENTS

| | | |
|---|---|---|
| EP | 1 361 532 | 11/2003 |
| EP | 1 361 533 | 11/2003 |
| GB | 2 326 011 | 12/1998 |
| WO | WO98/39743 | 9/1998 |
| WO | 98/58339 | 12/1998 |
| WO | 01/77938 | 10/2001 |

OTHER PUBLICATIONS

PR Newswire. Industry Momentum Builds for SOCKS v5 Protocol. New York: May 5, 1998. (5 pages).*

International Search Report dated Aug. 27, 2002.

"Electronic Payment Unparalleled Solutions"; 5 pgs.; 2001 Metavante Corporation. Formerly M&I Data Services (Apr. 2001).

* cited by examiner

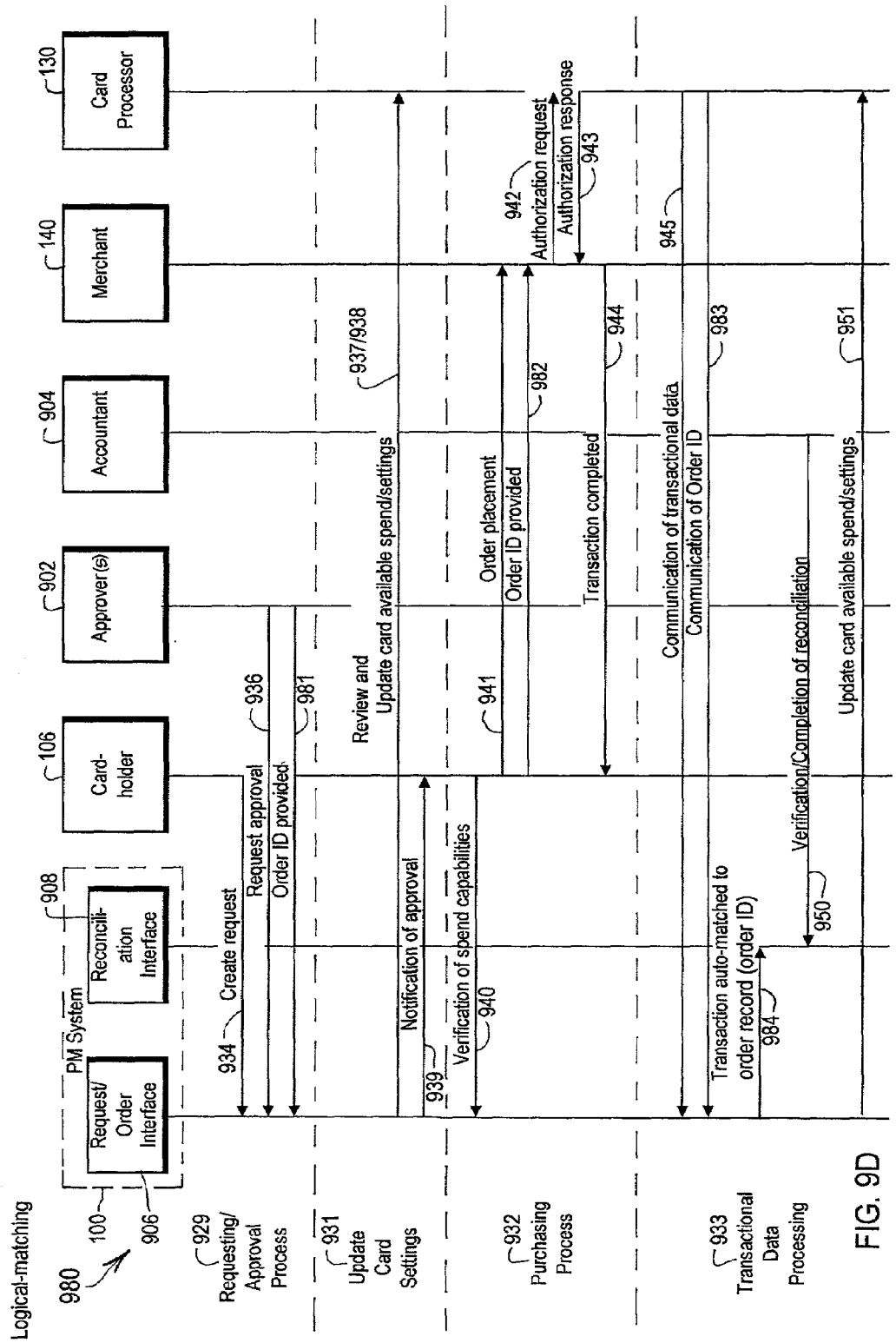

DYNAMIC PAYMENT CARDS AND RELATED MANAGEMENT SYSTEMS AND ASSOCIATED METHODS

RELATED APPLICATIONS

The present application is a continuation-in-part application of the following applications: application Ser. No. 09/409,316 that is entitled "Method and System for Online Business Purchasing," which was filed on Sep. 28, 1999 now abandoned; and application Ser. No. 09/717,728 that is entitled "System and Method for Purchasing Management Utilizing Dynamic Payment Cards and Dynamic Approval Parameters," which was filed Nov. 21, 2000, now abandoned the entire text and all contents for both of which are hereby expressly incorporated by reference in their entirety. The present application also claims priority to the following co-pending United States provisional patent applications: Provisional Application Ser. No. 60/242,493 that is entitled "System and Method for Purchasing Management Utilizing Dynamic Payment Cards and Dynamic Approval Parameters," which was filed on Oct. 23, 2000; and Provisional Application Ser. No. 60/276,819 that is entitled "Payment Card Management Architecture and Associated Methods," which was filed on Mar. 16, 2001, the entire text and all contents for both of which are hereby expressly incorporated by reference in their entirety.

TECHNICAL FIELD OF THE INVENTION

This invention relates to purchasing management systems for product and service procurement and relates to purchasing mechanisms, including payment cards such as credit cards, commercial cards, corporate cards, fleet cards, smart cards, stored value cards, procurement cards and purchasing (or "P") cards, and related processing infrastructures for these purchasing mechanisms.

BACKGROUND

Most companies have a wide variety of purchasing needs. Corporate purchasing, however, is often difficult to manage and control efficiently. For example, purchases that are made as company or organizational expenses, such as purchases of office products, office supplies, services, and marketing materials, are often handled through purchase request and approval processes with associated payment procedures. These procedures, however, are typically inefficient. In addition to purchase request and approval processes, reimbursement procedures are also used for corporate expenditures. For example, individual travel and entertainment expenditures are often handled through reimbursement procedures where employees must first pay for the expenditure and then seek reimbursement. Reimbursement procedures, however, are typically inefficient and are often undesirable to employees who must make the expenditure with their own funds and then hope that they are doing so within approved guidelines so that they will be reimbursed.

Because of inefficient procedures typically utilized, purchasing management often generates significant costs for most companies. This purchasing management is made even more difficult and complex due to a wide variety of sales channels or markets from which most companies purchase products and services. These sales channels include, for example, catalog sales, in-store sales, telephone sales, on-line sales (retail websites, public marketplaces/exchanges, private marketplaces/exchanges, etc.) and various other available sales channels. Regardless of the product or service being purchased or the sales channel or market from where the product and service is being purchased, it is desirable for companies to have the ability to manage the purchasing of those products and services through one common purchasing and approval process.

Typical purchasing management solutions have been business-to-business electronic commerce applications that automate product procurement. These systems, however, are often simple Web-based solutions (e.g., web sites maintained by office supply retailers) that do not provide the buyer with the capability of managing its procurement process across multiple suppliers or, alternatively, are large, enterprise-based solutions that require deployment of specialized programs at each client (e.g., computer workstation). While the latter applications often provide a Web-based interface via the Internet, they are undesirable because client-side software must often be deployed, maintained and frequently upgraded. These customized systems are also quite costly and require the creation and management of an "instance" of the software application for every deployment of the application. As a consequence, these enterprise-type application systems have not been implemented on a widespread basis and are not practical for most companies' purchasing management. Thus, there remains a need to provide new techniques for managing the purchasing process that overcome these and other problems and deficiencies of the prior art.

With respect to how companies make purchases, banks and financial institutions offer a variety of payment mechanisms, including payment cards such as credit cards, stored value cards, commercial cards, corporate cards, fleet cards, procurement cards, purchasing or "P" cards, and smart cards. These traditional offerings, however, are all of limited usefulness as a tool for purchasing management. Credit and debit cards can be set up as company cards, where the company or its accounts are responsible for purchases, or as individual cards, where the employee or the employee's accounts are responsible for purchases. Companies are typically very reluctant to issue company credit or debit cards, thereby giving employees the ability to create company debt or expend company funds without pre-approval. If employee accounts are used, the transaction is treated as a reimbursement transaction.

Stored value cards are essentially pre-paid credit cards with predetermined spending or credit limits. These stored value cards have been marketed to consumer markets, for example, as a mechanism to allow parents to control the spending of their children while providing the ease of credit card purchases. Smart cards are cards that include integrated circuits. The increased memory and processing power of smart cards have been advertised as potentially allowing banks and financial institutions to provide increased utility, functionality and convenience to users. A big downside to smart cards, however, is that smart cards will likely require a new infrastructure to be adopted and put in place by merchants before any newly developed features may be utilized.

Purchasing card programs are payment mechanisms offered by banks and financial institutions that are more specifically directed to help company payment needs. Purchasing cards or "P" cards are essentially company credit cards with a few additional control features that allow companies to pre-approve cards using a few static limitations, such as pre-approved vendors, pre-approved transaction amount limits, and pre-approved overall credit limits.

Once set up, these purchasing cards essentially act as credit cards with pre-determined static limitations. Thus, although purchasing cards allow more control than do typical credit cards, the company still has no control over specific purchases initiated by employees because the card limitations are static and spending requirements have all been pre-approved for a given card. In short, purchases may be completed without ever being reviewed or approved in light of company purchasing policies. Purchasing cards, therefore, fall short of providing a desirable purchasing management solution.

Purchasing card programs are effectively distributed credit card programs. Purchasing cards generally feature company billing, as opposed to the individual billing of a corporate card, and specific company constraints at both the master account and individual card levels. Based on traditional card processing capabilities, the types of constraint and approval parameters that can be statically configured by the bank for purchasing cards include the following example control features as shown in TABLE 1.

TABLE 1

Example Control Features for Traditional Purchasing Cards

| Parameter | Description |
| --- | --- |
| Credit limits | Overall card limits. |
| Velocity | Velocity is an availability control for throttling spending. Velocity is described in dollars and numbers of transactions and can be specified by time period or aggregated over the life of the card. Velocity controls authorizations. |
| Slots | A typical purchasing card has nine "slots" (MCC Groups) for unique configuration. Slot applicability is governed by SICs (Standard Industrial Codes) or MCCs (Merchant Category Codes). Velocity settings can be made at the slot level as well as at the card level. |
| PoS IDs | Preferred merchants (by point-of-sale terminal IDs) are applied to individual slots and are incremental constraints to the SIC or MCC codes which determine slot applicability. |
| Amount | Maximum transaction amount. |

Changing these parameters has traditionally required an authorized company representative or employee to determine what changes need to be made, to contact the bank and to request that the change be made. This manual intervention and subsequent action by bank employees or other individuals must be accomplished every time a change is desired to the control features of any given card. Not surprisingly, most companies find it easier to use a different form of payment than to change the constraints every time an exception occurs. Consequently, increasing control over the spending decreases the amount of company spending that is done with a card and decreases the associated processing efficiencies promised by the card program. This contradiction also limits the bank's growth opportunity on multiple fronts, including lost interchange revenue every time an exception occurs (the spend goes outside the card network), and lost customers due to a participating company's either limiting card use, a potential customer not implementing a card program, or a company with an established card program terminating the program. In short, these static constraints decrease the general utility of the purchasing card and thereby decrease the associated licensing and interchange revenue captured by the issuing bank.

SUMMARY OF THE INVENTION

The present invention provides dynamic payment cards and related dynamic payment card management systems and associated methods that allow for the efficient management of corporate purchasing needs. According to the present invention, the dynamic payment cards can be traditional payment cards with card control settings that are dynamically managed. In addition, a dynamic card management system can automatically interface with card processor systems to dynamically modify these card control settings, and a purchasing management system or other request and approval workflow engine can provide an interface between a company and the dynamic card management system. More generally, the present invention achieves an advantageous solution for purchasing management by utilizing dynamically or actively managed approval parameters to help control transaction authorization determinations associated with purchasing mechanisms. These dynamic approval parameters can be generated and/or managed through the application of configurable company purchasing policies and rules, and these dynamic approval parameters can be stored, for example, by a processing system that makes authorization determinations when transactions are initiated using the purchasing mechanisms.

In one embodiment, the present invention is a method for dynamically managing payment card control settings, including receiving a purchase request from a requestor within an entity, processing the purchase request with respect to purchase policies for the entity, approving the purchase request if the purchase policies are satisfied, reviewing control settings for a payment card associated with the approved purchase request, and adjusting the control settings for the payment card so that the payment card may be used to make a purchase associated with the approved purchase request. In addition, the purchase policies can be configurable through a network interface that provides a plurality of customizable purchasing management rules that reside on one or more server systems, and the customizable purchasing management rules can include an ability to configure organization structures and approval chains. Further, the method can include notifying an approver of a purchase request, if some action is required from the approver for the purchase request to be approved, and allowing the approver to take the required action through a network accessible approval mechanism. This network may include the Internet. Still further, the method may include associating a payment card with an element within the entity, which can be for example the requester, another person, a vehicle or a building. In addition, the received purchase request may include an identification of the payment card.

In more detailed respects, the method may include a card processor that stores the payment card control settings. The method may further include generating a set of approval parameters for the approved purchase request and comparing the approval parameters with the control settings to determine what adjustments to make so that the purchase may be made with the payment card. In addition, the control settings may correspond to the approval parameters. The method may also include the card processor acting to compare parameters of an attempted purchase transaction with the control settings and to authorize the purchase transaction if the parameters are allowed by the control settings, and a vendor may communicate the parameters of the attempted purchase transaction to the card processor for authorization. Still further, the reviewing step of the method may include a purchasing management system sending a request to the card processor for information representing the control settings for the payment card and the card processor sending back to the purchasing management system the requested card control setting information. And the adjusting step may include the purchasing management system sending to the card processor desired adjustments to the card control settings and the card processor modifying the stored card settings based upon the desired adjustments.

In further detailed respects, the method may include at least one intermediate system that processes communications between the purchasing management system and the card processor. This intermediate system or systems may include a secure proxy system that receives transmissions from the purchasing management system and sends them to the card processor in a format recognized by the card processor, that receives transmissions from the card processor and sends them to the purchasing management system in a formal, recognized by the purchasing management system, and that provides at least one security mechanism for communications with the purchasing management system and the card processor. The intermediate system(s) may also include an interface system that provides a communication interface for the card processor, the secure proxy system communicating with the card processor through the interface system.

In a further embodiment, the present invention is a method for operating a server-based system to provide dynamic management of payment mechanisms including receiving at one or more server systems a request from within an entity to make available certain purchasing capabilities with respect to a payment mechanism, communicating from the one or more server systems to a processing system to obtain information representing approval parameters associated with the payment mechanism, and sending from the one or more server systems to the processing system adjustment instructions to adjust the approval parameters for the payment mechanism so that the purchasing capabilities are available, wherein the processing system is a system that processes transactions initiated using the payment mechanism based upon approval parameters associated with the payment mechanism and stored by the processing system. In addition, the request can include an approved purchase request related to one or more desired transactions that is generated by receiving a purchase request from a requestor within the entity, processing the purchase request with respect to purchase policies for the entity, and approving the purchase request if the purchase policies are satisfied, and generating the request based upon the purchase request. Still further, the one or more server systems may receive transaction data associated with a transaction once completed using the payment mechanism and reconciling the transaction data with the purchase request.

In more detailed respects, the method may include a request that includes a request to provide pre-approved purchasing authority for the payment mechanism resulting in the approval parameters being adjusted to provide this pre-approved purchasing authority. The one or more server systems can also receive transaction data associated with a transaction once completed using the payment mechanism and can synthesize a purchase request based upon the transaction data. The synthesized purchase request can be further processed with respect to purchase policies for the entity and can be approved if the purchase policies are satisfied. Still further, the approval parameters can be adjusted to restore the pre-approved purchasing authority based upon an occurrence of one ore more selected events after completion of the transaction. In other detailed respects, a plurality of requests can be received with respect to a plurality of payment mechanisms, and a plurality of requests can be associated with each payment mechanism. The payment mechanism can include a payment card, the processing system can include a payment card processing system, the approval parameters can include control settings for the payment card, and the one or mire server systems can include a purchasing management system.

In still further detailed respects, the method can include at least one intermediate system that processes communications between the purchasing management system and the payment card processor. This intermediate system or systems may include a secure proxy system that receives transmissions from the purchasing management system and sends them to the card processing system a format recognized by the card processing system, that receives transmissions from the card processor and sends them to the purchasing management system in a format recognized by the purchasing management system, and that provides at least one security mechanism for communications with the purchasing management system and the card processor. In addition, the at least one intermediate system can further include an interface system that provides a communication interface for the card processor, the secure proxy system communicating with the card processor through the interface system. Still further, a plurality of payment cards can be associated with the plurality of elements within an entity, which can be for example persons, vehicles or buildings. Also, the control settings can include a vendor identity code and a maximum single transaction limit. The method can include the card processor comparing parameters of an attempted purchase transaction with the control settings and authorizing the purchase transaction if the parameters are allowed by the control settings. And a vendor may communicate the parameters of the attempted purchase transaction to the card processor for authorization.

In yet other detailed respects, the payment mechanism can include a dynamic payment identifier, such as a credit card number, and more particularly, the payment mechanism can be a payment card having the dynamic payment identifier associated with it. The request can include a purchase request that has been approved based upon entity purchasing policies, wherein the approval parameters can include a set of dynamic approval parameters associated with the approved purchase request, and wherein the processing system stores the set of dynamic approval parameters for the approved purchase request. In addition, the method can include receiving a plurality of purchase requests associated with a particular dynamic payment identifier and further include communicating a set of dynamic approval parameters for each purchase request from the one or more server systems to the processing system, with each set of dynamic approval parameters being stored by the processing system. Still further, the method may include the card processing system comparing parameters of an attempted purchase transaction made using the dynamic payment identifier with the sets of dynamic approval parameters stored for that dynamic payment identifier and authorizing the purchase transaction if the parameters match at least one set of dynamic approval parameters.

In another embodiment, the present invention is a system for dynamically managing payment card control settings including one or more systems configured to receive a purchase request from a requestor within an entity, to process the purchase request with respect to purchase policies for the entity, to approve the purchase request if the purchase policies are satisfied, to review control settings for a payment card associated with the approved purchase request, and to adjust the control settings for the payment card so that the payment card may be used to make a purchase associated with the approved purchase request. The one or more server systems can further include a network interface through which purchase policies may be configured by manipulating a plurality of customizable purchasing management rules that reside on the one ore more server systems, and the customizable purchasing management rules can include an ability to configure organization structures and approval chains. In addition, the server systems can be configured to notify an approver of a purchase request, if some action is required from the approver for the purchase request to be approved, and further comprising a network accessible approval mechanism through which the approver can take the required action. And this network can include the Internet. Still further, the payment card can be associated with an element within the entity, which can be for example the requester, another person, a vehicle or a building. And the received purchase request can include an identification of the payment card.

In further detailed respects, the system can include a card processor that stores the payment card control settings. And the one or more server systems can be further configured to generate a set of approval parameters for the approved purchase request and to compare the approval parameters with the control settings to determine what adjustments to make so that the purchase may be made with the payment card. In addition, the control settings can correspond to the approval parameters. The card processor can also be configured to compare parameters of an attempted purchase transaction with the control settings and to authorize the purchase transaction if the parameters are allowed by the control settings. In addition, the card processor can be configured to receive the parameters of the attempted purchase transaction from a vendor and to communicate the authorization back to the vendor if the attempted purchase transaction is approved. Still further, the purchasing management system and the card processor can be configured such that the purchasing management system sends a request to the card processor for information representing the control settings for the payment card and the card processor sends back the requested card setting information to the purchasing management system, and the purchasing management system then sends to the card processor desired adjustments to the card settings and the card processor modifies the stored card settings based upon the desired adjustments.

In additional detailed respects, the system can include at least one intermediate system processes communications between the purchasing management system and the card processor. The intermediate system or systems may include a secure proxy system that is configured to receive transmissions from the purchasing management system and to send them to the card processor in a format recognized by the card processor, to receive transmissions from the card processor and to send them to the purchasing management system in a format recognized by the purchasing management system, and to provide at least one security mechanism for communications with the purchasing management system and the card processor. In addition, intermediate system or systems can further include an interface system that provides a communication interface for the card processor with the secure proxy system communicating with the card processor through the interface system.

In a further embodiment, the present invention is a server-based system for providing dynamic management of payment mechanisms including one or more server systems configured to receive a request from within an entity to make available certain purchasing capabilities with respect to a payment mechanism; to communicate with a processing system to obtain information representing approval parameters associated with the payment mechanism that are stored and used by the processing system to process transactions initiated using the payment mechanism based upon the approval parameters associated with the payment mechanism; and to send to the processing system adjustment instructions to adjust the approval parameters for the payment mechanism so that the purchasing capabilities are available. More specifically, the request can include an approved purchase request related to one or more specific desired transactions, and the one or more server systems can be further configured to receive a purchase request from a requestor within the entity, to process the purchase request with respect to purchase policies for the entity, to approve the purchase request if the purchase policies are satisfied, and to generate the request based upon the purchase request. The one or more server systems can be further configured to receive transaction data associated with a transaction once completed using the payment mechanism and to reconcile the transaction data with the purchase request.

In more detailed respects, the server-based system can include requests that include requests to provide pre-approved purchasing authority for the payment mechanism, and the approval parameters can be adjusted to provide this pre-approved purchasing authority. Also, the one or more server systems can be further configured to receive transaction data associated with a transaction once completed using the payment mechanism and to synthesize a purchase request based upon the transaction data. The server systems can also be configured to process the synthesized purchase request with respect to purchase policies for the entity and to approve the synthesized purchase request if the purchase policies are satisfied. Still further, the server systems can be configured to send adjustment instructions to adjust the approval parameters to restore the pre-approved purchasing authority based upon an occurrence of one ore more selected events after completion of the transaction. Still further, a plurality of requests can be received with respect to a plurality of payment mechanisms, and a plurality of requests can be associated with each payment mechanism. In addition, a plurality of payment cards can be associated with the plurality of elements within an entity. The purchase policies can also be configurable through a network interface that provides a plurality of customizable purchasing management rules that reside on one or more server systems, and this network can include the Internet.

In further detailed respects, the server-based system can include a payment mechanism that includes payment cards, a processing system that includes a payment card processing system, approval parameters that include control settings for the payment card, and one or more server systems that include a purchasing management system. In addition, the server based system may include at least one intermediate system that processes communications between the purchasing management system and the payment card processor. The intermediate system or systems can include a secure proxy system configured to receive transmissions from the purchasing management system and to send them to the card processing system in a format recognized by the card processing system, to receive transmissions from the card processor and sends them to the purchasing management system in a format recognized by the purchasing management system, and to provide at least one security mechanism for communications with the purchasing management system and the card processor. In addition, the intermediate system or systems can include an interface system that provides a communication interface for the card processor with the secure proxy system communicating with the card processor through the interface system. Still further, the card processing system is further configured to compare parameters of an attempted purchase transaction with the control settings and to authorize the purchase transaction if the parameters are allowed by the control settings. In addition, a vendor can communicate the parameters of the attempted purchase transaction to the card processing system for authorization. Still further, the control settings can include a vendor identity code and a maximum single transaction limit.

In yet more detailed respects, the server-based system can include payment mechanisms that include dynamic payment identifiers, and the payment mechanisms may be payment cards that have the dynamic payment identifier is associated with them. In addition, the request received by the server system or systems can include a purchase request that has been approved based upon entity purchasing policies, wherein the approval parameters include a set of dynamic approval parameters associated with the approved purchase request, and wherein the processing system is configured to store the set of dynamic approval parameters for the approved purchase request. Also, the server systems can further be configured to receive a plurality of purchase requests associated with a particular dynamic payment identifier and to communicate a set of dynamic approval parameters for each purchase request from the one or more server systems to the processing system, with each set of dynamic approval parameters being stored by the processing system. Still further, the card processing system can be configured to compare parameters of an attempted purchase transaction made using the dynamic payment identifier with the sets of dynamic approval parameters stored for that dynamic payment identifier and to authorize the purchase transaction if the parameters match at least one set of dynamic approval parameters.

DESCRIPTION OF THE DRAWINGS

It is noted that the appended drawings illustrate only exemplary embodiments of the invention and are, therefore, not to be considered limiting of its scope, for the invention may admit to other equally effective embodiments.

FIGS. 9A, 9B, 9C and 9D are swimlane diagrams for account setup and card issuance, approval required transactions, discretionary transactions, and logical matching.

DETAILED DESCRIPTION OF THE INVENTION

Figure 1:
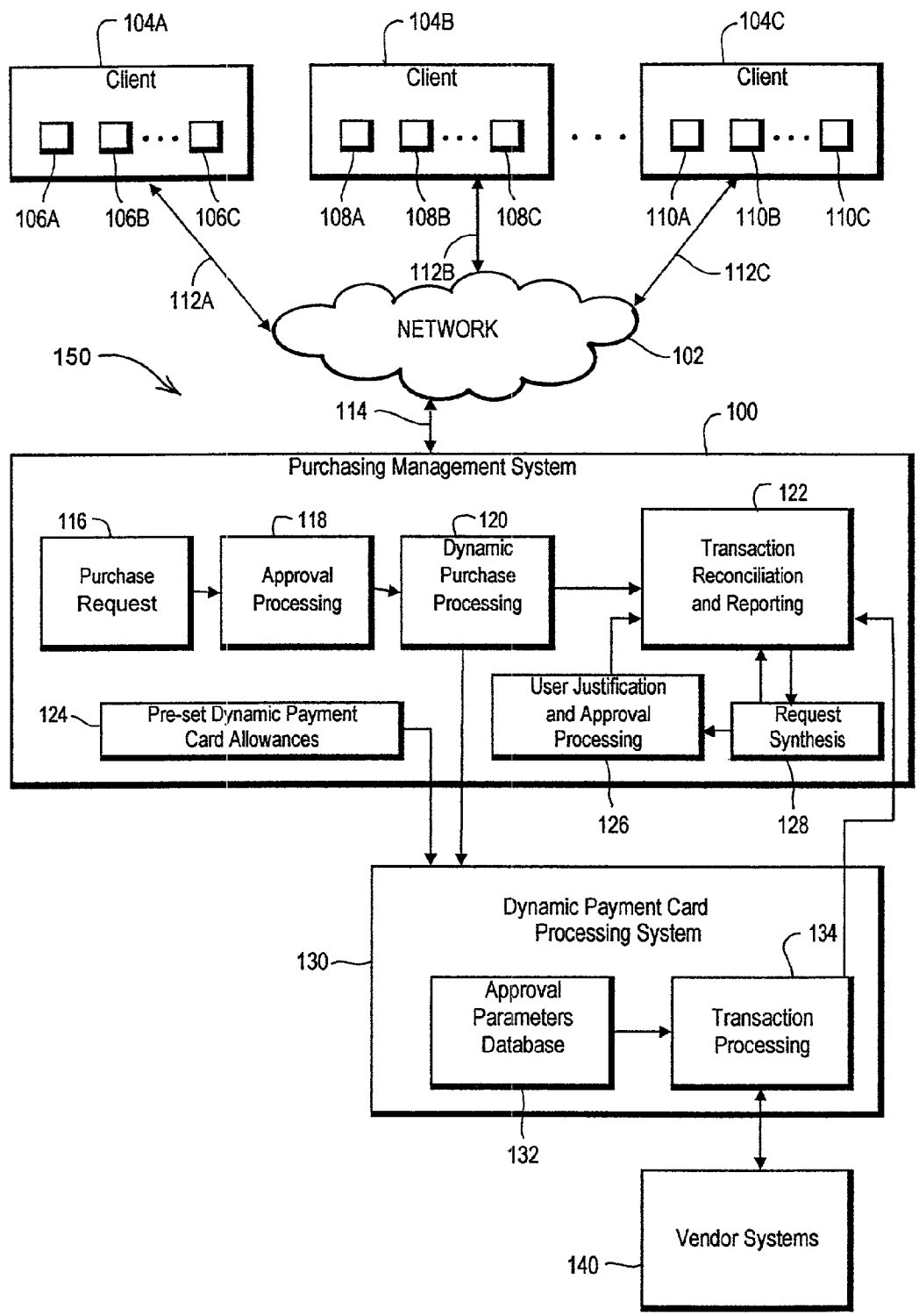
FIG. 1 is a block diagram for a purchasing management environment utilizing dynamic payment cards, according to the present invention.

The present invention provides dynamic payment cards and related dynamic payment card management systems and associated methods that allow for the efficient management of corporate purchasing needs. According to the present invention, the dynamic payment cards can be traditional payment cards with card control settings that are dynamically managed. In addition, a dynamic card management system can automatically interface with card processor systems to dynamically modify these card control settings, and a purchasing management system or other request and approval workflow engine can provide an interface between a company and the dynamic card management system. More generally, the present invention achieves an advantageous solution for purchasing management by utilizing dynamically or actively managed approval parameters to help control transaction authorization determinations associated with purchasing mechanisms. These dynamic approval parameters can be generating and/or managed based upon the application of configurable company purchasing policies and rules, and these dynamic approval parameters can be stored, for example, by a processing system that makes authorization determinations when transactions are initiated using the purchasing mechanisms.

More generally, the present invention achieves an advantageous solution for purchasing management by utilizing dynamic approval parameters, such as approval parameters that are dynamically or actively managed based upon purchasing needs, to help control transaction authorization determinations associated with purchasing mechanisms. These dynamic approval parameters can be generated and/or managed through the application of configurable company purchasing policies and rules, and these dynamic approval parameters can be stored, for example, by a processing system that makes authorization determinations when transactions are initiated using the purchasing mechanisms. Although a wide variety of purchasing mechanisms could be used, payment cards (e.g., credit cards, commercial cards, corporate cards, fleet cards, smart cards, stored value cards, procurement cards and purchasing or "P" cards) issued by banks or other card issuers are likely the purchasing mechanism to be initially adopted by companies. Traditional payment cards typically rely upon existing payment card processing infrastructures that include card processors, such as Total System Services, Inc. (TSYS) and First Data Resources (FDR), which is a division of First Data Corporation. Card processors, such as these TSYS and FDR, typically store payment card control settings and process transactions made using payment cards according to these card control settings. TABLE 1 above provides an example of such control settings. The present invention can provide and manage dynamic approval parameters through the dynamic management of these payment card control settings that are stored and utilized by traditional card processors. As applied to such existing payment card infrastructure, the present invention provides a number of significant advantages, including the dynamic management of payment card control settings, a purchasing management system that includes an interface to the card processor, and a purchasing management system that can automatically adjust the control settings based upon purchase requests or other purchasing needs entered into the system.

In addition to the dynamic management of card control settings traditionally stored by card processors, the dynamic purchasing management system provided by the present invention further contemplates approval parameters that are more robust that than these traditional control settings. For example, transaction-specific approval parameters could be stored by card processors, and these settings could also be dynamically managed by the purchasing management system. These more detailed dynamic payment approval parameters could be adopted and utilized, for example, such that sets of approval parameters are linked to individual purchase requests and associated transactions. Dynamic approval parameters for any particular purchase request can be produced, for example, after applying the company purchase policies to those purchase requests within a purchasing management system. The purchasing management system can then compare these approval parameters with the control settings stored by the card processor for the payment card to determine if the card settings need to adjusted to allow authorization of a transaction associated with the approved purchase request.

By utilizing dynamically managed payment card control settings or other dynamic approval parameters linked to purchase requests, as opposed to general, non-managed and static approval limitations available with existing purchasing card programs, the systems and methods of the present invention allow for the efficient management and control of company purchases, regardless of where the purchase is made, without sacrificing the safety of having purchase requests reviewed under standard company purchase policies. This advantageous purchase processing utilizes the dynamic payment identifiers, such as dynamic payment cards, to provide a mechanism for identifying users so that dynamic approval parameters associated with purchase requests from a user or an element (e.g. people, equipment, vehicles, buildings, or any other desired person, place or thing) within a company may be linked to particular purchases being attempted by these users.

As indicated above, traditional purchasing card programs implement a set of static rules which are not dynamically managed based upon purchasing needs and against which all transactions are evaluated. Using these static rules, transactions utilizing purchasing cards are typically evaluated and checked for suppliers that are within a company's static preset list or for static financial parameters that have been preset for that particular card. Purchasing cards have the significant disadvantage of not supporting traditionally desired purchasing process of having requests reviewed and approved before purchases occur. Purchasing cards require card program administrators to pre-approve categories of spend and card credit limits that cardholders are then free to transact against for any desired purchase. Because companies are typically responsible for payment rather than the individual cardholders, companies have no leverage to help ensure proper use of purchasing cards.

Traditional stored value cards, which hold a set amount of credit at any given time, are used either as cash equivalents for that amount of credit or for use at one or more static merchants that are defined when the card program is initiated. Generally stored value cards are used as bulk credit instruments, meaning that the credit available on a stored value card may be used in multiple transactions until it is depleted. Some stored value cards allow multiple merchants to be configured at program inception, similar to the static purchasing card configuration. Stored value cards, however, as with traditional purchasing cards, fail to provide adequate safeguards and control for efficient purchasing management.

In contrast to traditional card programs, the dynamic payment card of the present invention reflects a purchasing mechanism that is dynamically managed based upon purchasing needs. By providing a dynamic payment card platform, the current invention advantageously provides active control that is not available with traditional credit cards or other purchasing cards. In other words, the dynamic payment card purchasing of the present invention enables companies to utilize a payment card as a primary mechanism for managing spending and procurement in business operations, while still maintaining active control over those purchases. The static approval mode of traditional purchasing cards simply does not support the standard purchase approval process in most businesses, where managers review requests and then approve these specific requests for purchase. Many companies are not willing to use such traditional purchasing cards for the majority of their expenditures due to the lack of control over the actual purchasing execution. Such companies, therefore, limit the use of purchasing cards or avoid them altogether. Thus, significant amounts of company expenditures are processed through other mechanisms, such as reimbursement or check request procedures.

As described herein, the dynamic payment card platform of the current invention resolves this situation by providing significant management and approval capabilities that exceed those available with traditional purchasing card programs. Advantageously, with the present invention, review of purchase requests may occur before purchase execution, enabling the dynamic payment card to actively support standard company purchasing processes. Approval processing then allows for robust exception handling procedures and enables the use of purchase requests that trigger rules for desired approval routing. And, once approved, approval requirements for a particular purchase request may be tied or associated with a particular dynamic payment card so that card transactions may be processed within a credit card processing network, while still allowing for approval and policy control by the business. In addition, the processing mechanism for the dynamic payment card may utilize existing credit card networks, for example, the VisaNet credit card processing network and the Total System Services, Inc. (TSYS) card processing infrastructure.

Figure 2:
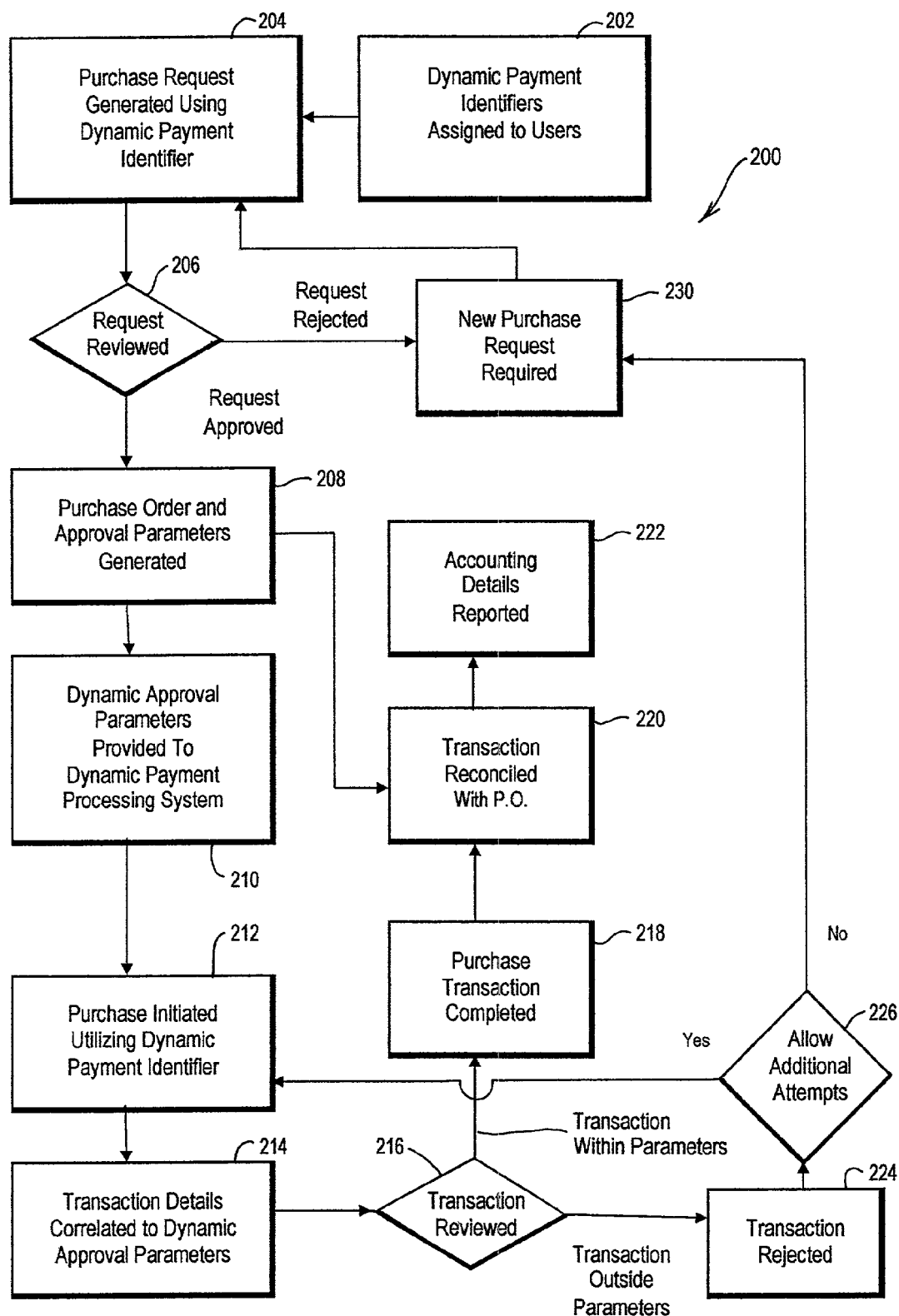
FIG. 2 is a flow diagram for purchase request processing that utilizes dynamic payment identifiers and approval parameters, according to the present invention.
Figure 3:
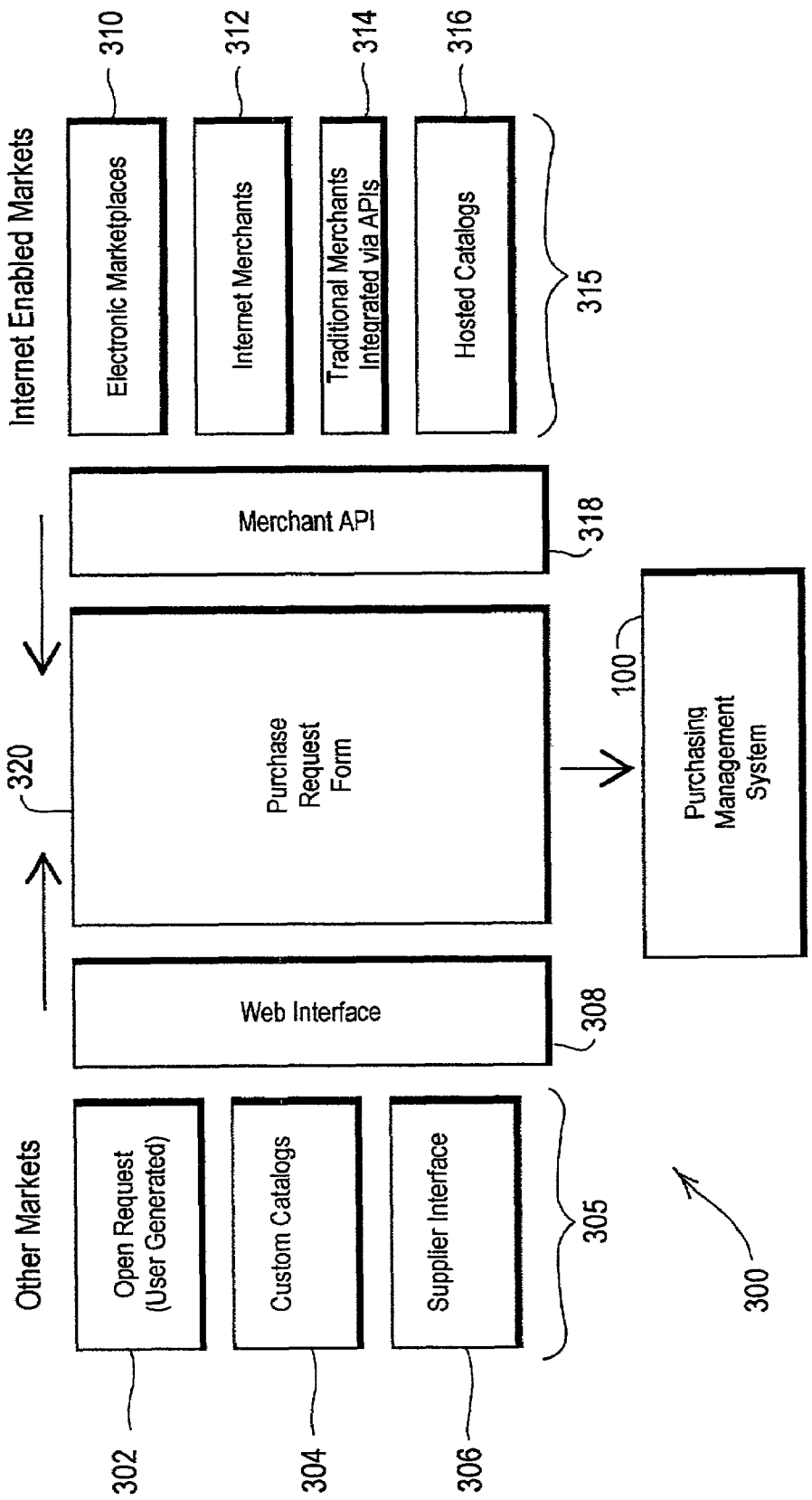
FIG. 3 is a block diagram representing various potential sources for purchase requests within a purchasing management environment, according to the present invention
Figure 4:
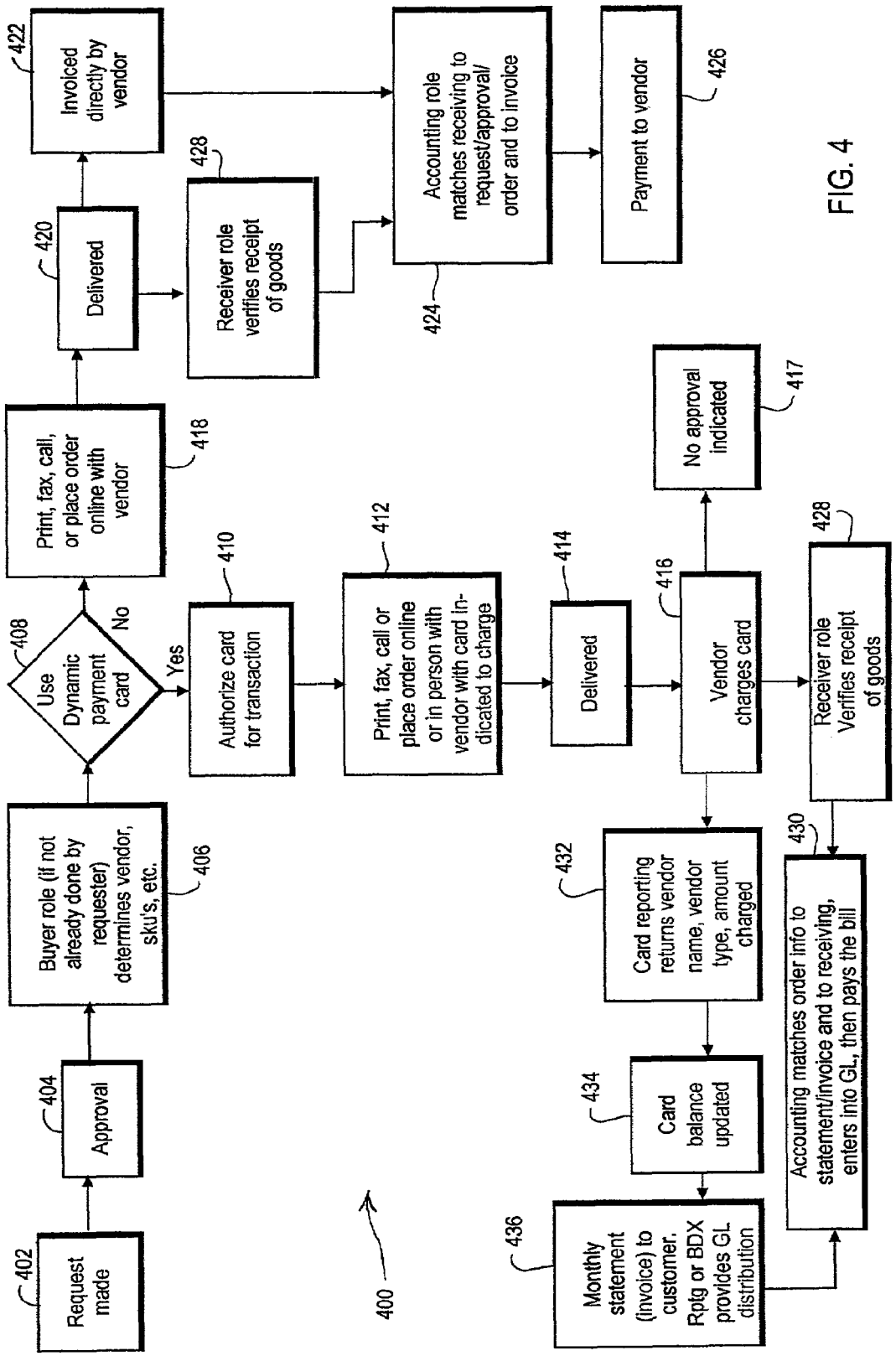
FIG. 4 is a block diagram for purchase request processing including alternative transaction paths, according to the present invention.

The present invention will now be described in further detail with respect to drawings that provide example embodiments. FIG. 1 provides an example block diagram for a dynamic payment card management system environment. FIGS. 2 and 4 provide example flow diagrams for transactions that utilize dynamic payment cards and dynamic approval parameters. FIG. 3 provides a block diagram of example sources for purchase requests that are to be processed by the purchasing management system. FIGS. 8A-D provide example block diagrams for purchasing management.

Figure 5A:
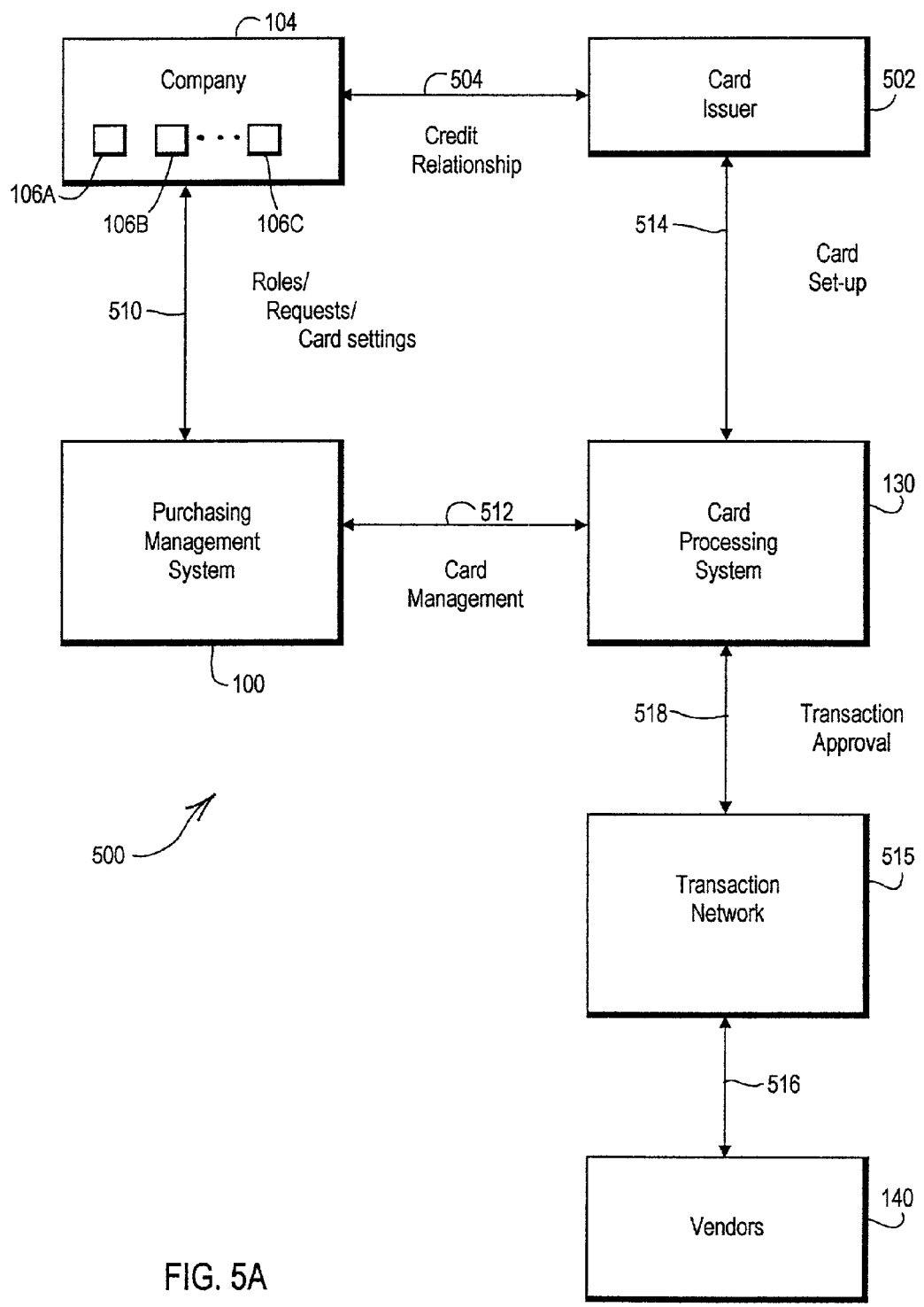
FIG. 5A is a block diagram for a dynamic purchasing card management environment, according to the present invention.
Figure 5B:
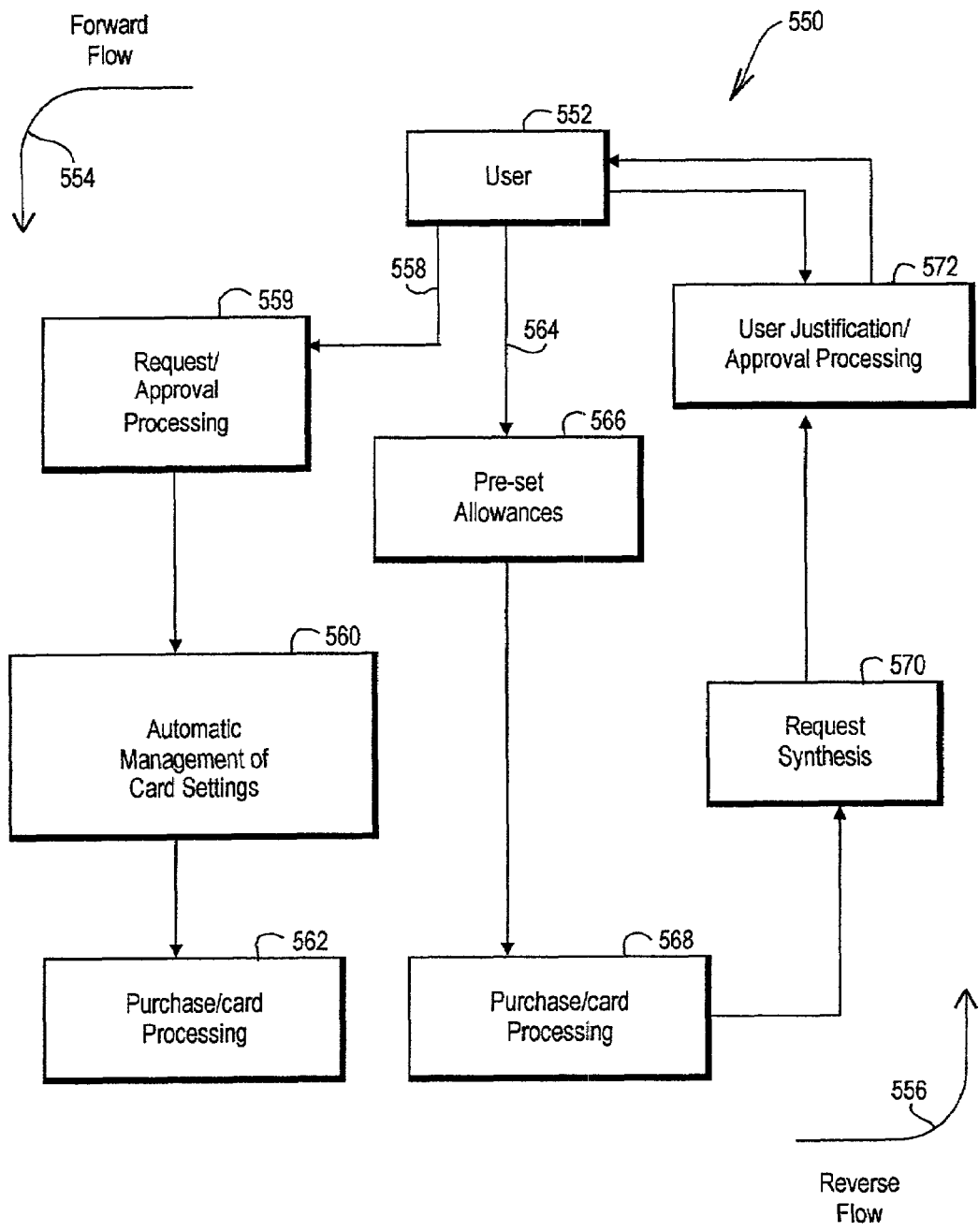
FIG. 5B is a block diagram for example forward flow approval processing and reverse flow approval processing for a purchasing card management environment, according to the present invention.

FIG. 5A provides an example block diagram for a dynamic payment card management system environment that is more specifically directed to the dynamic management of payment card control settings associated with existing infrastructures. FIG. 5B provides an example flow diagram for transactions that utilize a dynamic payment card in such an environment. FIGS. 6A-B and 7A-B provide additional flow diagrams for example transactions. FIGS. 9A-D provide swimlane diagrams that further describe example processing associated with dynamically managing traditional payment cards according to the present invention. FIGS. 10A-B provide block diagrams for secure proxy environments to facilitate secure communications for the dynamic management of card parameters among the various entities within the payment card infrastructure.

It is noted that the dynamic management of existing payment card control settings as the dynamic approval parameters is likely to be the embodiment of the present invention initially implemented because payment cards are likely the purchasing mechanism to be initially adopted by companies with respect to the present invention. Thus, after discussing FIG. 1, FIGS. 5A and 5B along with FIGS. 10A-B, FIGS. 9A-D and FIGS. 8A-D will be discussed. These drawings are more specifically directed to an implementation of the present invention for dynamic management of existing payment card control settings. FIG. 2 and FIG. 4 will next be discussed. These drawings are directed more generally to approval parameters being applied based upon purchase requests. FIG. 3 is then discussed. Finally, a series of example company transactions are provided along with a discussion of FIGS. 6A-B and FIGS. 7A-B.

Referring now to FIG. 1, block diagram is depicted for a purchasing management environment 150 utilizing a dynamic payment card processing system 130 to facilitate purchasing management, according to the present invention. As depicted, the purchasing management environment 150 includes purchasing management system 100, dynamic payment card processing system 130, vendor systems 140, and clients 104A, 104B . . . 104C. The clients 104A, 104B . . . 104C and the purchasing management system 100 may communicate with each other through network 102, which may be, for example, the Internet. Clients 104A, 104B . . . 104C and the purchasing management system 100 may be connected to the network 102 through connections 112A, 112B . . . 112C and 114, respectively. These connections may be any of a variety of mechanisms for connecting computer systems to networks, including wireless connections, network hubs, routers, Internet service providers (ISPs), portal computers, or any other device or system providing connectivity, as would be understood by one of skill in the art. The network 102 is represented by a cloud shape to indicate that network 102 may be any network medium ultimately allowing communication between clients and the purchasing management system.

The clients 104A, 104B . . . 104C represent companies or entities that are utilizing the purchasing management system 100. Within these companies or entities, there will be any of a variety of devices and systems that may be utilized, for example, personal computers, servers, handheld computer devices, portable computers, personal digital assistants or any other device or system that is desired to be utilized. It is noted that although FIG. 1 depicts a purchasing management system 100 that is a server-based network-accessible system, the dynamic approval parameters and payment card of the present invention may be utilized with client-based systems, server-based systems, or a combination of both. It is further noted that the purchasing management system 100 represents any desired grouping of devices and systems that work together to provide the desired purchasing management functionality.

As shown in FIG. 1, each client includes a plurality of users. For example, client 104A includes users 106A, 106B . . . 106C. Client 104B includes users 108A, 108B . . . 108C. and client 104C includes users 110A, 110B . . . 110C. These users represent the various employees that utilize the purchasing management system 100. These users can in one sense be thought of as requesters who request purchases, approvers who approve requests, and administrators who manage the purchase policies and rules. Additionally, logical organization can be accomplished through groups of elements, where groups can be organized by department, project, building, or any other desired criterion, and elements can be considered people, equipment, vehicles, buildings, or any other desired person, place or thing.

Each user may have one or more individual dynamic payment cards. In addition, dynamic payment cards may have one or more users and can be designated for use by certain groups within an organization or associated with certain buildings, equipment, vehicles, etc. Preferably, the dynamic payment cards are similar to traditional magnetic-strip credit cards and purchasing cards, which have unique numbers associated with them. These unique numbers provide a mechanism for allowing transactions initiated with the card to be identified. It is noted, however, that other dynamic payment identifiers may be utilized other than magnetic-strip cards with unique number identifiers. For example, unique numbers may be utilized, such as social security numbers. These unique numbers would then simply be transmitted along with the transaction information. Furthermore, biological or biometric identifiers could be utilized, such as fingerprints. In short, because current infrastructure is in place to process magnetic-strip credit card type mechanisms, these type mechanisms are currently preferred. However, according to the present invention, any dynamic payment identifier may be utilized that will allow purchase requests and associated approval parameters to be correlated with initiated transactions.

The purchasing management system 100 includes purchase request block 116, approval processing block 118, dynamic purchase processing block 120, and transaction reconciliation and reporting block 122. The purchase request block 116 represents subsystems within the purchasing management system 100 that allow for the generation of purchase requests by users 106A, 106B . . . 106C, 108A, 108B . . . 108C, and users 110A, 110B . . . 110C within clients 104A, 104B . . . 104C. Approval processing block 118 represents subsystems that allow for the processing of purchase request utilizing policies and rules that may be configured, selected or otherwise put in place by the clients 104A, 104B . . . 104C. The dynamic purchase processing block 120 represents subsystems that handle purchase requests utilizing dynamic payment cards. This block communicates with the dynamic payment card processing system 130 and provides purchase order information to the transaction reconciliation and reporting block 122. This block 122 represents subsystems that reconcile approved purchase requests with processed transaction information received from the dynamic payment card processing system 130 and then report transactions to clients 104A, 104B . . . 104C. This reporting may take any of a variety of forms and may be configured differently for different clients depending upon how those clients desire transactions to be reported.

The purchasing management system 100 of the present invention is preferably a network-accessible, server-based system that eliminates the requirement for companies to expend and allocate significant internal resources to client-based system management. An example of a server-based purchasing or procurement management system is described in co-pending U.S. patent application Ser. No. 09/409,316, entitled "Method and System for Online Business Purchasing," which is hereby incorporated by reference in its entirety. For managing purchases, this co-pending application discloses a variety of customizable purchasing requirements, policies and rules to allow users and/or purchasing managers a wide variety of network accessible and configurable controls for managing purchases. These customizable management features include automatic purchase approval, manual purchase approval through approval queues, automatic order placing after purchase approval, and post-purchase management features.

These policies and rules for approval processing configuration within purchasing management system 100 can be implemented as desired to cover the expected and/or unusual or unexpected purchasing approval needs of the company. For example, spending rules and policies that may be defined and configured to influence routing and/or approval requirements can include features such as cumulative spending/budget based rules, dollar value rules, spend category/expense type rules, payment type/method rules, supplier or type of supplier rules, address or change in address rules, shipping method rules, and timing of delivery requirements. The cumulative spending/budget based rules can be structured to allow a user to define and configure one or more rules where an element(s) and/or group(s) are allocated an amount of funds and logic is triggered when a dollar amount or percent of those funds are reserved from spending, already spent, or are remaining to be spent. The dollar value rules can allow a user to define and configure dollar value limits, for example, dollar value limits per unit being purchased, per line item, per purchase request, or other criteria. The spend category/expense type rules can, for example, allow a user to define and configure rules covering a wide variety of categories or expense types, including but not limited to, commodity types, services or types of services, capital goods/projects, projects, check requests, cash/cash advances, travel and entertainment, etc. The payment type/method rules can allow a user to define and configure rules related to how the purchase will be made, for example, terms, ACH (automated clearing house), automatic payment, credit card, dynamic payment card, check, cash, etc. Supplier or type of supplier rules can be based upon supplier categories. Address or change in address rules can include items such as ship to, ship from, billing, and other address related information. The shipping method and timing of delivery rules can similarly include information related to how and when products will be shipped and received. In addition, such spending rules operating on the purchasing management system may be configured to trigger manual approval, automated approval, automated approval with notification (for example, where a request is automatically approved using the spending rules logic, but one or more elements and/or groups are sent a notification of the approval which includes the reason(s) a notification of approval is being received), or any other type of trigger a reasonable user might desire. Furthermore, the spending rules utilized can be applied to groups (departments, projects, etc.) and/or elements (individuals, vehicles, cards, etc.) on a group and/or element specific basis and in any combination desired by a user. Thus, spending rules may be applied either individually or in any combination to any element(s) and/or group(s) or any combination of element(s) and/or group(s)).

The dynamic payment card processing system 130 includes approval parameters database block 132 and transaction processing block 134. The approval parameters database block 132 represents subsystems that store approval parameters that are sent from the dynamic purchase processing block 120. These approval parameters, for example, are stored and/or managed with respect to each specific purchase request and are, therefore, dynamic with respect to initiated transactions. Thus, when a user initiates a transaction, vendor systems 140 communicate with the transaction processing block 134. If the transaction falls outside of the approval parameters, the transaction processing block 134 rejects the transaction and notifies the vendor systems 140 of this rejection. If the transaction falls within the approval parameters, the transaction processing block 134 approves the transactions and notifies the vendor systems 140 of this approval. The transaction block 134 then sends transaction details to the transaction reconciliation and reporting block 122. It is noted that the dynamic payment card processing system may be similar to existing credit card transaction systems, such as the VisaNet credit card processing network, with the additional ability to dynamically store or manage a set of approval parameters per approved purchase requests. As indicated above, traditional purchasing card processing only stores a single, static set of limitations for any given purchasing card.

By storing detailed approval parameters for each requested transaction, the present invention can provide a dynamic, transaction-based pre-approval system for each transaction. In this way, each transaction using the dynamic payment card may be dynamically pre-validated by a set of approval parameters, such as merchant, transaction amount, timeframe or any other desired parameter. As disclosed herein, the dynamic payment card and approval parameters of the present invention allow for control and management of purchasing regardless of the product or service being purchased. Thus, the purchasing management system of the present invention allows for purchasing management of any given purchasing need. Upon approval of a purchase request, the server systems operating the purchasing management system can initiate a transaction through an agent of a credit card network. That transaction can authorize the approved expenditure for a specific dynamic payment card. Once the credit card network sees a customer transaction against that dynamic payment card, the purchasing management system will be notified by the agent of the credit card network that the transaction has occurred. The purchasing management system may then record the transaction details for subsequent reconciliation with the customer or user's accounting system. If, for some reason, the holder or user of the dynamic payment card does not execute the purchase transaction within specified parameters set by the customer (e.g., time, purchase price, etc.), the purchasing management system may use the same credit card network agent to rescind the transactional authorization for that particular dynamic payment card.

Blocks 124, 126 and 128 provide additional process flow paths with respect to the use of dynamic payment cards according to the present invention. Block 124 represents pre-set dynamic payment card allowances that are desired to be set up for any given dynamic payment card. Parameters associated with these pre-set allowances are managed within the purchasing management system 100 and are then provided by the purchasing management system 100 to the card processing system 130 and stored in the approval parameters database 132. These parameters allow the card holder to have pre-approved spending authority without the requirement of first generating a purchase request that is approved through the purchasing management system 100. When the transaction processing block 134 provides transaction data concerning a purchase made using such pre-approved spending authority to the transaction reconciliation and reporting block 122, a purchase request associated with the transaction may be synthesized from the transaction data, if desired. This request synthesis is represented by block 128. In addition, with respect to block 126, the card user may be given an opportunity to provide a user justification or other information, and the justified or the unjustified synthesized purchase request may be subjected to approval processing, if desired. As discussed more fully with respect to FIGS. 5A-B, 6A-B and 7A-B, the paths starting in the embodiment of FIG. 1 with blocks 116 and 124 provide example processing paths that allow for forward flow approval processing and reverse flow approval processing.

As discussed above, and in more detail below, the present invention can be applied to dynamically manage payment cards control settings stored by card processors to provide the dynamic approval parameters. This dynamic management of control settings can be based upon company purchasing policies without requiring the company to employ a card processing specialist. In other words, the dynamic payment card system of the present invention provides the appropriate interface with the card processing infrastructure so that company approval policies can be automatically and dynamically managed. In this embodiment, therefore, the dynamic payment card processing system 130 may be a standard payment card processor, such as TSYS, and the dynamic approval parameters stored in the database 132 of the card processing system 130 can be standard payment card control settings that are dynamically managed through the purchasing management (PM) system 100 of the present invention.

Looking now in more detail to FIG. 5A, a block diagram is provided for a dynamic payment card management environment 500, according to the present invention, that can utilize existing card processing infrastructures. To initiate use of the dynamic payment cards, a company 104 typically may, for example, proceed through the following steps: (1) establishing credit, (2) accomplishing initial card set up with the card processor, for example, through the bank or other card issuer, (3) determining card holders and associated user roles, and (4) selecting card settings including any desired level of pre-approved spending authority. In the embodiment shown in FIG. 5A, a company 104 establishes a credit relationship through interactions 504 with a card issuer or bank 502. Through interactions 514, the card issuer then may set-up initial card settings at the card processing system 130 for each user 106A, 106B . . . 106C. If desired, this card set-up may also be accomplished by the purchasing management system 100. For example, the card issuer or bank 502 may provide an available level credit for the company 104, and then the company 104 may decide the number of cards and the settings for those cards which the company 104 desires.

Through interactions 510, the company 104 interfaces with the purchasing management (PM) system 100. As discussed above, these interactions 510 allow for the company 104 to define purchasing policies and associated approval processing rules within the PM system 100. In addition, the interactions 510 allow the user roles and card settings to be selected and managed. It is also through these interactions 510 that users 106A, 106B . . . 106C can make purchase requests, that these requests can be processed, and that approval responses can be provided. Based upon these rules, roles and approval processing, the PM system 100 interfaces with the card processing system 130 to dynamically manage the settings for the company payment cards through interactions 512. These dynamic payment cards then allow for improved purchasing management. The vendors 140 look to the card processing system 130 to get authorization codes for any given initiated transaction. This authorization interaction may include interactions 516 and 518 that occur through an intermediate transaction network 515, such as VisaNet interface network.

FIG. 5B provides a block diagram for example processing flow 550 for a purchasing card management environment, according to the present invention. It demonstrates two different paths through which a dynamic payment card can be managed and utilized. In the example shown, processing flow 550 includes a forward flow approval processing path 554 and reverse flow approval processing path 556 that may be utilized depending upon how the user 552 uses the dynamic payment card. It is noted that these two paths are depicted as examples and should not be taken as being all of the processing paths that could be implemented using the dynamic payment cards of the present invention.

If the dynamic payment card has pre-approved spending authority associated with it, the user may proceed down line 564 to begin the reverse flow approval processing path 556. Block 566 represents pre-set spending allowances that have been set up for the dynamic payment card being used by the user 552. The user 552 then uses the card to make a purchase in block 568 where card processing occurs, authorizing the transaction if the approval parameters for the card are satisfied. Based upon information available from the card processor 130 about the purchase, the PM system 100 can synthesize post-transaction a purchase request associated with the purchase in block 570. In block 572, the PM system 100 allows the user 552 to provide additional transaction information, such as transaction details, accounting or general ledger (GL) coding, justifications or any other desired or requested information, for the purchase made in block 568 and provides for post-transaction processing of the purchase, for example, through the company's approval processing rules, if desired. Thus, this request synthesis advantageously allows purchases made using pre-approved spending authority to be input back into the PM system 100 for post-transaction approval based on the company's purchasing approval guidelines and purchase reconciliation. It is noted that if the user 552 proceeds down the reverse flow path 556 without having a card with pre-approved spending authority, the transaction will not be authorized by the card processor in block 568.

This purchase request synthesis advantageously allows for purchases made under general pre-allowed card constraints to be subjected to post-transaction processing and reporting by the purchasing management system and to post-transaction approval routing, if desired. As discussed with respect to the example below, dynamic payment cards may be set-up with some level of approved spending authority without requiring the user first to go through the purchase request approval process. If a user makes a transaction using such pre-allowed spending authority, that purchase will typically not have a purchase request or purchase order associated with it. Using data provided from the card processing system 130, the purchasing management system 100 can synthesize a purchase request and/or a purchase order for this transaction. This synthesized purchase request/order can then be used by a company's accounting system so that the transaction can be reconciled against a purchase request/order, as desired. In this way, a wide variety of advantageous synthesized information can be provided to a company for their tracking, accounting, or other purposes. For example, the synthesized purchase request can be used in requesting user justifications for the transaction and in post-transaction processing, if desired. And the company can inform a user whether or not a transaction made using pre-set card allowances has been disapproved thereby requiring reimbursement by the user to the company.

The user 552 may also proceed down line 558 to begin the forward flow approval processing path 554. In block 559, the user 552 initiates a purchase request in the PM system 100 and the request is subjected to pre-transaction approval processing, as discussed above. Assuming approval is granted, the PM system 100 in block 560 then automatically and dynamically manages the card settings so that these settings will allow for the transaction to be authorized when the purchase is initiated by the user 552. To accomplish this task, as described with respect to the embodiment of FIG. 5A, the PM system 100 interfaces with the card processing system 130 to determine the current settings for the card's approval parameters and to create or modify those settings so that they will allow the transaction that is the subject of the approved purchase request. In block 562, the user 552 makes the purchase and the purchase is authorized if it is allowed by the card settings and approval parameters. As discussed in more detail with respect to FIGS. 9A-D, summary transaction information for a company's cards may be periodically received from the card processor 130 for use by the PM system 100 in reconciliation activities.

Looking back now to FIG. 5A, it is noted that the card processing system 130 may be, for example, implemented by a third-party card processor such as the card processing system provided by Total System Services, Inc. (TSYS). The TSYS platform, for example, provides various features that may be set for purchasing cards, including the features listed in TABLE 1 above. The TSYS platform interface looks for certain communications to effect insert, delete, modify and other commands to card records stored in the TSYS card processing system.

To effect transfer of information from the purchasing management system 100 to the card processing system 130, such as the TSYS processing system, a secure message transfer protocol may be utilized. For example, IBM offers the MQSeries Family of products that facilitate secure e-commerce and electronic messaging by providing a guaranteed delivery of messages in a transactional environment. Using such a messaging interface, card management and card setting information can be sent between the purchasing management system 100 to the card processing system 130. For example, TSYS provides interface commands that allow for modification to specific card settings, such as velocity, MCC groups and credit limits. The instructions contained in these commands may then be fed into the TSYS transaction system resulting in an acknowledgement back to the purchasing management system 100 that the requested settings have been implemented.

FIG. 10A provides a block diagram for communication system 1000 for facilitating secured communications and process isolation within a dynamic payment card management system according to the present invention. In the embodiment depicted, a dynamic payment card (DPC) secure proxy 1004 provides process isolation between the various entities in the communication system 1000 and provides a secure communication interface for communications between the purchasing management application 100, the bank or card issuer 502 and the card processor 130, which in this embodiment is represented as TSYS. The secure proxy 1004 can also provide other security mechanisms, such as for example, fraud detection mechanisms that can help determine if the purchasing management system 100 has been compromised by a malicious or criminal entity. Associated with the TSYS network 130 is an ACE batch processor 1010, a DEF generator 1014 and the MQ Server interface 1012, which can be, for example, hosted by the TSYS subsidiary DotsConnect. Associated with the secure proxy 1004 are encrypted mailboxes 1006 and 1016, the logging and security database 1018 and the credit card (CC) number vault 1020. The CC vault 1020 stores actual credit card numbers and provides security for those numbers. If desired for improved security, rather than using the credit card numbers themselves, the PM system 100 can use separate numbers or identifiers that correlate to the actual credit card numbers. Thus, the only communication of actual credit card numbers would occur between the secure proxy 1004, the bank 502 and/or the TSYS network 130.

Communications between the PM system 100 and the secure proxy 1004 can occur along path 1022, which may be, for example, a virtual private network (VPN) or local network connection. As discussed herein, example information that can be communicated through this path 1022 includes dynamic payment card or active credit card (ACC) transactions, card credit limits, spending limits and velocity settings, MCC category lockout information, activity reports, card issuance information, card cancellation information and any other desired information. Communication from the secure proxy 1004 to the bank 502 can occur along paths 1026 and 1028. The paths 1026 and 1028 may represent, for example, an ACE file communicated through a value added network (VAN) and through an encrypted mailbox 1006. Communications between the secure proxy 1004 and the MQ Server 1012 can occur along path 1024, which may represent, for example, MQ packets communicated over a VPN. Communications between the bank 502 and the TSYS network 130 can occur along path 1030, which may represent, for example, an existing FT link to an ACE batch processor 1010. Communication between the TSYS network 130 and the secure proxy 1004 can occur along paths 1032 and 1034. The paths 1032 and 1034 may represent, for example, DEF information communicated from a DEF generator 1014 through a VAN and through an encrypted mailbox 1016. It is noted that although some of these paths, such as paths 1026, 1028, 1030, 1032 and 1034 have arrows indicating communication flow in one direction, communications can occur in the reverse direction as well, if desired. Thus, in the communication system depicted in FIG. 10A, the secure proxy 1004 provides an intermediate system that can provide security mechanisms, can provide process isolation between the various entities in the system, and can facilitate the secure transmission of communications between the various entities in the system. In addition, this secure proxy 1004 can receive and send information in formats that are recognized by the various entities within the system, thereby providing translations or conversions between disparate communication protocols or formats that may be utilized by the various entities.

These interfaces provide example secure communication channels between the purchasing management application 100, the TSYS-enabled bank 502 and the TSYS card processing network 130, where TSYS is the card processor. The connections between the purchasing management application 100 and the bank 502 may be used, for example, for card issuance processes. The connections between the purchasing management application 100 and the MQ Server 1012 and the TSYS card processing network 130 may be used, for example, for real-time, dynamic card maintenance and management of card control settings. In addition, the connection between the TSYS network 130 and the purchasing management application 100 may be used, for example, for transmission of card transaction information.

As discussed above, the PM application 100 can manage purchasing card control settings using a set of maintenance messages, for example, using a real-time card control protocol supported by the TSYS network 130. As indicated above, this TSYS card control protocol utilizes a set of MQSeries messages that allow the sender to change various properties of a card. To improve security and to help protect the card processor network 130, the purchasing management application 100 can be restricted from having direct access to the card processor network 130. Instead, as shown in FIG. 10A, the PM application 100 can send correctly formatted MQSeries messages to a trusted MQ server 1012, which can be hosted by a separate entity, for example, the TSYS subsidiary DotsConnect where TSYS is the card processor. This indirect connection helps to limit security exposure of the TSYS card processing network 130. As also shown in FIG. 10A, to provide additional security for the PM application 100, all payment card access and control services can be built into a secure proxy 1004, thereby isolating these control setting manipulation mechanisms from the PM application 100 itself. This isolation helps to ensure security and auditing of card access software code and related processes and prevents bank-specific or processor-specific software code from becoming intertwined in the PM application 100. The main PM application 100 can then be separated from the secure proxy 1004 by a network-ready protocol, which will help maintain strict, well-documented access to card control services that can be independent of the card processor 130 and/or the bank or card issuer 502. This separation of the PM application 100 and the card access secure proxy 1004 also provides the ability to establish the secure proxy 1004 as a physically and geographically separate server system, if desired.

It is noted that alternatively the PM application 100 and the secure proxy 1004 could be implemented as a single server system and associated software code. In addition, if direct communication among the PM application, the bank 502 and the card processor 130 is desired, the secure proxy 1004 could be eliminated. However, some security procedures would likely be desirable to ensure that malicious entities do not intercept or adversely affect communications or system operations. In addition, functionality provided by the secure proxy 1004 could be split among different entities in the system, such as placing part of this functionality within PM system 100 and part of it within the bank 502 and part within the card processor 130 or within the additional intermediate interface 1012. It is further noted that other implementations for the secure proxy 1004 could also be utilized, as desired.

Card setup and issuance can also occur through the secure proxy 1004. Once bank 502 has set up a master account record for a new card program, the card processor 130 can handle the details of issuing cards for the program, as is typically the case under existing procedures. To issue a card or cards, the bank makes an automated request to the card processor 130. The card processor 130 then assigns account numbers and triggers the creation of the physical payment card. For example, with respect to TSYS as the card processor 130, the bank 502 and any other TSYS-member bank typically use a batch-mode system called ACE to initiate issuance of new cards. In the ACE system, the bank 502 transmits a specially formatted flat file to the TSYS card processor 130 through a direct link, such as file transfer (FT) link 1030 that uses a file transfer program to effect communications. The communicated ACE file will contain the information used by TSYS to add a cardholder to the card program. As shown in FIG. 10A, this task of creating and sending an ACE file to add a cardholder to the program can be included within the operations of the PM application 100 and/or the secure proxy 1004, if desired. In this way, when a company using the PM application 100 indicates the desire for issuance of a new card within the PM application 100, an ACE-format file can be automatically generated by the PM application 100 or the secure proxy 1004. This ACE-format file could be transmitted to the bank 502 through the VAN represented by paths 1026 and 1028 and through an encrypted mailbox 1006. As such, an existing FT link 1030 that supports the ACE protocol utilized by the ACE batch processor 1010 can be utilized. If desired, the PM application 100 and/or the secure proxy 1004 can communicate this ACE-format file directly to the ACE batch processor 1010, if an appropriate communication path were created. Once a new card has been added to the card program by the card processor 130, card activation can occur through traditional procedures, such as the cardholder calling a phone number placed on the back of the card to activate the card, or the PM application 100 can provide an automated activation procedure. If the latter were utilized, the card processor 130 would also be modified to accept such automated activation, for example, through communications with the secure proxy 1004. It is noted that different procedures for card set-up and initialization could be used, as desired, and that the discussion above is just one example related to TSYS as the card processor.

To support back-end reconciliation of card transactions as discussed above, the PM application 100 can utilize periodic updates (e.g., monthly, nightly, hourly, etc.) that contain information concerning the card transactions that have occurred since the last update. It is noted that these transaction updates could also be real-time or instantaneous updates that are transmitted and received contemporaneous with the completion or authorization of the transaction. In addition, these updates could be sent automatically by the card processor and/or at the request of the PM application 100. Under existing card processing procedures, such as those used by TSYS, the bank 502 typically receives two kinds of transaction data files. The first is called a Data Exchange File (DEF), which the TSYS network 130 sends nightly to the bank 502. The DEF file contains a wide array of reporting data, including account changes and card transaction data. The second transaction data file is sent by TSYS monthly and contains settlement information for preparing billing statements. As shown in FIG. 10A, these two files can be sent to the PM application 100, for example, through the DEF generator 1014 and the secure proxy 1004. The nightly DEF file can be used for reconciliation activities and for the dynamic management of card control settings, as discussed above. The monthly settlement data can be used to complete reconciliation of payment card account information, for example, for latent activities such as credits refunded by merchants.

In the existing TSYS processes, a TSYS-enabled bank 502 would receive the DEF file nightly from the TSYS network. The bank 502 then processes the file, extracting data into a set of relational database tables, which are in turn used by the bank's customer-facing Internet applications. Rather than having the PM application 100 interface with this bank processing, the bank 502 can request that a separate DEF file from the TSYS network 130 be delivered directly to the PM application 100, as shown in FIG. 10A, for example, through a VAN represented by paths 1032 and 1034 and through an encrypted mailbox 1016. In addition, this separate DEF file can be sent as multiple DEF files, with each being specific to a company or set of companies. The traditional DEF file that is sent to a bank typically contains information about all of the bank's card programs and accounts for all companies and individuals with which it does business. For additional security, the card processor specific data files can be manipulated only by the secure proxy 1004, which then sends some modified or abstracted version of card transaction data to the PM application 100. This process would then provide a security boundary to prevent sensitive information, such as detailed account information, from leaking into the main PM application 100. Again, as noted above, this implementation in FIG. 10A of having a separate system that provides the secure proxy 1004 could be modified, if desired, to incorporate the security mechanisms within the operations of the PM application 100, the card issuer 502 and/or the card processor 130, themselves.

FIG. 10B provides block diagram for a more general communication system 1050 than the one depicted with respect to FIG. 10A. This communication system 1050 provides a secure proxy environment to facilitate secure communications and process isolation between one or more purchasing management systems 100A, 100B . . . 100C, one or more card issuers 502A, 502B . . . 502C, one or more card processors 130A, 130B . . . 130C, and one or more secure proxy systems 1004A, 1004B . . . 1004C. It is noted that element numbers from FIG. 10A have been repeated in FIG. 10B to represent the general correlation of the elements of FIG. 10A to those in FIG. 10B.

As with FIG. 10A, the one or more secure proxies 1004A, 1004B . . . 1004C can have various shared or separate databases associated with them, for example, database 1018 that stores transaction log information and database 1020 that provides a credit card (CC) vault. As stated above, the credit card vault, if utilized, can provide a security mechanism by isolating credit card numbers from other entities in the architecture. It is noted that the organization of these databases and use of additional or different database would likely depend upon the architecture chosen for implementing the secure proxy environment.

The one or more purchasing management applications 100A, 100B . . . 100C can communicate with the one or more card control secure proxies 1004A, 1004B . . . 1004C through communication paths 1022. For example, communication paths 1022 can provide for the transfer of information such as card credit limits, spending limits, velocity settings, MCC category controls and lockouts, credit card activity reports, card issuance requests and information, card cancellation requests and information, or other desired information. One or more card control secure proxies 1004A, 1004B . . . 1004C can communicate with the one ore more card issuers 502A, 502B . . . 502C through communication paths 1026/1028. For example, communication paths 1026/1028 can provide for the transfer of information such as card issuance requests and related information. One or more card control secure proxies 1004A, 1004B . . . 1004C can communicate with the one or more card processors 130A, 130B . . . 130C through communication paths 1024 and 1032/1034. For example, communication paths 1024 can provide for the transfer of information such as credit card parameter control information. And communication paths 1032/1034 can provide for the transfer of information such as account activity reports. The one or more card issuers 502A, 502B . . . 502C can communicate with the one or more card processors 130A, 130B . . . 130C through communication paths 1030. For example, the communication paths 1030 can provide for the transfer of information such as account setup information. The one or more card processors 130A, 130B . . . 130C can communicate with merchants or vendors through communication paths 1052. For example, communication paths 1052 can provide for the transfer of credit card transaction information that one or more card processors 130A, 130B . . . 130C can use to authorize or reject an attempted transaction based upon stored card parameters. Thus, similar to the secure proxy 1004 depicted in FIG. 10A, the secure proxies 1004A, 1004B . . . 1004C in FIG. 10B provide an intermediate system that can provide security mechanisms, can provide process isolation between the various entities in the system, and can facilitate the secure transmission of communications between the various entities in the system. In addition, these secure proxies 1004A, 1004B . . . 1004C can receive and send information in formats that are recognized by the various entities within the system, thereby providing translations or conversions between disparate communication protocols or formats that may be utilized by the various entities.

The card control secure proxies 1004A, 1004B . . . 1004C provide one or more security mechanisms, including security mechanisms with respect to the communications received by and transmitted to them. These security mechanisms, for example, may include secure mailboxes, secure communication protocols, public/private key encryption or other digital signature procedures, or any other desired security mechanism directed to communication security or to process security. In addition, it is noted that the information transferred and the communication paths themselves could be modified, if desired, depending upon the architecture chosen for implementing the secure proxy environment. It is further noted that the communication paths can be implemented through any of a variety of mechanisms that allow for electronic information to flow between systems.

It is further noted that the secure proxy, such as secure proxies 1004A, 1004B . . . 1004C, can incorporate any desired level of processing functionality in addition to providing a security mechanism for communications or for other processes or purposes. For example, the purchasing management systems 100A, 100B . . . 100C can provide to the secure proxies 1004A, 1004B . . . 1004C information that represents purchasing capabilities or authorizations desired to be added or made available with respect to one or more payment cards, and the secure proxies 1004A, 1004B . . . 1004C can interface with card processors 130A, 130B . . . 130C to determine current card settings and to generate and send correctly formatted instructions to the card processors 130A, 130B . . . 130C to make sure that these desired purchasing capabilities or authorizations are available with respect to the one or more payment cards. By incorporating this functionality into the secure proxy, the purchasing management systems 100A, 100B . . . 100C themselves would not themselves have to perform the function of determining current card settings and generating and sending the correctly formatted instructions to effect any needed adjustments to the card settings. If less functionality is desired to be implemented within the secure proxies 1004A, 1004B . . . 1004C, for example, the secure proxies 1004A, 1004B . . . 1004C can simply provide an intermediate security mechanism that simply receives and forwards on communications between the various entities with the communication system 1050 without providing any significant additional functionality. In short, a variety of different implementations may be utilized for the secure proxy embodiments of the present invention.

As depicted, the communication system 1050 provides for a wide range of potential architectures for a secure proxy environment. For example, a secure proxy could be dedicated to each card processor so that communications with card processor 130A flow through secure proxy 1004A, communications with card processor 130B flow through secure proxy 130B, and so on, regardless of the which purchasing management application 100A, 100B . . . 100C is sending or receiving the communication. A secure proxy could also be dedicated for each card issuer so that communications associated with cards issued through card issuer 502A flow through secure proxy 1004A, communications associated with cards issued through card issuer 502B flow through secure proxy 1004B, and so on, regardless of the which purchasing management application 100A, 100B . . . 100C or which card processor 130A, 130B . . . 130C is sending or receiving the communication. In addition, each card issuer may have multiple secure proxies, one being associated with each card processor, so that communications associated with cards that were issued by card issuer 502A and that are associated with card processor 130A would flow through secure proxy 1004A, communications associated with card that were issued by card issuer 502A and that are associated with card processor 130B would flow through secure proxy 1004B, and so on, regardless of the which purchasing management application 100A, 100B . . . 100C is sending or receiving the communication. Still further, each purchasing management application could have a dedicated secure proxy, so that communications associated with purchasing management application 100A would flow through secure proxy 1004A regardless of the which card issuer 502A, 502B . . . 502C or which card processor 130A, 130B . . . 130C is sending or receiving the communication. Combinations of these examples could also be implemented. Thus, as stated above, a wide range of potential architectures could be used for implementing a secure proxy environment. It is thus noted that these example architectures are only some of the potential configurations and architectures for implementing the secure proxy environment, and other combinations, configurations and architectures could be used if desired.

To describe further examples of how the dynamic payment card can be used and managed by the dynamic payment card management system of the present invention, it is helpful to discuss the roles that persons and entities may play within the system, including the role of the bank. For corporate purchasing, there exists at least two basic roles within the dynamic payment card management system 100. These are the Requestor role, which represents a user who typically must obtain approval before being authorized to make purchases for the corporation, and the Buyer role, which represents a user who typically has some level of pre-approved spending authority.

The Requester role can be viewed as both the most common and least powerful role in the direct or indirect spending equation. Requesters do not generally have any spending authority unless they have prior approval from the company. Prior approval for the Requester may arise from a variety of circumstances, but will often arise from one of two sources. The first source of pre-approval is from an approved purchase request via the company's purchasing process, perhaps an approved "check request" or purchase order (PO). A second source or pre-approval is a budget that the company has granted to the Requester for specific types of purchases. That budget may be further limited by factors such as category of spend, merchant, or by a maximum amount per transaction. Depending on the nature of the purchase request, the actual purchase may be executed by the Requester or by a Buyer (described below) acting on behalf of the Requester. A common type of Requester is one that uses the card for travel and entertainment (T&E) purchases. The T&E user is generally an employee who incurs reimbursable expenses for things like airfare, car rental, and business meals. The T&E user generally submits these expenses to the company after the fact and receives an expense check from the company if those expenses are determined to be reimbursable within the company's policies. It is noted that in addition to these two typical pre-approval circumstances, a company may want to pre-approve spending authority for any of a variety of reasons.

The Buyer role can be viewed as a purchasing role in the company covering one or more categories of company spending across distinct areas such as technology, office supplies, industrial products/facilities, or marketing. For example, many companies have a technology Buyer within their Information Technology (IT) department. The IT Buyer is usually responsible for technology supplier relationships and for cross-organizational procurement of all technology products for a company. The Office Manager is another common type of Buyer, generally overseeing the companies office supplies purchases by approving, aggregating, and placing orders with office product suppliers. Buyers often act as the gatekeeper to suppliers in their area as Requester purchase requests are approved.

Companies generally have a strong trust relationship with their Buyers. This trust relationship generally translates into Buyer discretion on some level of purchases in that Buyer's area, with corporate control reserved for more significant purchases. Correspondingly, each purchase a Buyer makes may require some level of justification and reconciliation, which may occur either before or after the purchase is made. An example of after-the-fact justification for an IT Buyer might be purchasing a notebook computer for a newly hired salesperson. In such cases, the company trusts the Buyer to do the right thing and audits the buyer's justification of spending after the purchase has in-fact been made. Building on the technology Buyer example, the purchase of a new and expensive software package with a recurring annual maintenance fee would likely require pre-approval. Most companies have this hybrid approach, allowing Buyer discretion and post-purchase reconciliation on certain purchases and requiring pre-approval on others. From an accounting perspective, each Buyer purchase may be reconciled against a centralized company budget for the designated category of spend or against departmental or employee budgets.

It is noted that individual employees may play multiple roles in different scenarios. For example it is possible that an IT Buyer is also a Requester in the context of office furniture requests. Similarly, a sales executive may be primarily a T&E User, but may make more general Requester requests, such as for a large print run of marketing collateral, and may be allocated pre-approved spending authority with respect to purchases of certain items.

In the context of dynamic payment card system of the present invention, the primary role of the bank may remain the same as in standard purchasing card programs. The bank (or it's processor) may establish a credit relationship with the customer, set-up the initial purchasing card account parameters, such as master credit limit, and issue the cards just as it has done traditionally. Similarly, the ongoing role of the bank may continue to include processing transactions, billing the customer, and collecting both receivables and interchange fees. One function that the purchasing management system 100 can advantageously perform for the company and the bank is the dynamic manipulation and management of the company dictated spending. The purchasing management system 100 performs this dynamic manipulation and management at least in part by controlling constraint features of the payment cards. Of particular usefulness is the dynamic control of at least two of these features, namely the merchant setting and the velocity setting on each card. Traditionally, this type of manipulation is performed manually by the bank or another authorized agent, as a result of contact by an authorized representative of the customer requesting a change. In contrast, the dynamic nature of the purchasing management system 100, which powers the dynamic payment card management, allows the bank's customer company to manage its purchases through the purchasing management system and to allow the purchasing management system to interface with the card processor to modify and manage the card settings. In this way, the company in effect is allowed to manage its own card settings within the company master credit limits established with the bank. This distributed card management helps free bank resources for other activities.

As stated above, the dynamic payment card of the present invention can have any of a variety of settings associated with it. For example, the approval parameters for each approved transaction may be stored by the card processor. The level of detail for these approval parameters depends upon the capabilities of the card processor 130 and upon the desires of the user. For example, as discussed above, existing purchasing cards have control features such as the following: credit limits, velocity, slots, PoS IDs, maximum transaction amounts, and diversion accounts. These control features may be utilized to constrain how the card may be used to make purchases. Depending upon the desired approval settings and the control features utilized by the card processor, the dynamic payment card management system of the present invention can provide from general to very specific spending constraints for card usage and can dynamically and automatically manage those constraints depending upon approved expenditures, employee buyer/requester roles, approved purchase requests, or any other desired activity.

Dynamic management of the card control settings can occur in a variety of ways with a particular implementation of this dynamic management likely depending upon the parameters that are stored and manipulated for the payment cards being managed. For example, considering the velocity and slot control features identified above, there are a variety of different ways these features could be used for dynamic management of a payment card. The Company Example and associated transaction examples that are discussed below provide an example of how slots and velocity settings can be utilized. In particular, for these transaction examples, slots are used for particular types of spending authority, and velocity settings are set and managed on per-slot basis. TABLE 2 below describes example initial payment card control settings for the example transactions. Alternatively, the slots could be used for identifying whether certain types of spending categories are allowed for a payment card, and velocity settings could be set and managed on a per-card basis. For example, the slots could be organized such that Slot 1 represents T&E expenditures, Slot 2 represents cash withdrawals, Slot 3 represents general purchasing, Slot 4 represents vehicle purchases (e.g., gas, oil, etc.), and Slot 5 represents unusual purchasing needs. For this alternative example, the management of whether each slot is enabled to allow this type of purchase authority or disabled to disallow this type of purchase authority can be done on initial card setup and thereafter as needed to adjust the types of spending authority allowed for any given payment card. The management of the velocity setting could occur at the card level and would be expected to be adjusted at a much higher frequency based upon approved purchase requests and/or activity using pre-approved spending authority or capabilities. It is noted that the settings for this alternative example would be similar to those set forth in TABLE 2; however, the velocity control setting would be managed for the whole card and not for each slot individually. It is further noted that these examples for dynamically managing card control settings are merely examples, and many other implementations and management techniques could be implemented if desired depending upon the specific characteristics of the payment cards to be managed and their related control settings.

Figure 9A:
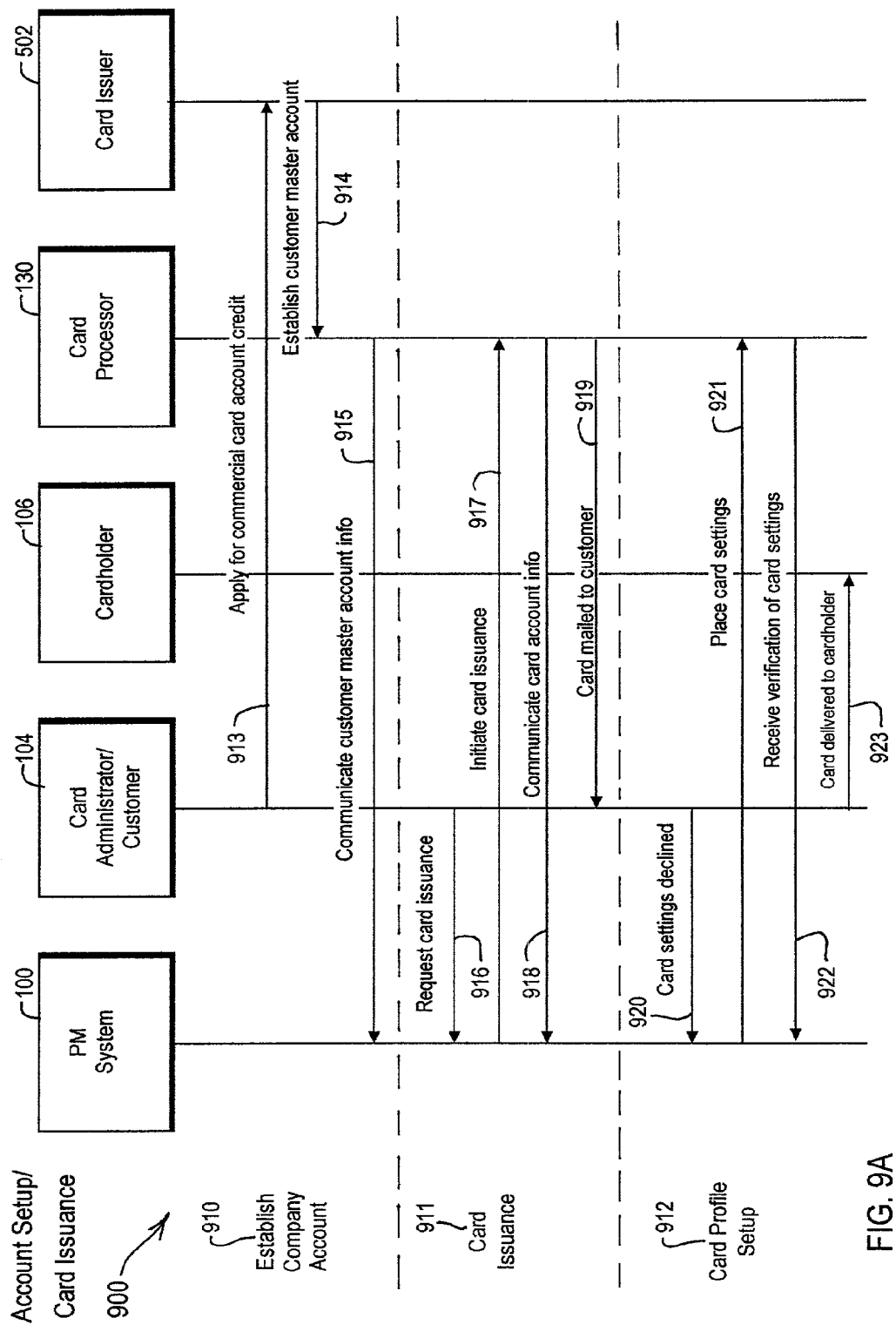
Figure 9B:
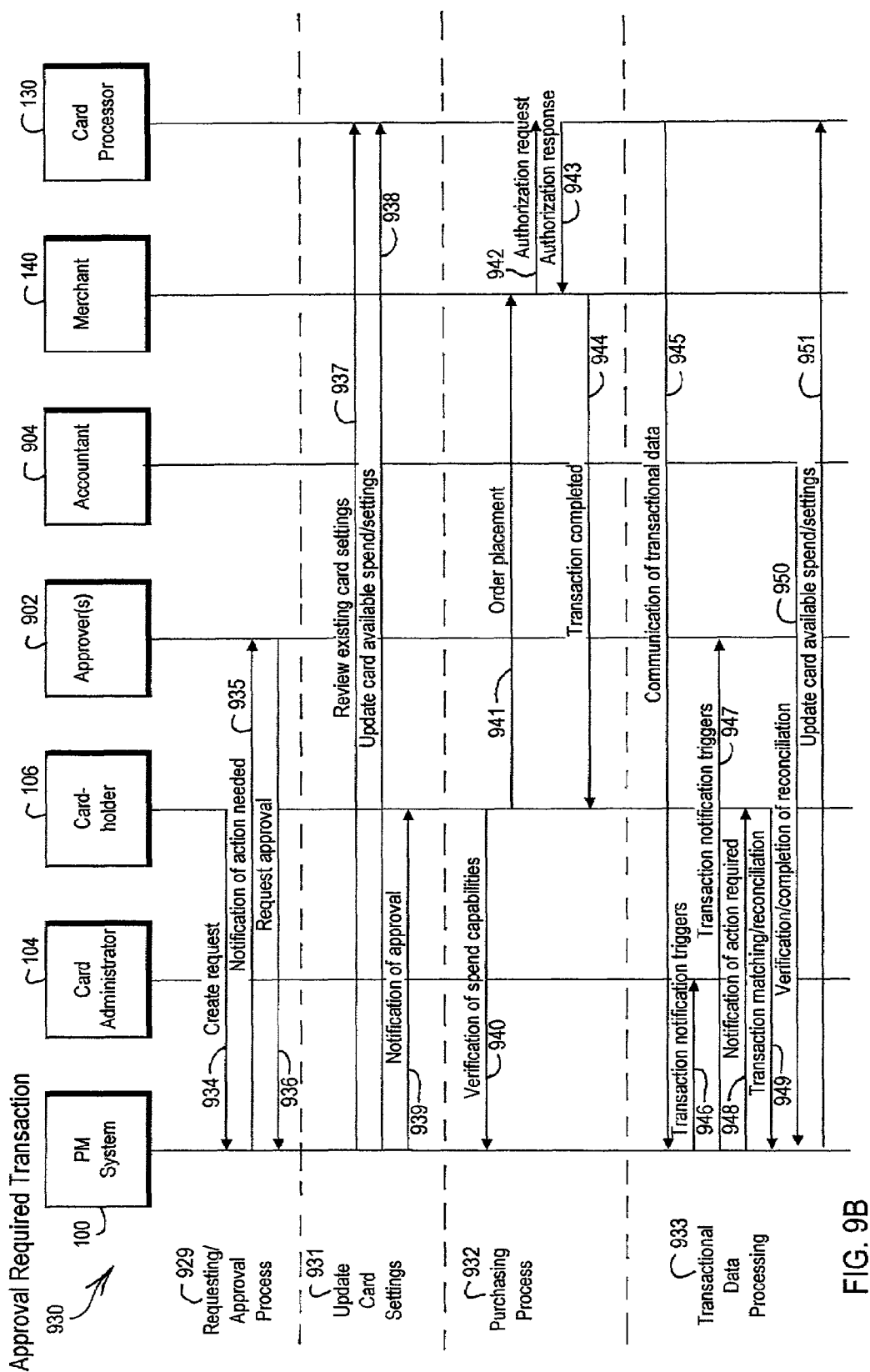
Figure 9C:
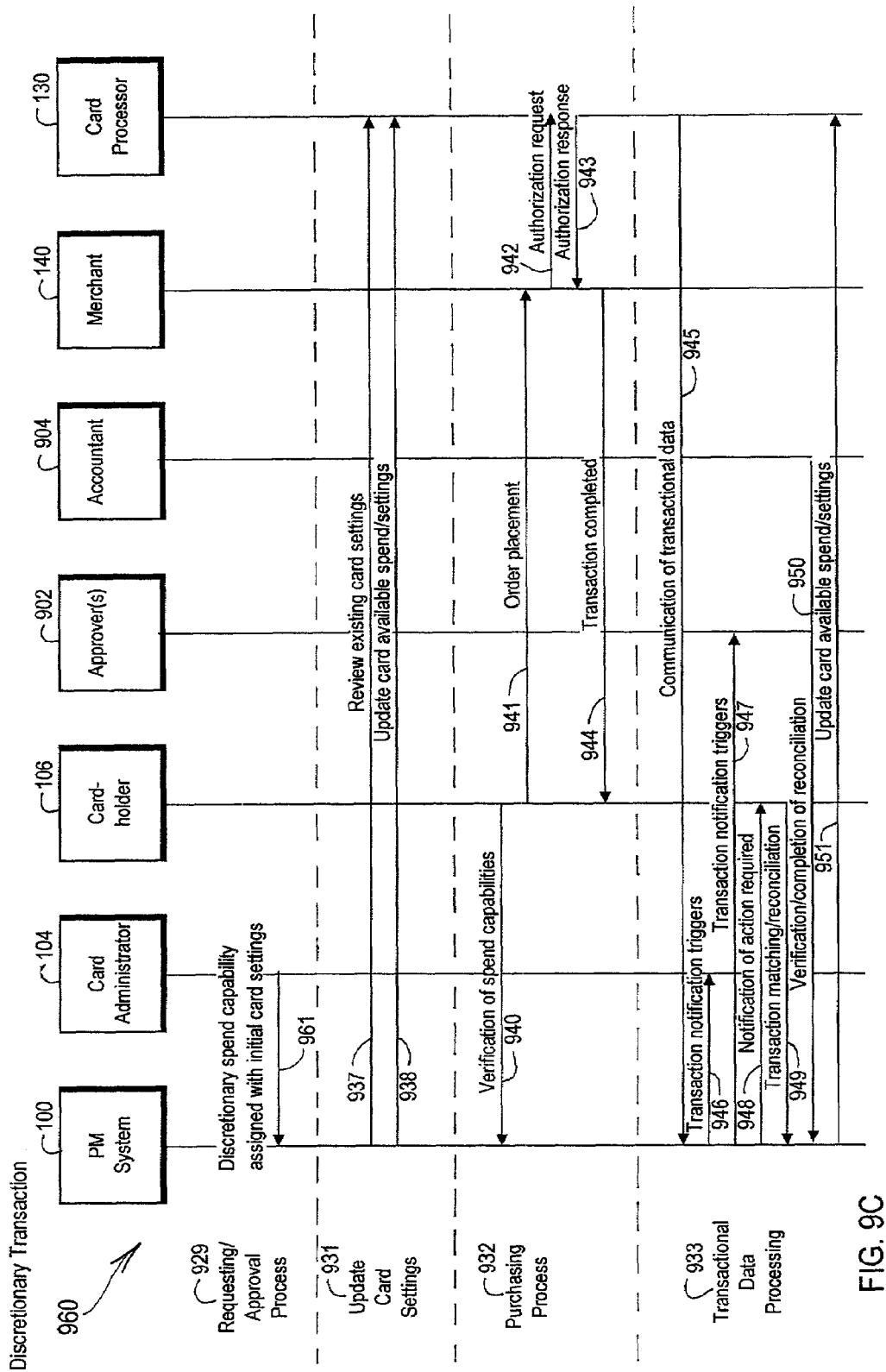
Figure 10A:
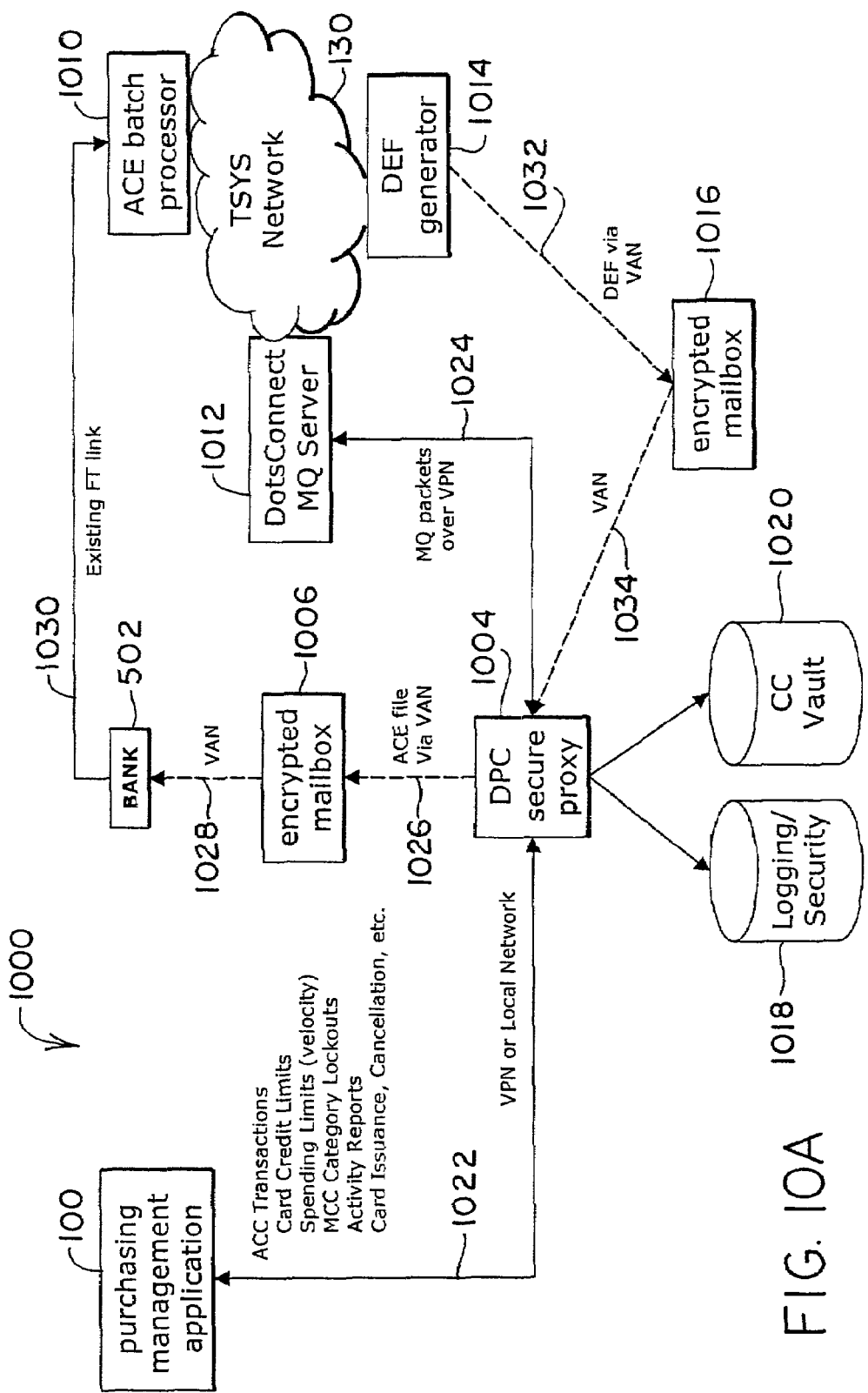
FIG. 10A is a block diagram for a secure proxy environment to facilitate secure communications between the purchasing management system and card processor infrastructure.
Figure 10B:
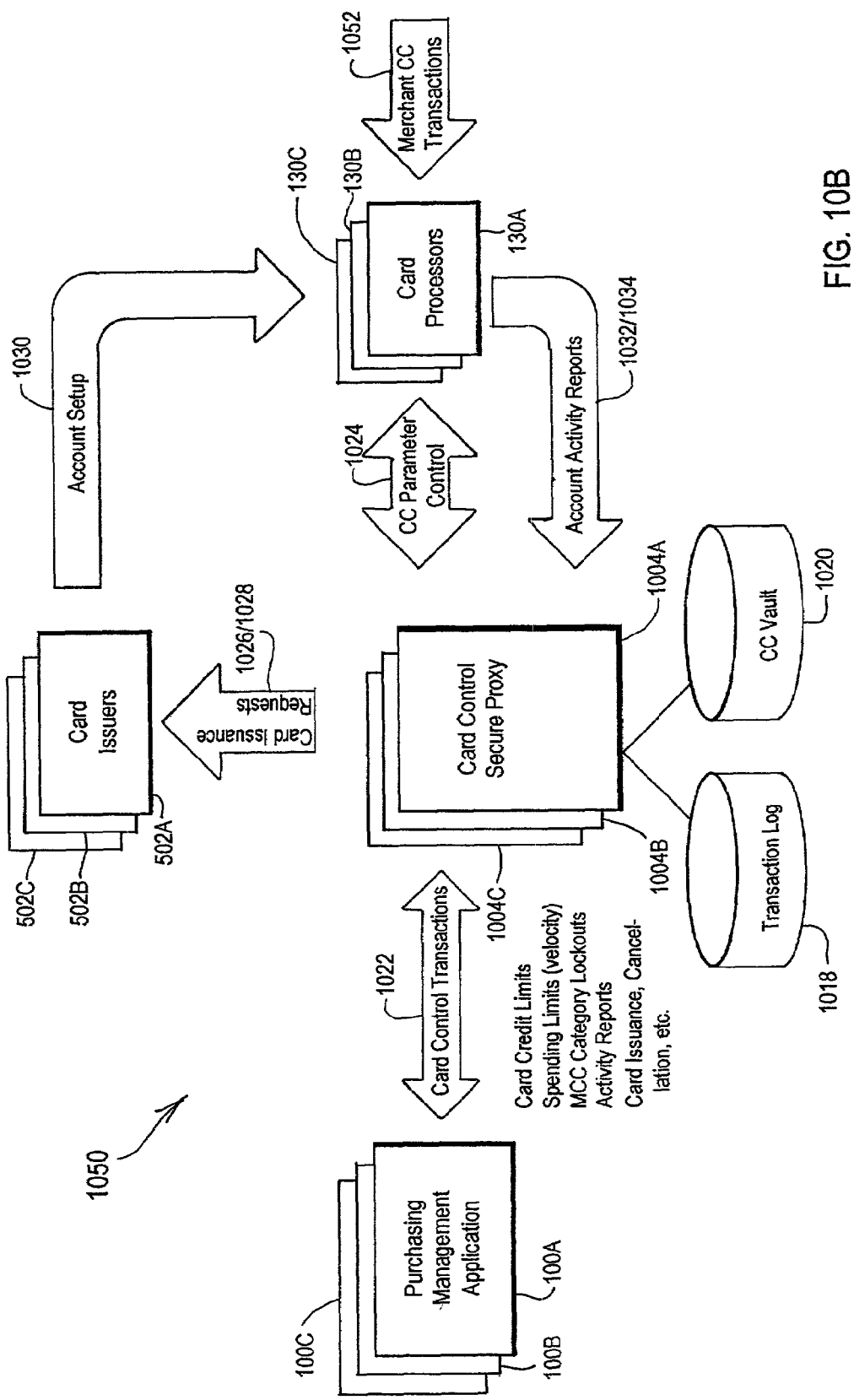
FIG. 10B is block diagram for a secure proxy environment to facilitate secure communications between one or more purchasing management systems, one or more card issuers, one or more card processors, and one or more secure proxy systems.

FIGS. 9A-D provide swimlane diagrams that further describe interactions within a dynamic payment card management system embodiment according to the present invention. In particular, FIG. 9A provides a swimlane diagram for example interactions for payment card account setup and card issuance. FIG. 9B provides a swimlane diagram for example interactions for a transaction where approval is first required, for example, as with respect to forward flow approval processing path 554 of FIG. 5B. FIG. 9C provides a swimlane diagram for example interactions for a transaction including discretionary spending authority, for example, as with respect to reverse flow approval processing path 556 of FIG. 5B. And FIG. 9D provides a swimlane diagram for example interactions for adding order identifiers to facilitate logical matching of completed transactions with purchase requests. It is noted that for each of these swimlane diagrams, the entities listed across the top of the diagram are associated with the lines extending down from their respective boxes. An arrow that starts from one of these lines and stops at another represents an interaction between the entities associated with these two start and stop lines.

Looking first to FIG. 9A, example interactions for account setup and card issuance processes 900 are depicted. The entities listed at the top of the swimlane diagram are the PM system 100, the card administrator or customer 104, the cardholder 106, the card processor 130 and the card issuer 502. In FIG. 9A, the processes 900 are separated into three activities, namely establish company account 910, card issuance 911 and card profile setup 912.

Within the establish company account activity 910, interaction 913 represents an interaction between the card administrator 104 and the card issuer 502 to apply for commercial card account credit. Interaction 914 represents an interaction between the card issuer 502 and the card processor 130 to establish a customer master account. And interaction 915 represents an interaction between the card processor 130 and the PM system 100 to communicate customer master account information.

Within the card issuance activity 911, interaction 916 represents an interaction between card administrator 104 and the PM system 100 to request card issuance. Interaction 917 represents an interaction between the PM system 100 and the card processor 130 to initiate card issuance. Interaction 918 represents an interaction between the card processor 130 and the PM system 100 to communicate card account information. And interaction 919 represents an interaction between card processor 130 and the card administrator 104 to mail or otherwise provide cards to the customer. Alternatively, interaction 917 could be between the PM system 100 and the card issuer 502, where the bank then interacts with the card processor 130 with respect to card issuance requests and related information.

Within the card profile setup activity 912, interaction 920 represents an interaction between card administrator 104 and the PM system 100 to define card settings. Interaction 921 represents an interaction between PM system 100 and card processor 130 to place card settings on the card processor databases. Interaction 922 represents an interaction between card processor 130 and the PM system 100 where verification of card settings is received by the PM system 100. And interaction 923 represents an interaction between the card administrator 104 and the cardholder 106 to deliver the card to the cardholder.

FIG. 9B provides example interactions for approval required transaction processes 930. The entities listed at the top of the swimlane diagram are the PM system 100, the card administrator or customer 104, the cardholder 106, approver(s) 902, accountant 904, merchant 140 and card processor 130. In FIG. 9B, the processes 930 are separated into four activities, namely requesting/approval process 929, update card settings 931, purchasing process 932 and transactional data processing 933.

Within the requesting/approval process activity 929, interaction 934 represents an interaction between the cardholder 106 and the PM system 100 to create a purchase request. Interaction 935 represents an interaction between the PM system 100 and approver(s) 902 to provide notification that approval action is needed, if approval is required. And interaction 936 represents an interaction between approver(s) 902 and the PM system 100 to indicate approval of the request.

Within the update card settings activity 931, interaction 937 represents an interaction between the PM system 100 and the card processor 130 to request, receive and review existing card settings. Interaction 938 represents an interaction between the PM system 100 and the card processor 130 to update card settings and available spend authority. And interaction 939 represents an interaction between the PM system 100 and the cardholder 106 to provide notification of request approval.

Within the purchasing process activity 932, interaction 940 represents an interaction between the cardholder 106 and the PM system 100 to provide a verification of spend capabilities, if such verification is desired. Interaction 941 represents an interaction between cardholder 106 and merchant or vendor 140 for order placement. Interaction 942 represents an interaction between the merchant 140 and the card processor 130 to request authorization for the payment card transaction. Interaction 943 represents an interaction between the card processor 130 and the merchant 140 to provide the authorization response. And interaction 944 represents an interaction between the merchant 140 and the cardholder 106 to indicated that the transaction has been completed.

Within the transactional data processing activity 933, interaction 945 represents an interaction between the card processor 130 and the PM system 100 to provide a communication of the transactional data. Interaction 946 represents an interaction between the PM system 100 and the card administrator 104 to indicate that a transaction notification trigger (or triggers) has been met. Similarly, interaction 947 represents an interaction between the PM system 100 and the approver(s) 902 that a transaction notification trigger (or triggers has been met. Triggers can be set, for example, to activate based upon the occurrence of certain pre-determined events or criterion. Interaction 948 represents an interaction between the PM system 100 and the cardholder 106 to provide a notification if an action by the cardholder 106 is required and/or requested by the PM system 100. Interaction 949 represents an interaction between the cardholder 106 and the PM system 100 to provide information for transaction matching and reconciliation. Interaction 950 represents an interaction between accountant 904 and the PM system 100 to provide verification and completion of transaction reconciliation. And interaction 951 represents an interaction between the PM system 100 and the card processor 130 to update the card settings and available spend after reconciliation of the transaction. It is noted that the updating of card control settings and available spend can also occur at other desired points in the process, for example, after matching of a card transaction with a particular purchase request.

FIG. 9C provides example interactions for discretionary transaction processes 960. The entities listed at the top of the swimlane diagram are the same as in FIG. 9B. In addition, in FIG. 9C, the processes 960 are separated into the same four activities as in FIG. 9B. Within the requesting/approval process activity 929, interaction 961 represents an interaction between the card administrator 104 and the PM system 100 to assign discretionary or pre-approved spend or purchasing authority, for example, with initial card settings. These pre-approved purchasing capabilities allow for discretionary spending activity without the requirement of purchase request approval processing and subsequent allocation of available spending capabilities with respect to a payment card. Within the other activities 931, 932 and 933, the interactions are the same as in FIG. 9B, except that interaction 939 has been removed. It is also noted that as part of the interactions 949, the PM system 100 can generate a synthesized purchase request based upon the transaction details for use in matching and/or reconciliation.

The matching and reconciliation interactions 949 in FIGS. 9B and 9C above can include matching of transaction data with approved or synthesized purchase requests through manual actions of the card holder and/or any other participant or through automated logical matching conducted by the PM system 100 or through a combination of manual and automated activities. For example, a payment card is used to make two purchases through purchase request approval procedures as shown in FIG. 9B, resulting in Approved Purchase Request 1 (APR1), approved Purchase Request 2 (APR2), Transaction 1 (T1) for $500, and Transaction 2 (T2) for $300. A payment card is also used to make two purchases based upon pre-approved purchasing authority procedures as shown in FIG. 9C, resulting in Transaction 3 (T3) for $350 and Transaction 4 (T4) for $400. When transaction data is received by the PM system 100 from the card processor 130, the list of transactions for the payment card includes T1, T2, T3 and T4. The list of approved purchase requests associated with this payment card that is stored by the PM System 100, however, will only include APR1 and APR2. When the transaction data for the payment card is reviewed, for example, by the cardholder 106, there will be four transactions and two purchase requests. The goal for the matching process is to allocate each transaction to one or more purchase request and/or to match each purchase request to one or more transaction. To achieve this goal, purchase requests can be synthesized for T3 and T4.

If the matching procedure were automated, the PM system 100 could analyze the transaction data for T1, T2, T3 and T4 and the data for the approved purchase requests APR1 and APR2. The PMS system 100 could attempt to logically match the transactions and purchase requests. For transactions that could not be matched to an approved purchase request, the PM system 100 would then synthesize a purchase request. For this example, therefore, the PM system 100 would generate synthesized purchase requests for T3 and T4, resulting in a synthesized purchase request 3 (SPR3) and a synthesized purchase request 4 (SPR4). The PM system 100 could then match T3 and T4 with their respective synthesized purchase requests SPR3 and SPR4.

Manual matching could also be included. For example, the cardholder 106 or other participant could review the transaction and purchase request lists for the payment card. This activity would again reveal transaction data for T1, T2, T3 and T4 and the data for the approved purchase requests APR1 and APR2. The reviewer could the n manually identify which purchase request or requests are associated with which transaction or transactions. In this example, the reviewer would allocate APR1 to T1 and APR2 to T2. To provide for request synthesis, when T3 or T4 were reviewed, a check box or button could also be provided that would indicate the transaction as being completed using general pre-approved purchasing authority. Once the reviewer makes this selection, the PM system 100 could synthesize purchase requests, resulting in SPR3 and SPR4. Alternatively, if automatic request synthesis were not desired, the reviewer could manually create a purchase request, resulting in SPR3 and SPR4. Once generated, the reviewer could match T3 and T4 with their respective synthesized purchase requests SPR3 and SPR4.

Whether done by automatic matching or manual matching or a combination of both, the desired result of the matching procedure is to correlate at least one pre-approved or synthesized purchase request with each transaction. It is noted that each purchase request can cover multiple transactions and/or each transaction can cover purchases requested in multiple purchase requests. In addition, a transaction can only fulfill a portion of a purchase request, leaving the purchase request open for additional transactions. It is further noted with respect to approved purchase requests that the transaction may be for more dollars or fewer dollars than was indicated in the approved purchase request.

The interactions 951 in FIGS. 9B and 9C provide for the updating of the control settings for the payment card, for example, to refresh pre-approved spending authority that was previously used to make purchases or to remove spending authority that was associated with an approved purchase request but for which the full amount approved was not needed for the actual purchase made. It is noted that this updating can occur at any desired point in the process. For example, this updating can occur based upon the occurrence of one or more selected events, such as after receipt of the transaction data from the card processor, after the matching process is completed, or after the accounting department formally reconciles the transaction and closes the order. In addition, with respect to the occurrence of such events, this updating can occur immediately upon the occurrence of the event, within some desired time period after the event, at the end of the billing cycle including the event, or at any other desired time. With respect to the card control settings, this updating can provide any desired level of adjustment based upon the transactions. For example, assume that T1 above used only $450 instead of the $500 allocated. The updating could remove the additional $50. And, for example, with respect to T3, when the $300 transaction is matched with SPR3, the PM system 100 could update the payment card to add back $300 to the pre-approved spend authority for that payment card, thereby restoring the pre-approved spending authority. It is noted, therefore, that in this way, the pre-approved spending authority for the payment card could be restored to an original or intermediary value depending upon transaction activity and processing done by the purchasing management system 100.

FIG. 9D provides example interactions for processes 980 that include the addition of order identifiers to facilitate logical matching. The entities listed at the top of the swim-lane diagram are the same as in FIG. 9B, except that the card administrator 104 has been removed and the PM system 100 includes a request/order interface 906 and a reconciliation interface 908. For FIG. 9D, the processes 980 are separated into the same four activities as in FIG. 9B. The primary difference between FIG. 9D and FIG. 9B is the addition of order identification (Order ID) information as represented by interactions 981, 982, 983 and 984. It is noted that the Order ID helps to identify the transaction and thereby facilitate later matching and/or reconciliation of the transaction data with a purchase request or synthesized purchase request. The Order ID associated with the transaction information may take any of a variety of forms to achieve this goal, for example, the Order ID may be a merchant identifier or code, a transaction type identifier or code, a one-bit flag that identifies the type of purchase transaction (e.g., approval required or pre-approved spending authority), or any other desired identification information.

Within the requesting/approval process activity 929, interaction 934 represents an interaction between the cardholder 106 and the request/order interface 906 of the PM system 100 to create a purchase request. Interaction 936 represents an interaction between approver(s) 902 and the request/order interface 906 of the PM system 100 to indicate approval of the request. And interaction 981 represents an additional interaction, which may be part of the interaction 936, between approver(s) 902 and the request/order interface 906 of the PM system 100 to provide an Order ID. It is noted that the Order ID be provided in some other manner or by another entity or participant, for example, the Order ID could be provided by a cardholder, a requestor, an approver, an administrator, a supplier, an accountant or a buyer, and it could be provided automatically by the system.

Within the update card settings activity 931, interaction 937/938 represents an interaction between the request/order interface 906 of the PM system 100 and the card processor 130 to review existing card settings and to update card settings and available spend authority. And interaction 939 represents an interaction between the request/order interface 906 of the PM system 100 and the cardholder 106 to provide notification of request approval.

Within the purchasing process activity 932, interaction 940 represents an interaction between the cardholder 106 and the request/order interface 906 of the PM system 100 to provide a verification of spend capabilities. Interaction 941 represents an interaction between cardholder 106 and merchant or vendor 140 for order placement. Interaction 982 represents an additional interaction, which may be part of the interaction 941, between cardholder 106 and merchant 140 to provide the Order ID. Interaction 942 represents an interaction between the merchant 140 and the card processor 130 to request authorization for the payment card transaction. Interaction 943 represents an interaction between the card processor 130 and the merchant 140 to provide the authorization response. And interaction 944 represents an interaction between the merchant 140 and the cardholder 106 to indicate that the transaction has been completed.

Within the transactional data processing activity 933, interaction 945 represents an interaction between the card processor 130 and the request/order interface 906 of the PM system 100 to provide a communication of the transactional data. Interaction 983 represents an additional interaction, which may be part of the interaction 945, between card processor 130 and the request/order interface 906 of the PM system 100 to provide the Order ID. Interaction 984 represents an interaction between the request/order interface 906 of the PM system 100 and the reconciliation interface 908 of the PM system 100 to provide auto-matching of the transaction to the order record or Order ID. Interaction 950 represents an interaction between accountant 904 and the reconciliation interface 908 of the PM system 100 to provide verification and completion of transaction reconciliation. And interaction 951 represents an interaction between the request/order interface 906 of the PM system 100 and the card processor 130 to update the card settings and available spend after reconciliation of the transaction. It is noted that the updating of card control settings and available spend can also occur at other desired points in the process, for example, after matching of a card transaction with a particular purchase request.

FIGS. 8A-D provide further details concerning example purchasing management process flow for the PM system 100. Looking first to FIG. 8A, a high level block diagram is provided for purchasing flow 800, which includes spending controls 802, request management 804, order management 806 and financial management 808. In the embodiment depicted, this purchasing flow 800 can be viewed as a loop of management activities with the following order: (1) spending controls 802, (2) request management 804, (3) order management 806, and (4) financial management 808, which then loops back to the beginning with spending controls 802. It is noted that this purchasing flow is one example, and a variety of other purchasing flow implementations or modifications to this purchasing flow 800 could be adopted, as desired.

The spending control activities 802 includes any of a wide variety of mechanisms for controlling corporate spending. For example, configurable spending categories and spending rules can be provided that allow an administrator to set various sets spending rules. These spending rules can include organizational rules, financial rules, supplier rules or any other set of spending rules. Organizational rules and policies can include activities such as creating hierarchies of groups, assigning users to these groups, establishing approval routing paths through the groups or persons within these groups, creating relationships between groups with related spending limits and budget constraints, or creating any other desired organizational related rule. Financial rules can include activities such as assigning approver, requestor and administrator roles and authorities to persons within the organization, implementing corporate-wide or group-level spending policy rules, implementing other spending policy rules, setting up general ledger (GL) accounts and budgets, or creating any other desired financial related rule. Supplier rules can include activities such as setting up supplier profiles, populating item catalogs for on-line purchasing through the PM system 100, configuring supplier and product preferences, or creating any other desired supplier related rule. As part of the spending control activities 802 and related configurations, for example, companies can configure authority levels in the approval and spending processes, can set up corporate spending policies, and can configure group structures by organization, project or spending categories. In short, through spending control activities 802, the PM system 100 provides the interface for an administrator or company to effect the configurations to customize and initialize the PM system 100 for company purchasing management. In addition, as the purchasing flow 800 continues along its loop, the spending control activities 802 provide the interface through which modifications, changes and updates can be made to these corporate purchasing flow configurations.

The spending control activities 802 and associated configuration utilities may include, for example, configurable purchase policies that allow companies to identify and establish various purchase rules and policies that automatically determine what is required for approval of various purchase requests. For example, such purchase policies may include the ability to determine what purchases may be automatically approved, as well as an indication of what purchases require manual approval before being purchased. In addition, the degree of manual approval may be selected, as desired, from simply approval of an amount to be spent to ever increasing details concerning the vendor or other details of the purchase.

In addition, in one embodiment of the present invention, managers may use conventional Internet browsers to navigate to a web site associated with the purchasing management system 100. Once an account is set up, the manager can perform a variety of management functions, including creating groups (i.e., departments, projects, etc.) and elements (i.e., individual users, vehicles, etc.) to place in the groups and defining budget spending limits. Groups may contain elements and/or other groups. Spending limits may be established for groups, elements, or combinations of both, individually or in aggregate. Elements can be defined as requesters or approvers or any other desired designation. The manager may then define detailed options for purchase approval including rules that determine when given purchases require manual approval. Advantageously, this network-accessible management system may be implemented with traditional network browsers without requiring special client-side software.

Example approval management features for purchasing management systems are described in more detail in U.S. patent application Ser. No. 09/409,316, entitled "Method and System for Online Business Purchasing," which is, as indicated above, hereby incorporated in the specification by reference in its entirety.

Figure 8A:
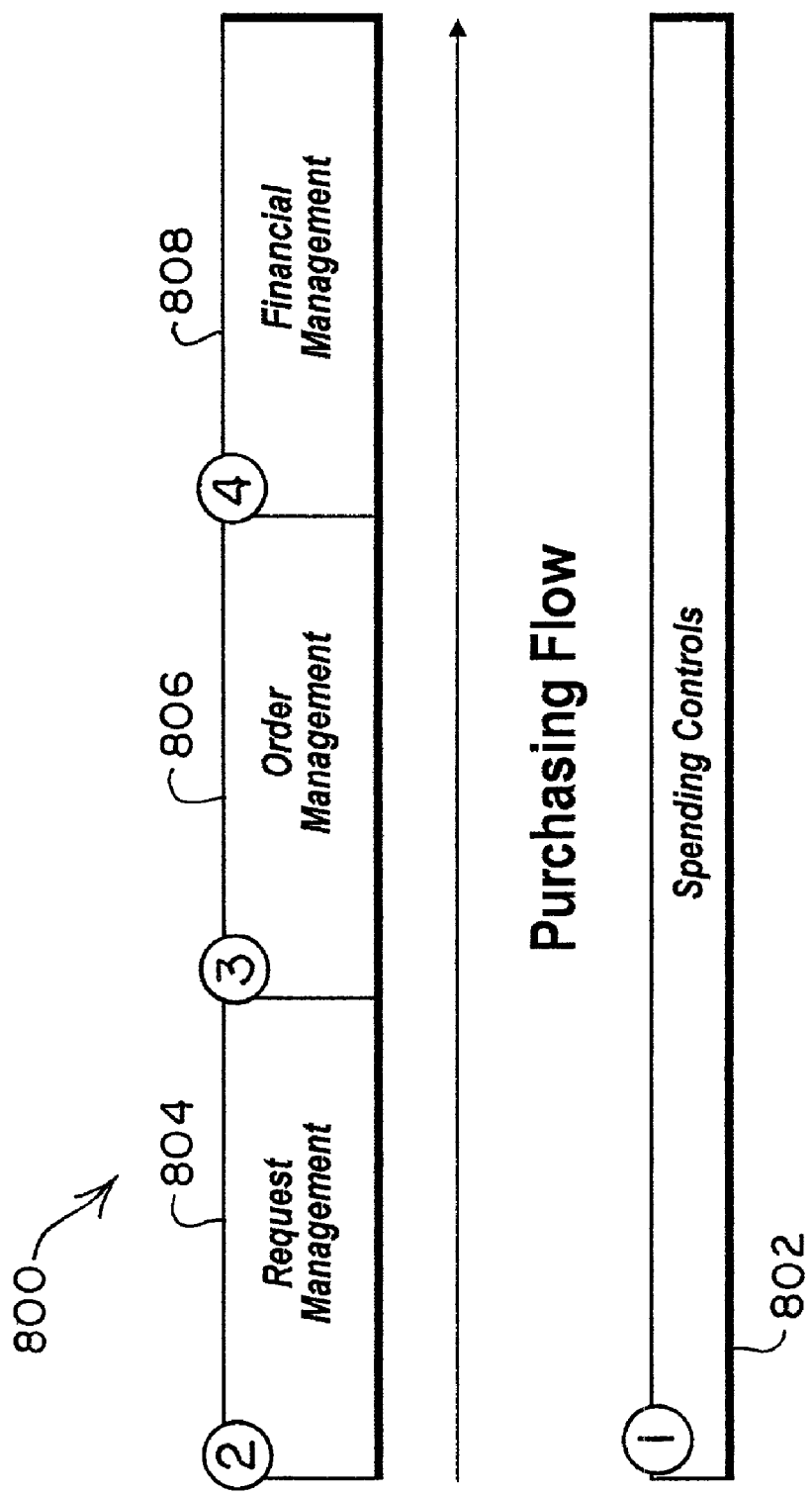
FIGS. 8A, 8B, 8C and 8D are block diagrams for purchasing flow management including spending controls, request management, order management and financial management.
Figure 8B:
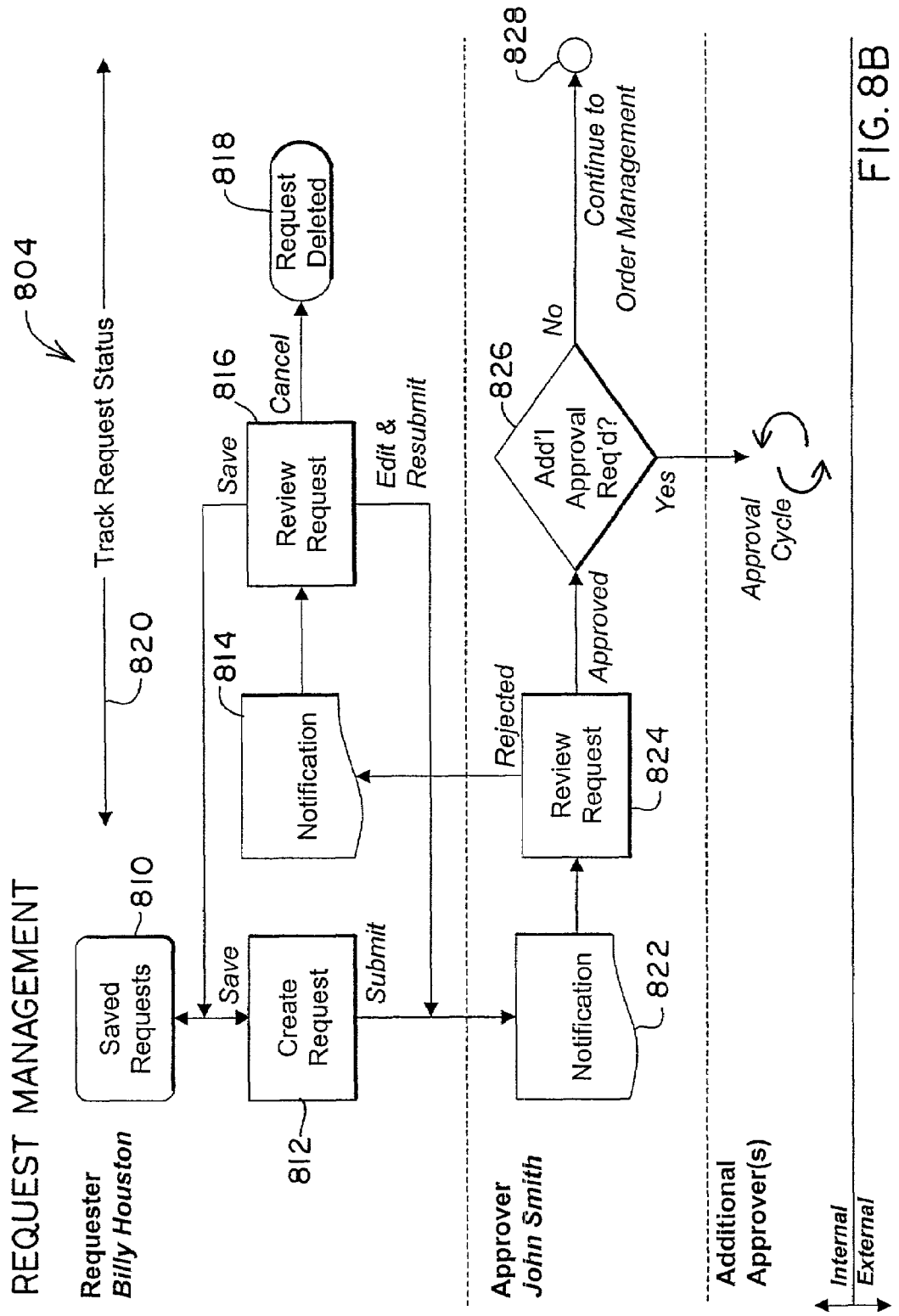

FIG. 8B provides a flow diagram that helps describe example processes that can be a part of the request management activities 804. In this embodiment, there are a Requester (Billy Houston), an Approver (John Smith) and the potential for additional approver(s). As noted at the bottom of FIG. 8B, the request management activities 804 are primarily internal corporate activities, although external requesters or approvers could be included, if desired.

In block 812, purchase requests by the Requester can be created. These requests can be saved in block 810, and the status for these purchase requests can be tracked as indicated by the Track Request Status line 820. Once the request is submitted, it is shown in block 822 that notification, such as through an e-mail notification or through another desired notification mechanism, of the purchase request can be sent to an Approver should approval be required by the rules and policies set up through the spending controls activities 802. In block 824, the purchase requests are reviewed. If rejected, flow proceeds to block 814 where notification can be sent back to the Requester that the request has been rejected. In block 816, the Requester can review the request and the rejection. If desired, the request can be edited and resubmitted. This modified request can also be saved in block 810. Alternatively the request can be canceled and subsequently deleted in block 818. If the purchase request is approved in block 824, flow can proceed to block 826 where it can be determined whether additional approval is required. If the answer is "YES," flow can proceed to an additional approval cycle as indicated in FIG. 8B. If the answer is "NO," flow can continue to order management activities 806 as represented by element 828.

Purchase request processing may also utilize approval queues. Once items are sent to the approval queues, a notification is sent to a given person who must take a given action, for example, approve the purchase selection, reject the purchase selection, or place the selection in an "on hold" status. When an approver elects to review the approval queue, a detailed view of the item to be reviewed may be provided to the approver. If a set of items are listed in the approval queue, the approver may perform a line item veto or approval on particular items. It is noted that depending upon the rules in place, one or more approvers may be notified to review the request before approval. It is further noted that a given purchase request may be separated into multiple requests due to policy rules, so that automatically approved requests are immediately processed, while others are delayed pending approval, if manual approval is required. In addition, items within each request may be logically split and managed within the server according to vendor or any other desired feature of the request.

Figure 8C:
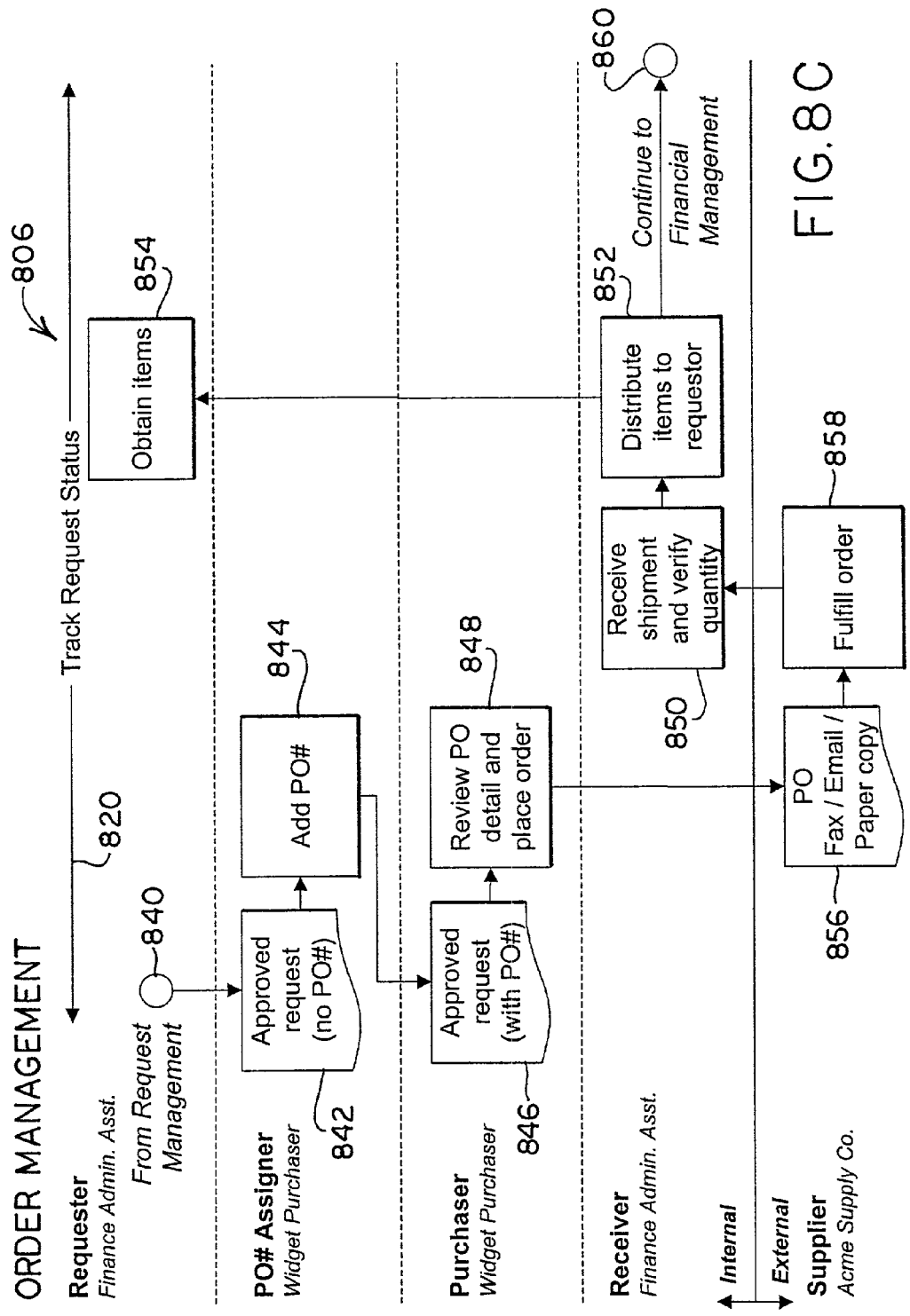

FIG. 8C provides a flow diagram that helps describe example processes that can be part of the order management activities 806. In this embodiment, there are a Requester (Finance Administrative Assistant), a purchase order number (PO#) assigner (Widget Purchaser), Purchaser (Widget Purchaser), a Receiver (Finance Administrative Assistant), and a Supplier (Acme Supply Co.). As noted at the bottom of FIG. 8C, the order management activities involve both internal and external activities, and it is noted that additional internal and external activities could be provided if desired.

In block 842, the PO# Assigner receives an approved request through node 840, which represents entry from the request management activities 804. This approved request is assumed to have no purchase order associated with it at this point in the process. In block 844, the PO# Assigner adds a PO# to the purchase request. It is noted that the PO# can also be provided in other manners, for example, the PO# can be automatically provided by the PM system 100, for example, where purchase order numbers (PO#s) are automatically assigned based upon predetermined company rules for PO numbering. In block 846, the Purchaser receives the approved request that now has an associated PO#. In block 848, the Purchaser can review the purchase order (PO) details and place the order with the Supplier. In block 856, the Supplier receives the PO through an appropriate medium, such as by fax, e-mail paper copy, or direct in-person contact. In block 858, the Supplier fulfills the order. In block 850 the Receiver receives the shipment and verifies the quantity and/or other details of the order fulfillment. In block 852, the Receiver distributes the purchased items to the Requester, and in block 854, the Requester obtains the purchased items. Throughout these processes, the status of the purchase request can again be tracked as indicated by the Track Request Status line 820. Node 860 represents flow proceeding to the financial management activities 808. It is noted that for transactions where a PO# is not desired and/or not required, such as for transactions below a dollar amount threshold, then process flow can travel directly from node 840 to block 848.

Figure 8D:
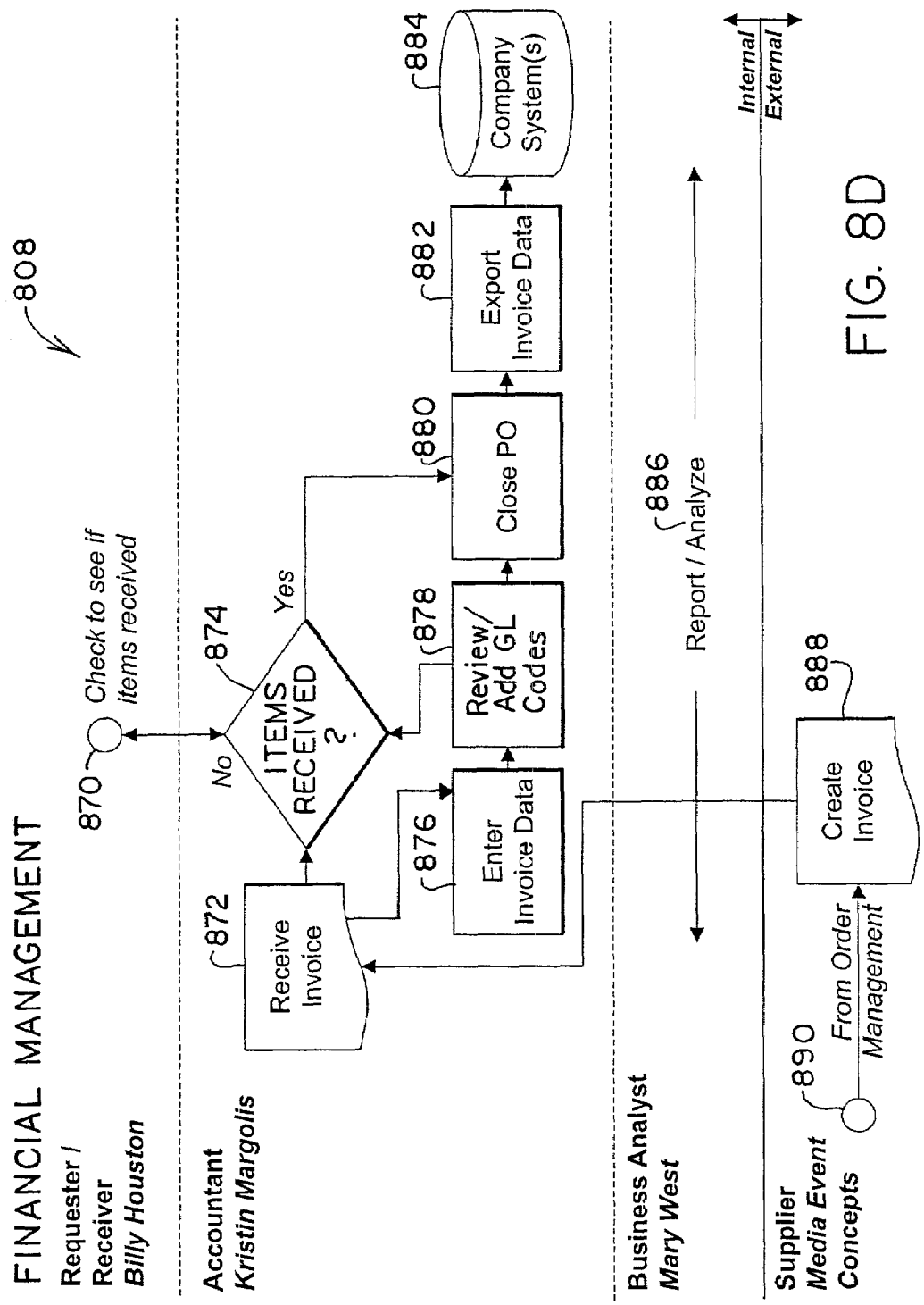

FIG. 8D provides a flow diagram that helps describe example processes that can be a part of the financial management activities 808. In this embodiment, there are a Requester (Billy Houston), an Accountant (Kristin Margolis), a Business Analyst (Mary West), and a Supplier (Media Event Concepts). As noted at the bottom of FIG. 8D, the financial management activities 808 involve both internal and external activities, and it is noted that additional internal and external activities could be provided if desired. Flow proceeds from the order management activities 806 through node 870 where there has been a check conducted to determine if purchased items have been received. Flow from the order management activities 806 also proceeds from node 890 and to block 888 where the Supplier may create an invoice for the purchased item. In block 872, this invoice is received by the Accountant and flow can proceed to block 874. In addition, this invoice data can be manually entered into the accounting system in block 876, or it can be received electronically into the accounting system from the supplier as represented by the line from block 872 to block 876. In block 878, the invoice data can be reviewed, and general ledger (GL) codes can be added if desired. Flow can then proceed to block 874 and 880.

In block 874, a determination is made whether the items purchased have been received. If the answer is "NO," then queries are made back to the Requester through node 870. If the answer is "YES," then flow proceeds to block 880 where the Accountant closes the purchase order (PO) in the accounting system. In block 882, invoice data can be exported to corporate accounting systems, such as company system(s) represented by item 884. In addition, other financial management activities can occur such as having the Business Analyst analyze and report on company expenditures as represented Report/Analyze line 886. From here, the purchasing flow processing can begin again with the spending control activities 802, if review, updates or modifications are desired to the corporate spending control configurations.

In addition, it is noted that the purchasing flow 800 represents ongoing activities that can be occurring simultaneously and in parallel as the corporation proceeds in its purchasing activities. The example purchasing flow 800 is not intended to be a restrictive example, but merely to provide an example of activities that can be implemented through the PM system 100.

As discussed above, purchasing management system 100 is preferably an Internet-delivered application that facilitates a company's financial control, insight and agility with respect to managing purchases. The purchasing management system 100 helps enforce company fiscal policy so that purchase requests can be approved prior to purchase, ensuring compliance in advance of spending. A purchase-data report download feature of purchasing management system 100 can be provided to allow accounting personnel to download information concerning these approved purchase requests, including accounting codes, automatically into accounting software, reducing entry time and errors. The purchasing management system 100 thereby streamlines approval cycles, so involvement of purchasing and financial managers is reduced to handling policy exceptions, such as requests over a certain dollar amount.

The purchasing and dynamic payment card management system of the present invention also provides purchase request synthesis for purchases made under general pre-approved card constraints. As discussed with respect to the Company Example below, dynamic payment cards may be set-up with some level of approved spending without requiring the user to go through the purchase request approval process. If a user makes such a transaction, that purchase will typically not have a purchase request or purchase order associated with it. Using data provided from the card processing system 130, the purchasing management system 100 can synthesize a purchase request and/or a purchase order for this transaction. This synthesized purchase request/order can then be used by a company's accounting system so that the transaction can be reconciled against a purchase request/order, as desired. In this way, a wide variety of advantageous synthesized information can be provided to a company for their tracking, accounting, or other purposes. The purchasing management system 100 can also include a purchasing dashboard to give financial managers one-click access to a consolidated view of up-to-date purchasing information for the entire company according to a variety of desired organizational parameters, for example, by employee, department, product category, cost center or other desired criterion.

The dynamic payment card and purchasing management system 100 of the present invention advantageously provides a revolutionary purchasing card vehicle that can replace traditional static purchasing card constraints with dynamic purchasing rules. The purchasing management system 100, which delivers the ability to dynamically manage the dynamic payment card to allow execution of any company approved transaction, controls the dynamic payment card constraint and approval parameters stored at the card processor or card processing system 130. The dynamic payment card of the present invention also preserves existing purchasing card functionality including standard credit limits on a per card basis. And it enables high control scenarios where cards with zero available credit could be distributed to a broad set of employees. Once an employee has submitted a request and received approval, the purchasing management system 100 can dynamically manage the dynamic payment card through a card processing system 130. When the purchase is initiated, the card processor approves the purchase if it falls within the approved parameters. Advantageously, this dynamic payment card platform of the present invention resolves control contradictions by enabling a company to choose a high degree of control without sacrificing desired efficiencies. This dynamic control has the effect of making the dynamic payment card of the present invention an advantageous solution for the primary payment instrument for all company purchases (including high dollar purchases).

The dynamic control available through the present invention also allows payment cards to be billed to the company yet have a declining balance characteristic of traditional company credit cards. For example, a user can use the dynamic payment card to make purchases based upon pre-approved spending authority set on that dynamic payment card. As these purchases are made, they count against the available pre-approved credit or velocity that has been set up for this card. Upon approval of the expenditure or at some other point in the purchasing management process, the purchases can be cleared from the card, thereby increasing or restoring the available credit and purchasing authority for the user's dynamic payment card. The result is a declining approval balance type feature and associated purchasing control that provides employees a limited ability to incur company expenditures without personal reimbursement worries, while maintaining dynamically managed credit and velocity levels for each employee. Thus, the present invention provides a vehicle for controlling expenditures through the dynamic control of the card's constraints, while still providing some level of pre-approved spending authority. For example, with respect to travel and entertainment (T&E) expenditures, this pre-approved spending authority coupled with adding back transaction amounts once those have been approved, matched or otherwise processed within the purchasing management system, allows employees to make T&E expenditures that can be ultimately processed by the system, while still freeing the employee from having to worry about being reimbursed for T&E expenditures.

With this declining approval balance feature, therefore, the user can be "trusted" by the company to obligate the company for a finite amount of money. The selection of that finite amount can be controlled by the purchasing management system settings for that user's dynamic payment card and may vary by MCC group or any other control factor available on the dynamic payment card. For example, a user might have an available velocity of $5,000 for T&E MCC or SIC codes, but $0 for all other MCC or SIC groups. In that respect, the user could spend up to $5,000 on T&E items without requiring pre-approved requests and that user's available velocity and/or credit limit would decline accordingly. Correspondingly, that same user could not spend anything on office supplies without a pre-approved request, which would add available velocity in the appropriate MCC group. Further examples of card settings and transactions are set forth in TABLE 2 and discussed in the transaction examples below.

In addition, as stated above, post-transaction requests may also be synthesized for expenditures, such as T&E or other expenditures made without pre-approval using pre-approved spending authority. For example, with respect to I&E MCC groups where a user's "trusted" velocity is maintained by the purchasing management system 100, each T&E transaction reported by the card processing system 130, such as the TSYS card processing system, can result in a synthesized request, presenting all or some desired representation of the data supplied by the TSYS card processing system transaction logs. In addition, additional transaction information, such as transaction details, accounting or GL coding, justifications or any other information, may be requested or required from the user with respect to the purchases on the synthesized request, which may then be forwarded on for approval or other processing through the purchasing management system. When each justified expense is approved or at another desired point in the process, the purchasing management system 100 can reinstate that amount of velocity on that MCC group through appropriate messages and commands to the card processing system 130. This declining balance approach and the ongoing control and re-instatement of post-facto approved transactions to the available velocity for the pre-approved spending authority provides an advantageous and flexible control feature for the purchasing management system 100.

FIG. 2 is a flow diagram for purchase request processing 200 that more generally utilizes dynamic payment identifiers and approval parameters, according to the present invention.

Initially, in block 202, users or other elements (people, equipment, vehicles, buildings, or any other desired person, place or thing) may be provided or assigned one or more dynamic payment identifiers. As indicated above, magnetic-strip cards with unique numbers can be utilized to provide a dynamic payment identifier. Advantageously, dynamic payment cards according to the present invention may be used within existing credit card processing infrastructures. Moving to block 204, a user may then begin the process by generating a purchase request using a dynamic payment identifier. This purchase request can identify purchase information, such as vendor, product or service to be purchased, quantity, pricing, justification, or any other desired information. It is noted that instead of utilizing the dynamic payment identifier in block 204, the dynamic payment identifier may associated with a purchase request at some other point in the process, as desired, for example, in block 208 where a purchase request has already been approved. In block 206, this purchase request is reviewed according to company policies and rules that are in place, and the purchase request is ultimately rejected or approved. If the request is rejected, flow passes to block 230. As block 230 indicates, a new or modified purchase request is required for a user to continue with obtaining approval to complete the desired transaction.

If the purchase request is approved, either in whole or in part, flow passes to block 208, where a purchase order is generated. This purchase order represents the details of the requested transaction. As a result of the purchase request processing, and as represented in block 208, approval parameters are also generated and associated with the purchase request and purchase order. These approval parameters may include any of a variety of details, including the time within which the transaction must be completed, approved vendors, approved transaction amounts, or any other desired transaction limitation or requirement. Thus, once approved, each purchase request has associated with it a set of dynamic approval parameters, a purchase order, and a dynamic payment identifier. This information is provided to block 220 for further processing and reconciliation.

In block 210, the dynamic approval parameters are provided to the dynamic payment processing system that will process the transaction, along with the associated dynamic payment identifier and any other desired information. These approval parameters, which represent approval requirements for a given purchase order, are then dynamically stored with respect to the dynamic payment identifier used for the purchase request in block 204. The storing of these dynamic approval parameter can be implemented, for example, through a review by the purchasing management system of the approval parameters that are associated with the dynamic payment identifier and that are currently stored by the processing system and then through appropriate parameter management commands, such as add, delete or modify commands, sent by the purchasing management system to the processing system to cause to be stored approval parameters in a state that will allow the approved transaction to proceed. In block 212, the user initiates a transaction utilizing the dynamic payment identifier, which may be, for example, a dynamic payment card. In block 214, the transaction details are correlated to the dynamic approval parameters stored for that dynamic payment identifier. It is noted that each dynamic payment identifier may have a plurality of different sets of approval parameters with one set being associated with each approved transaction and related purchase order. Thus, the correlation that occurs in block 214 would be to identify which set of approval parameters should be used for the initiated transaction. For example, vendor information may first be utilized to limit the initiated transaction to a reduced number of the sets of approval requirements. From there, transaction amount or product/service types may be utilized to further determine which set of approval requirements to utilize. Alternatively, another identifying number or other identifier could be stored and utilized to directly relate initiated transactions with approved purchase orders.

In block 216, the transaction is reviewed or processed by the dynamic payment processing system to determine if the transaction falls within the approval parameters. If the transaction falls outside of these parameters, flow passes to block 224 where the transaction is rejected. From there, decision block 226 provides a mechanism to determine if additional transaction attempts are to be allowed. For example, if a transaction amount parameter were exceeded, a "yes" could be determined, and flow could then pass back to block 212 where the user could try to initiate an appropriate transaction. As a further example, if a time limit parameter could have been exceeded, a "no" could be determined, and flow could then pass back to block 230 wherein a new purchase request would be required.

Looking back to block 216, if the transaction does fall within the approval parameters, flow passes to block 218 where the transaction is completed. The transaction details are provided back to the purchasing management system, and in block 220, the transaction is reconciled with the purchase order and other information provided previously from block 208. Once transactions are reconciled, accounting details may be reported to clients, as indicated by block 222. It is noted that multiple purchase requests from multiple users may be simultaneously processed through the purchase request processing flow 200, so that the reporting in block 222 can include, for example, a monthly statement of all client transactions that have utilized the dynamic payment identifier.

FIG. 4 is a block diagram for purchase request process flow 400 including alternative transaction paths, according to the present invention. The process flow 400 begins with block 402 where a purchase request is received for a product and service. Moving on to block 404, the purchase request is processed and a positive or negative approval response is completed. As discussed herein, it is contemplated that the purchase request in block 402 may take a wide variety of forms, from a specific request for a product or service at a particular price from a particular vendor to a general request for an amount of money to be used to meet some specified need. In turn, the approval processing in block 404 considers these widely varying requests and provides a response that may also vary widely in specificity. For example, the approval may range from approval for a specific product or service from a specific vendor for a specific price to approval for an allocation of an amount of money for the purchase of a product or service to meet an approved need. In block 406, the buyer, or an agent acting in a manner similar to a traditional buyer, may perform the buyer's; typical role of selecting and performing the purchasing act. This step may be bypassed through some type of pre-selection or automatic product selection, or it may be omitted if specifying the specific goods or services to be purchased is not necessary.

Decision block 408 is used to determine how the transaction is processed to completion. In block 408, a decision is made whether the dynamic payment card is to be utilized. If the dynamic payment card is not to be utilized, flow passes to block 418 where an order is placed with the vendor, for example, through a printed document, facsimile transmission, phone call, on-line access, in person or through any other desired medium. In block 420, the product or service is delivered. In block 422, an invoice may be directly sent by the vendor, and somewhat in parallel, in block 428, the user exercises the role of receiver of the products and services, acting to verify receipt of the goods or services. In block 424, the user exercises the accounting role of matching and correlating the various aspects of the purchase, for example, the received products and services, the purchase request, the approval conditions, the purchase order, and the invoice from the vendor. From this point, in block 426, any necessary payment may be finalized or made to the vendor. It is again noted that these process flow blocks are representative and are not intended to designate an absolute process flow. Variations may be implemented, as desired.

Referring now back to block 408, if a dynamic payment card is to be utilized, flow passes to block 410. By utilizing the dynamic payment card of the present invention, companies may manage a broad range of transactions where purchasing management is desired. As discussed above, the dynamic payment card represents a unique payment identifier that can be associated with dynamic approval parameters, including a set of dynamic approval parameters for each approved purchase request. These approval parameters may be, for example, approved vendors, dollar amounts, product types, numbers of items, date or time by which the purchase must be made, or any other desired approval criteria. Thus, when a transaction is initiated by an individual possessing a dynamic payment card, approval of the transaction may be controlled based upon the approval information associated with the card and the particular purchase request for which the transaction is being initiated. In this way, a company or entity may manage purchases, for example, through network accessible rules and processes, regardless of what product or service is being requested in the purchase request and regardless of the sales channel from which product or service is to be purchased.

In block 410, the approval parameters are injected into the card processing system and associated with the appropriate dynamic payment card. In block 412, the user of the dynamic payment card places an order with the supplying vendor, for example, through a printed document, facsimile transmission, phone call, on-line access, in person or through any other desired medium. The dynamic payment card is utilized in this purchase as the payment vehicle. In block 414, the product or service is delivered, although it is noted that this delivery may occur at any place in the process flow, and does not need to occur at the time of purchase. In block 416, the vendor charges the dynamic payment card. If the charge is approved after correlation and review of the transaction details with the appropriate set of dynamic approval parameters for that dynamic payment card, flow proceeds along two somewhat parallel paths to blocks 432 and 430. If the transaction is not approved based upon the approval information associated with the dynamic payment card for that purchase, the process terminates in block 417 based upon the indication of no approval.

If the process continues, in block 428, a user may exercise the role of receiver of the products and services, acting to verify receipt of the goods or services. Somewhat in parallel, in block 432, card report processing provides information concerning various transaction details, for example, the vendor name, vendor type, amount charged or other transaction details. In block 434, the credit balance may be decremented. In block 436, a monthly statement or invoice is provided to the customer. This can be done, for example, through reporting or business document exchange (BDX) that provides general ledger (GL) distribution. It is noted that this monthly statement may be generated by the purchasing management system 100, so that a company or entity may have all of its purchases designated on a consolidated statement. In block 430, the users may exercise the accounting role of matching and reconciling the various aspects of the purchase, for example, the received products and services, the purchase request, the approval conditions, the purchase order, and the invoice from the vendor. From this point, any necessary payment may also be finalized or made to the vendor. It is again noted, that these process flow blocks are representative and are not intended to designate an absolute process flow. Variations may be implemented, as desired.

FIG. 3 is a block diagram representing various potential sources for purchase request forms 320 that are injected as purchase requests into the purchasing management environment 100, according to the present invention. It is noted that the source of the purchase request form or the market from which the product or service will be ultimately purchased is not significant to the current invention. The present invention allows for efficient management and control of all purchases so long as a purchase request for a desired purchase is injected in some manner into the purchasing management system 100 so that it may be processed according to company purchasing policies and rules.

Referring now to FIG. 3, request form generation or origination environment 300 includes a wide variety of sources from which purchase request forms 320 may be generated or originated. Once a purchase request form is generated or originated in block 320, this purchase request may be injected into the purchasing management system 100 for processing. To provide for broad purchasing coverage, the environment 300 contemplates purchase requests originating from any source, including Internet enabled markets and other markets. Significantly, according to the present invention, once the purchase request has been generated, the purchase may be managed, regardless of the source of the purchase request.

In the embodiment depicted, Internet enabled or network accessible markets 315 may generate purchase request forms for the purchasing management system 100 through a software link, such as merchant APIs (Application Program Interface commands) 318. Examples of such network enabled markets 315 include electronic marketplaces 310, such as catalogued marketplaces that provide network accessible products and services that may have been identified and listed for purchase by a user. These catalogued marketplaces may include general marketplaces with one or more individual lists or groupings of products and services and may include branded marketplaces with one or more vendor-specific lists or groupings of products and services offered under a particle vendor brand. Catalogued marketplaces are discussed, for example, in co-pending U.S. patent application Ser. No. 09/409,316, entitled "Method and System for Online Business Purchasing."

In addition, Internet merchants 312 provide network accessible or Internet enabled markets that may be linked to the purchasing management system 100 of the present invention through merchant APIs 318. Still further, traditional non-Internet enabled merchants 314 may be linked through additional software and APIs. Such non-Internet enabled merchants may also be linked through the use of hosted catalogs 316 that may be made available to Internet users. In short, Internet enabled markets, which allow for access through the Internet, may be linked to the purchasing management system 100 through merchant APIs 318 or any other desired connection mechanism.

In addition to generation of purchase requests through these Internet enabled markets 315, purchase requests may be generated from other sources or markets 305, including through a web interface 308. Examples of other markets 305 are open requests 302 that can, for example, include user generated purchase requests and requests created through free form text entry. These requests are not required to take a pre-defined form and may be generated by the user through the web interface 308. In addition, user-customized catalogs 304 may be utilized to generate purchase requests through the web interface 308. Also, vendors or suppliers may provide a supplier interface 306 through which purchase request forms may be provided for its customers, so that the user may simply use a supplier interface to generate a purchase request form for block 320. It is noted that the open request block 302, the custom catalogs block 304 and the supplier interface block 306 represent only examples of other sources for purchase requests and should not be taken as being an exclusive group. It is further noted that purchase request may be generated through mediums other than a web interface 308, such as through phone calls and facsimile transmissions, for ultimate injection into the purchasing management system 100, according to the present invention.

In short, the manner in which a purchase request is generated for injection into the purchasing management system 100 is not significant as long as a purchase request is generated in some form that may be processed by the purchasing management system 100. Once in the purchasing management system 100, the purchase request may be efficiently managed, according to the present invention, regardless of its source.

COMPANY EXAMPLE

ACME Rocket Products

To further describe the present invention, the following COMPANY EXAMPLE is provided for a fictitious company. In addition, fictitious employees for this company are identified in TABLE 2. These employees play varying roles in the company and have associated spending needs associated with those roles. Finally, a number o f transaction examples are provided, along with FIG. 6A, FIG. 6B, FIG. 7A and FIG. 7B to further provide examples for the dynamic payment card management system of the present invention. For this COMPANY EXAMPLE below, the fictitious company called ACME Rocket Products (ACME) and a fictitious financial institution called PartnerBank are utilized.

ACME is a 300-person company with diverse indirect and direct purchasing needs including, but not limited to, technology products, office products, industrial products, and travel and entertainment (T&E). Direct spending is often used to refer to direct company expenditures, such as expenditures for raw materials or components that are needed for the production of goods. Indirect spending is often used to refer to non-direct company expenditures, such as travel and entertainment expenditures, industrial supplies, computer systems, office supplies and other indirect expenditures. PartnerBank will likely possess the capability of issuing commercial card programs. PartnerBank may also be allowed by the provider of the dynamic payment card management system to sell or offer the services of the platform to its payment card customers. Though their relationship with PartnerBank, ACME has chosen to use the dynamic payment card in conjunction with the purchasing management system 100. ACME has adopted the purchasing management system 100 with dynamic payment cards through interaction with PartnerBank, and PartnerBank has established a dynamic payment card program, with company billing, for ACME. In the examples below, the primary features utilized for control of the dynamic payment card (DPC) include, but are not limited to, are velocity settings, transaction size settings, SICs (Standard Industrial Codes) or MCCs (Merchant Category Codes), and credit limits. As indicated above, velocity represents an availability control for throttling spending, and velocity is typically described in dollars and numbers of transactions and can be specified by time period or aggregated over the life of the card.

Profile for ACME Rocket Products—In evaluating ACME's risk profile, PartnerBank has set the master credit limit for ACME's dynamic payment card program to be $200,000. ACME's CFO, Fran Finance, has set general purchasing policies for the company and individual policies for certain key roles. To illustrate some of these policies, examples are shown under the "Policy Controls" section of TABLE 2 below. TABLE 2 shows the policies and initial dynamic payment card parameters applied to each of the users below in accordance with Fran Finance's policies. It is noted that the SIC codes identified in TABLE 2 and below could also be MCC codes or any other merchant identifiers desired to be utilized. As noted above, although TABLE 2 provides for management of some control settings, such as velocity, on a per-slot basis, these control settings could also be managed on a per-card level.

Profile for User Mary Marketing—Mary is a member of the marketing department. Mary does not have predictable spending needs. All of Mary's purchases must have prior approval by ACME's VP of Marketing.

Profile for user Ann Admin—Ann is an administrative assistant who regularly arranges for catered lunch meetings and has been allocated a budget of $300 per month for these expenses.

Profile for User Tom Technology—Tom is the IT Buyer for ACME. He is responsible for all IT purchases within the ACME organization. Tom has been authorized by ACME's CFO to spend a discretionary $20,000 per month on technology products in increments of $5,000 or less. These purchases must be justified and reconciled by Tom at the end of every month. Any individual purchases over $5,000 or aggregate monthly spending in excess of $20,000 require prior approval by the CFO. Non-technology purchases require prior approval by Tom's supervisor.

Profile for User Sam Shopfloor—Sam is a facilities engineer for the shop floor. Sam generally does not get involved in purchasing, but has the approval of the CFO to make emergency purchases in the case of critical downtime of manufacturing equipment. The CFO has authorized Sam to make emergency expenditures of up to $10,000 to keep the plant up and running. These emergency expenditures must be justified within 24 hours. All other expenditures must be pre-approved before they can be made.

Profile for User Sally Sales. Sally is a sales executive who incurs travel and entertainment expenses on a regular basis. Periodically Sally will make purchase requests outside of the T&E category that require approval.

TABLE 2

ACME Rocket Products User Profiles

| User Name | User Type | Policy Controls | Baseline Card Setup |
|---|---|---|---|
| Mary Marketing | Requester | No spending without pre-approval | Credit limit of $5,000<br>Card Level: All SICs with aggregate velocity of 0 transactions and $0 |
| Ann Admin | Requester | $300/month on food service; Food service items do not require justification after the fact; All other spending requires pre-approval. | Credit limit $5,000<br>Slot 1: Food service SICs with a velocity of $300/month<br>Slot 2: All SICs with aggregate velocity of 0 transactions and $0 |
| Tom Technology | Buyer/ Requester | Discretionary spending of $20,000/month on technology with a maximum discretionary transaction size of $5,000; Purchases outside of these limits require pre-approval; All purchases require both justification and reconciliation before processing by accounting. | Credit limit $30,000<br>Slot 1: Technology SICs with a velocity of $20,000/month and a maximum transaction size of $5,000<br>Slot 2: All SICs with aggregate velocity of 0 transactions and $0. |
| Sam Shopfloor | Requester/ Buyer | All non-emergency spending requires pre-approval; Emergency credit limit of $10,000 constrained to industrial products. | 2 Cards:<br>Card 1 - Credit limit $5,000<br>Card Level: All SICs with aggregate velocity of 0 transactions and $0<br>Card 2 - Credit limit $10,000<br>Slot 1: Industrial products SICs with aggregate available velocity of 1 transaction |
| Sally Sales | Requester (T&E) | Discretionary spending of $5,000/month on T&E items; All other purchases require pre-approval. | Credit limit $10,000<br>Slot 1: T&E category SIC codes with aggregate velocity constraint of $5000<br>Slot 2: All SICs and aggregate velocity of 0 transactions and $0. |

To configure these initial settings at the card processor, appropriate function calls can be made by the purchasing management system 100 to the card processing system 130. For example, with the TSYS processing platform interface discussed above, management and control commands may be utilized.

Using the example users for ACME rocket as set forth in TABLE 2, a set of sample transaction scenarios for each of these users are discussed below along with dynamic payment card management actions. Technical interfaces, such as card issuance and the reporting coming from the purchasing card processor, may be similar to card processing functions that card processors, such as TSYS, provide for banks today. These technical interfaces are known by those who utilize the respective card processors and are not repeated here.

TRANSACTION SCENARIO EXAMPLE
1A—ANN ADMIN

Ann Admin needs to order a sandwich tray from the local deli to support a lunch meeting. In this example Ann is still within the constraints of her budget. Ann calls the deli, places the order, which totals $34.59, and gives the deli her dynamic payment card number. The deli charges Ann's dynamic payment card, for which the card processor finds sufficient credit and velocity available in slot 1, and the deli charges the card and delivers the sandwiches.

When the card processor does its processing, the purchasing management system 100 is notified of this transaction. Since there is no corresponding purchase request, the purchasing management system 100 synthesizes a purchase request for Ann and attaches the transaction information to the synthesized purchase request for later reconciliation into ACME's accounting system.

The purchasing management system 100 will notify Ann, for example by e-mail, that the transaction was completed and can offer her an HTML hyper-link into the purchasing management system 100 to add justifications (if required by the company) for the transaction, additional transaction details, accounting or GL coding, or any other desired or requested information. This notification will also inform Ann of her remaining food service budget for that billing cycle. Subsequently, this payable item flows into ACME's accounting system via the purchasing management system 100 and when ACME receives their statement from PartnerBank this charge appears and is reconciled.

Figure 6A:
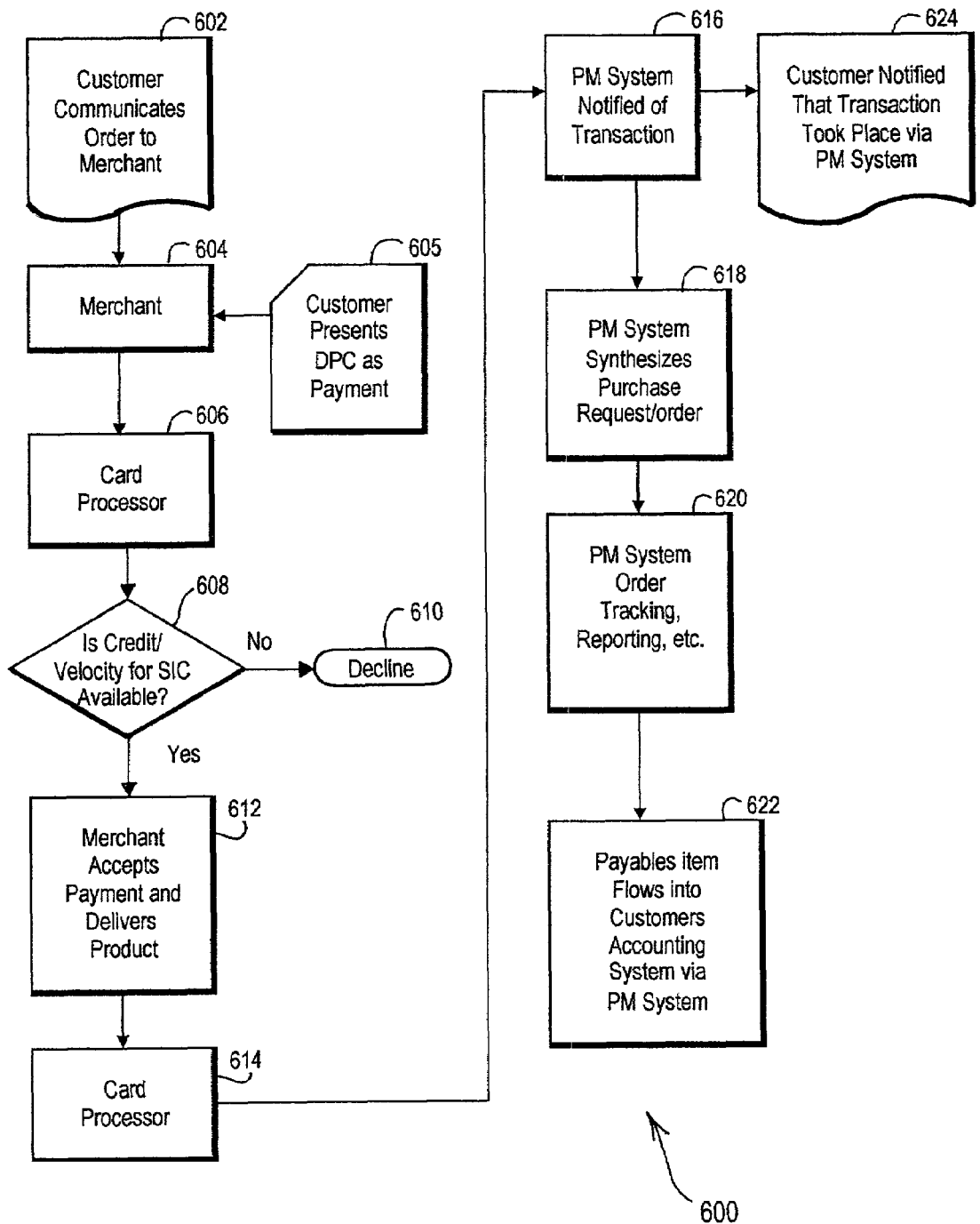
FIG. 6A is a flow diagram for dynamic payment card processing where the user has initiated a purchase that is expected to fall within pre-approved product categories.

FIG. 6A provides a graphical depiction further explaining the transaction processing for this example transaction. In particular, FIG. 6A is a flow diagram 600 for dynamic payment card processing where the user has initiated a purchase that is expected to fall within approved product categories. In block 602, a customer (or user) communicates an order to a merchant (or vendor). In block 605, the customer presents a dynamic payment card (DPC) as payment for the order. It is noted that this transaction order and payment presentation may occur in any of a variety of ways, including in-person order and payment, remote order and in-person payment, or in any other desired manner. It is also noted that relating this transaction to FIG. 5B, the approval process flow would be associated with the reverse flow path 556 because the user or customer has proceeded without first generating a purchase request. Approval processing would be expected to occur after the transaction, for example, through purchase request synthesis.

The merchant receives the order in block 604 and communicates in block 606 with a card processor. In decision block 608, the card processor looks to the card settings to make a decision concerning approval. In the example shown, the card processor looks to credit and velocity settings for the SIC associated with the initiated purchase. If the transaction does not fall within these settings, the initiated transaction is declined in block 610. If the transaction does fall within the settings, then the transaction is authorized by the card processor.

Next, in block 612, the merchant accepts payment and delivers the product or attends to delivery of the product. The card processor then receives an indication that the transaction has been completed in block 614. In block 616, the card processor then notifies the purchasing management (PM) system 100 of the transaction. In block 624, the customer is then notified through the PM system 100 that the transaction has occurred.

The PM system 100 can also synthesize a purchase request and purchase order for the transaction in block 618. Because the initiated transaction took advantage of card settings that set up Ann as a buyer role for certain services so that the card had pre-approved spending capabilities, there was no purchase request that was approved prior to the transaction. For accounting and approval purposes, it is advantageous for a purchase order and request to be generated for this transaction. As such, the PM system 100 synthesizes a purchase request and order from the transaction data that is received from the card processor 130. Thus, purchase policy rules can then be applied, if desired, post-transaction. Finally, in block 620 of FIG. 6A, the PM system 100 can track the order, report transaction details, and provide any other desired status or transaction information. Then, the PM system 100, in block 622, can have payable items flow into the customer's accounting system. The customer may then make payment to the card issuer.

TRANSACTION SCENARIO EXAMPLE
1B—ANN ADMIN

Ann Admin needs to order another lunch in for the ACME board meeting. In this example Ann does not have enough of her monthly food budget remaining to cover this purchase. Ann creates a Purchase Request in the purchasing management system 100 requesting approval with the following justification: "Fran, it's been a busy month with all of these customer visits and I have nearly exhausted my catering budget. I need your approval to spend an additional $100 on lunch for the board. Thanks, Ann."

Fran approves this request and, upon approval, the purchasing management system 100 checks the available velocity on slot 1 of Ann's dynamic payment card finding that she has $37.89 of available velocity for food service. The purchasing management system 100 increases the available velocity on Ann's dynamic payment card by $100 (to a total of $400 for the month).

To accomplish these setting changes, appropriate function calls can be made by the purchasing management system 100 to the card processing system 130. For example, with the TSYS processing platform interface discussed above, management and control packets can be used to obtain current velocity settings and to update those settings.

Ann is informed that her request has been approved and her dynamic payment card has been enabled for an extra $100. Ann makes the order with the caterer. Lunch is delivered and the caterer charges Ann's dynamic payment card for $87.50. The card processor determines that there is available velocity on slot 1 of Ann's dynamic payment card to cover this transaction, so the transaction is successful. Ann's dynamic payment card is charged for $87.50, leaving her remaining velocity of $50.39 for the remainder of the cycle.

When the card processor does its processing, the purchasing management system 100 is notified of this transaction and attaches the transaction information to Ann's purchase request for later reconciliation into ACME's accounting system and/or the transaction information can be correlated to Ann's payment card for future matching and reconciliation activities. The purchasing management system 100 notifies Ann that the transaction was completed and will offer her an HTML hyper-link into the purchasing management system 100 for follow-up actions on this purchase as driven by the company's purchasing policy.

Subsequently, this payable item flows into ACME's accounting system via the purchasing management system 100 and when ACME receives their statement from PartnerBank this charge appears and is reconciled. At the end of the billing cycle, the purchasing management system 100 will reset the slot 1 velocity on Ann's dynamic payment card to $300. It is again noted that this resetting of payment card control settings may be done at other points in the process as desired.

Again, to accomplish these setting changes, appropriate function calls can be made by the purchasing management system 100 to the card processing system 130. For example, with the TSYS processing platform interface discussed above, management and control packets can be used to obtain current velocity settings and to update those settings. In addition, a function can be provided by the card processor to allow automatic adjustments to reduce velocity accruals so that adjustment and readjustment to the velocity setting would not be necessary. This function call, for example, would effectively create headroom under the current velocity setting and not require the velocity to be readjusted downward to $300 at the end of the cycle.

Figure 6B:
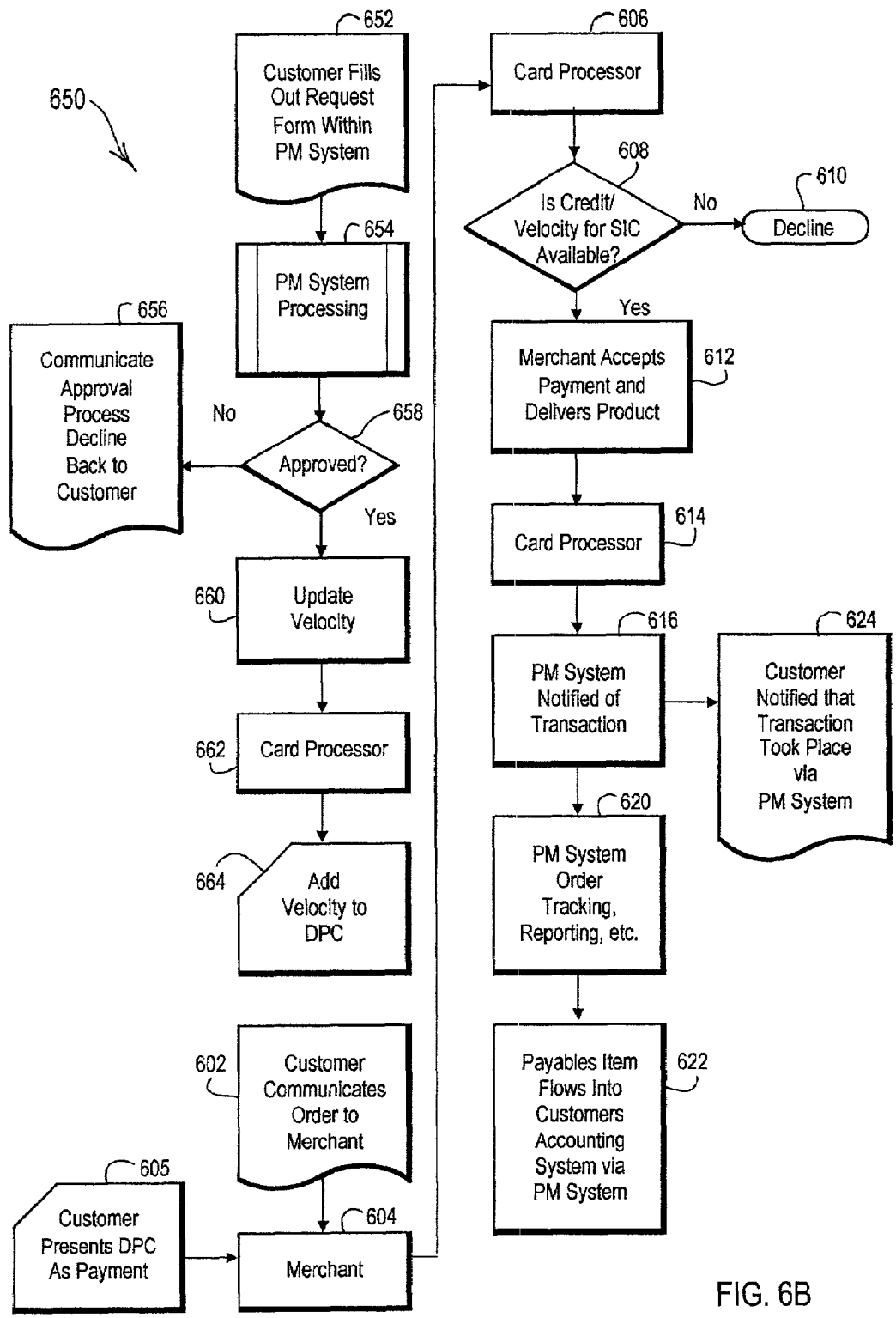
FIG. 6B is a flow diagram for dynamic payment card processing where the user has initiated a purchase that is based upon a purchase request that has been processed by the purchasing management system.

FIG. 6B provides a graphical depiction further explaining the transaction processing relating to this example transaction scenario. In particular, FIG. 6B is a flow diagram 650 for dynamic payment card processing where the user has initiated a purchase that is based upon a purchase request that has been processed by the purchasing management system or upon a purchase that is expected to fall within approved product categories. FIG. 6B is similar to FIG. 6A in many respects, although block 618 for request/order synthesis has been left out of processing flow 650 for simplicity. As additional processing, there are blocks that allow for a purchase request through the PM system 100 to be the mechanism for gaining card approval. It is noted, therefore, that relating this transaction to FIG. 5B, the approval process flow would be associated with either the forward flow path 554 or the reverse flow path 556 depending upon how the user used the card. If a pre-transaction purchase request were utilized, approval would be expected to occur prior to the transaction. If pre-approved spending authority were utilized, as with FIG. 6A, approval processing would be expected to occur after the transaction, for example, through purchase request synthesis.

In particular, in block 652, the customer fills out a request form within the PM system 100, as described above. This purchase request is processed in block 654 by the PM system 100 according to the appropriate purchase policies as set up by the company. In block 658, a decision is made to approve or not approve the request. If the request is not approved, the PM system 100 communicates back to the customer in block 656 that the request has been declined by the approval process. If the request is approved, the PM system 100 automatically determines what updates to the card settings will allow the transaction to be approved by the card processor 130 when the transaction is actually processed. In FIG. 6B, this setting is depicted as the "velocity" setting in block 660 because it is one that will allow the purchase requested by Ann to take place. This card setting is provided at the card processor in block 662, and the card processor then adds or updates the velocity setting to the appropriate dynamic payment card (DPC) in block 664.

TRANSACTION SCENARIO EXAMPLE 2—MARY MARKETING

Mary Marketing needs to get a print run of company collateral for an upcoming trade show. Mary has been informed that the company will be participating in the Rocket Expo tradeshow and has been tasked with getting collateral materials for the company booth at the show. Mary has determined the size of the print run she needs and that the cost including shipping will be $1,500. Mary creates a Purchase Request in the purchasing management system 100 and submits it for approval. This request is validated against the company's purchasing policies and it is determined that she needs approval from the VP of Marketing. The VP of Marketing is immediately notified, for example through e-mail or phone call, that he has a purchase request to approve and approves this purchase.

Upon approval of this purchase request, the purchasing management system 100 increases the aggregate card level velocity of Mary's dynamic payment card by one transaction and $1,500.

Again, to accomplish these setting changes, appropriate function calls can be made by the purchasing management system 100 to the card processing system 130. For example, with the TSYS processing platform interface discussed above, management and control packets can be used to obtain current velocity settings and to update those settings.

Mary is informed that her request has been approved and that her dynamic payment card has been enabled for a $1,500 purchase. Mary places the order with the supplier and uses her dynamic payment card for payment. The collateral is printed and shipped and Mary's dynamic payment card is charged for $1500.

When the card processor does its processing, the purchasing management system 100 is notified of this transaction and attaches the transaction information to Mary's purchase request for later reconciliation into ACME's accounting system and/or correlates the transaction information with Mary's payment card for future matching and reconciliation activities. The purchasing management system 100 notifies Mary that the transaction was completed and will offer her an HTML hyper-link into the purchasing management system 100 for follow-up actions on this purchase as driven by the company's purchasing policy. For example the company may require that the requester acknowledge receipt of all purchases over $1,000.

Subsequently, this payable item flows into ACME's accounting system via the purchasing management system 100 and when ACME receives their statement from PartnerBank this charge appears and is reconciled.

FIG. 6B also provides example dynamic payment card processing that would occur in the type of transaction discussed in this example for Mary Marketing.

TRANSACTION SCENARIO EXAMPLE 3A—TOM TECHNOLOGY

Tom Technology needs to purchase a new computer system for a newly hired engineer. Tom goes to his Dell Premier Page, which is already set up with his dynamic payment card number from prior purchases, places the order, which totals $2,159 and checks out. Dell performs an authorization on Tom's dynamic payment card and the card processor finds sufficient credit available for Dell's SIC code in slot 1 on Tom's dynamic payment card and that this transaction is within the maximum dollar amount allowed on slot 1. So Dell's authorization succeeds against slot 1 of Tom's dynamic payment card. Dell builds and ships the PC to Tom and captures the finds from Tom's dynamic payment card.

When the card processor does its processing, the purchasing management system 100 is notified of this transaction. Since there is no corresponding purchase request, the purchasing management system 100 synthesizes a purchase request for Tom and attaches the transaction information to the synthesized purchase request for later reconciliation into ACME's accounting system. The purchasing management system 100 will notify Tom that the transaction was completed and will offer him an HTML hyper-link into the purchasing management system 100 to add a justification (if required by the company) and acknowledgement of receipt to that transaction. This e-mail may also inform Tom of his remaining Technology budget for that billing cycle.

Subsequently, this payable item flows into ACME's accounting system via the purchasing management system 100 and when ACME receives their statement from PartnerBank this charge appears and is reconciled.

FIG. 6A also provides example dynamic payment card processing that would occur in the type of transaction discussed in this example for Tom Technology.

TRANSACTION SCENARIO EXAMPLE 3B—TOM TECHNOLOGY

Tom Technology finds a burst water pipe has destroyed a very expensive server in the data center. Tom goes to his Dell Premier Page, which is already set up with his dynamic payment card number from prior purchases, and configures the order, which totals $28,288. Tom knows that his maximum purchase without pre-approval is $5,000. So, Tom creates an Purchase Request in the purchasing management system 100, marks it Urgent and includes the following justification: "Fran, Our Dell server was destroyed by a ruptured water line located just above our data center. I've configured a replacement on the Dell web site and they can have it here in 24 hours. Need your approval to spend the $28,288. Tom."

Because Tom's request is marked Urgent, the purchasing management system 100 can send a text page and/or call to Fran informing her of an urgent request waiting for her in the purchasing management system 100. Fran calls the VP Technology, Donna Development, to see if a new server is the only answer. Donna explains to Fran that without the new server it will be impossible to verify that the guidance systems are working on the new rocket. Fran subsequently approves this request and upon approval the purchasing management system 100 increases the slot 1 velocity and maximum transaction amount on Tom's dynamic payment card to cover the $28,288 purchase.

Again, to accomplish these setting changes, appropriate function calls can be made by the purchasing management system 100 to the card processing system 130. For example, with the TSYS processing platform interface discussed above, management and control packets can be used to obtain current velocity settings and to update those settings.

Tom is informed that his request has been approved and his dynamic payment card has been enabled for a $28,288 purchase. Tom returns to the Dell site and completes the checkout process. Dell builds the server and ships it to Tom. Dell charges Tom's dynamic payment card, which has sufficient velocity and credit available in slot 1. When the card processor does its processing, the purchasing management system 100 is notified of this transaction and attaches the transaction information to Tom's purchase request for later reconciliation into ACME's accounting system and/or correlates the transaction information with Mary's payment card for future matching and reconciliation activities. Upon being notified that this transaction has been completed, the purchasing management system 100 resets the maximum transaction amount on slot 1 of Tom's dynamic payment card to $5,000.

The purchasing management system 100 will notify Tom that the transaction was successful and will offer him an HTML hyper-link into the purchasing management system 100 to acknowledge of receipt of the server. This notification will also inform Tom of his remaining Technology budget for that billing cycle. Subsequently, this, payable item flows into ACME's accounting system via the purchasing management system 100 and when ACME receives their statement from PartnerBank this charge appears and is reconciled. At the end of the billing cycle, the purchasing management system 100 will reset the monthly velocity on slot 1 of Tom's dynamic payment card to $20,000. It is noted that this resetting of payment card control settings may be done at other points in the process as desired.

In addition, a function can be provided by the card processor to allow the purchasing management system 100 to be able to compare the current credit limit on Tom's dynamic payment card with the size of the purchase being made and increase the credit limit accordingly. Because of the risk associated with credit limit modifications, security measures can be set in place to ensure that credit limits are not increased beyond the allowances provided by the card issuer. This credit limit modification allows for more efficient management capabilities.

FIG. 6B also provides example dynamic payment card processing that would occur in the type of transaction discussed in this example for Tom Technology.

TRANSACTION SCENARIO EXAMPLE
4A—SAM SHOPFLOOR

There has been a mechanical failure on the overhead door for the loading dock, causing rockets to back up on the production line. Sam Shopfloor is on call, takes a look at the problem and determines that repair will require a new motor for the belt drive on the door. Sam knows he's got emergency spending capability, so he calls his local Grainger Industrial Supply branch and has them get a motor ready for him at the will-call desk. Sam drives over to the Grainger branch, presents his "emergency" dynamic payment card (the extra card issued to Sam) for payment on the motor, which costs $783.89. Grainger charges Sam's dynamic payment card. Because Grainger's SIC code is covered under slot 1 of Sam's "emergency" card and there is one transaction available via the velocity mechanism the transaction is approved. Sam takes the motor back to the plant and installs it, fixing the door and allowing the rockets to go out that same afternoon.

When the card processor does its processing, the purchasing management system 100 is notified of this transaction. Since there is no corresponding purchase request, the purchasing management system 100 synthesizes a purchase request for Sam and attaches the transaction information to the synthesized purchase request for later reconciliation into ACME's accounting system and/or correlates the transaction information with Mary's payment card for future matching and reconciliation activities. Because of the emergency nature of this purchase, the purchasing management system 100 will notify both Sam and Fran that Sam's card was used in "Emergency" mode for a transaction and will offer Sam an HTML hyper-link into the purchasing management system 100 to add a justification and acknowledgement of receipt to that transaction. This notification will also inform Sam of his remaining emergency budget for that billing cycle. Subsequently, this payable item flows into ACME's accounting system via the purchasing management system 100 and when ACME receives their statement from PartnerBank this charge appears and is reconciled.

FIG. 6A also provides example dynamic payment card processing that would occur in the type of transaction discussed in this example for Sam Shopfloor.

TRANSACTION SCENARIO EXAMPLE
4B—SAM SHOPFLOOR

Sam Shopfloor notices that several of the hoses for the pneumatic tools used on the shop floor are worn and cracking. Sam decides that they probably need to be replaced. Sam goes online to Grainger.com and determines that the replacement hoses are $150.80 each. Sam puts three of these hoses in his cart and proceeds to the checkout page where the Grainger.com site informs him that the total price including tax and shipping will be $498.76. Sam creates a Purchase Request in the purchasing management system 100 and submits it for approval.

Fran has set an approval policy that will auto approve purchases under $500 if there is departmental budget remaining in the appropriate cost center. The purchasing management system 100 determines that there is sufficient headroom in the facilities budget and it is under $500 and auto-approves this purchase. Upon approval of this purchase request, the purchasing management system 100 increases the aggregate velocity on slot 1 of Sam's primary dynamic payment card by one transaction and $498.76.

Again, to accomplish these setting changes, appropriate function calls can be made by the purchasing management system 100 to the card processing system 130. For example, with the TSYS processing platform interface discussed above, management and control packets can be used to obtain current velocity settings and to update those settings.

Sam is informed that his request has been approved and his dynamic payment card has been enabled for a $498.76 purchase. Sam goes back to Grainger.com and finishes checking out with his dynamic payment card. The charge from Grainger is processed against Sam's dynamic payment card and the card processor determines that there is velocity available for this purchase in slot 1 of Sam's primary account. So this transaction succeeds against this account. Grainger fulfills this order and ships it to Sam.

The following evening when the card processor does its processing, the purchasing management system 100 is notified of this transaction and attaches the transaction information to Sam's purchase request for later reconciliation into ACME's accounting system and/or correlates the transaction information with Mary's payment card for future matching and reconciliation activities. The purchasing management system 100 notifies Sam that his card was used for this transaction and will offer him an HTML hyper-link into the purchasing management system 100 for follow-up actions on this purchase as driven by the company's purchasing policy. Subsequently, this payable item flows into ACME's accounting system via the purchasing management system 100 and when ACME receives their statement from PartnerBank this charge appears and is reconciled.

FIG. 6B also provides example dynamic payment card processing that would occur in the type of transaction discussed in this example for Sam Shopfloor.

TRANSACTION SCENARIO EXAMPLE 5A—SALLY SALES

Sally Sales makes a sales call to the Canadian government, who is contemplating using ACME's rockets in their Space program. Sally uses her dynamic payment card for her T&E expenses, including airfare, rental car, hotel, and a business lunch. With each transaction, the card processor checks slot 1 on Sally's card and finds that these T&E merchants are covered by the SIC code range of slot 1 and that there is sufficient available velocity for these transactions.

When the card processor does its processing, the purchasing management system 100 is notified of this transaction and logs these transactions against Sally's dynamic payment card. With each transaction, the available velocity on slot 1 of Sally's dynamic payment card is reduced. By company policy, Sally must justify and reconcile these transactions in order to have the associated headroom reinstated on her dynamic payment card. Sally identifies all of the charges for her Canadian visit, justifies them appropriately and submits for approval via the purchasing management system 100. Upon approval, the purchasing management system 100 reinstates the aggregate velocity available on slot 1 of Sally's dynamic payment card by the appropriate amount.

Again, to accomplish these setting changes, appropriate function calls can be made by the purchasing management system 100 to the card processing system 130. For example, with the TSYS processing platform interface discussed above, management and control packets can be used to obtain current velocity settings and to update those settings. In addition, a function can be provided by the card processor to allow the creation of a diversion account that is associated with the company-billed card and that is nevertheless individually billed. This individual diversion account feature on a company card allows T&E expenses to be diverted to the individually billed diversion account so that the employee would become liable for the T&E charges. This individual liability may be desired by the company and the inclusion of the individual diversion account on the company card would enable users to carry a single piece of plastic that meets their company purchase and T&E purchase needs.

Figure 7A:
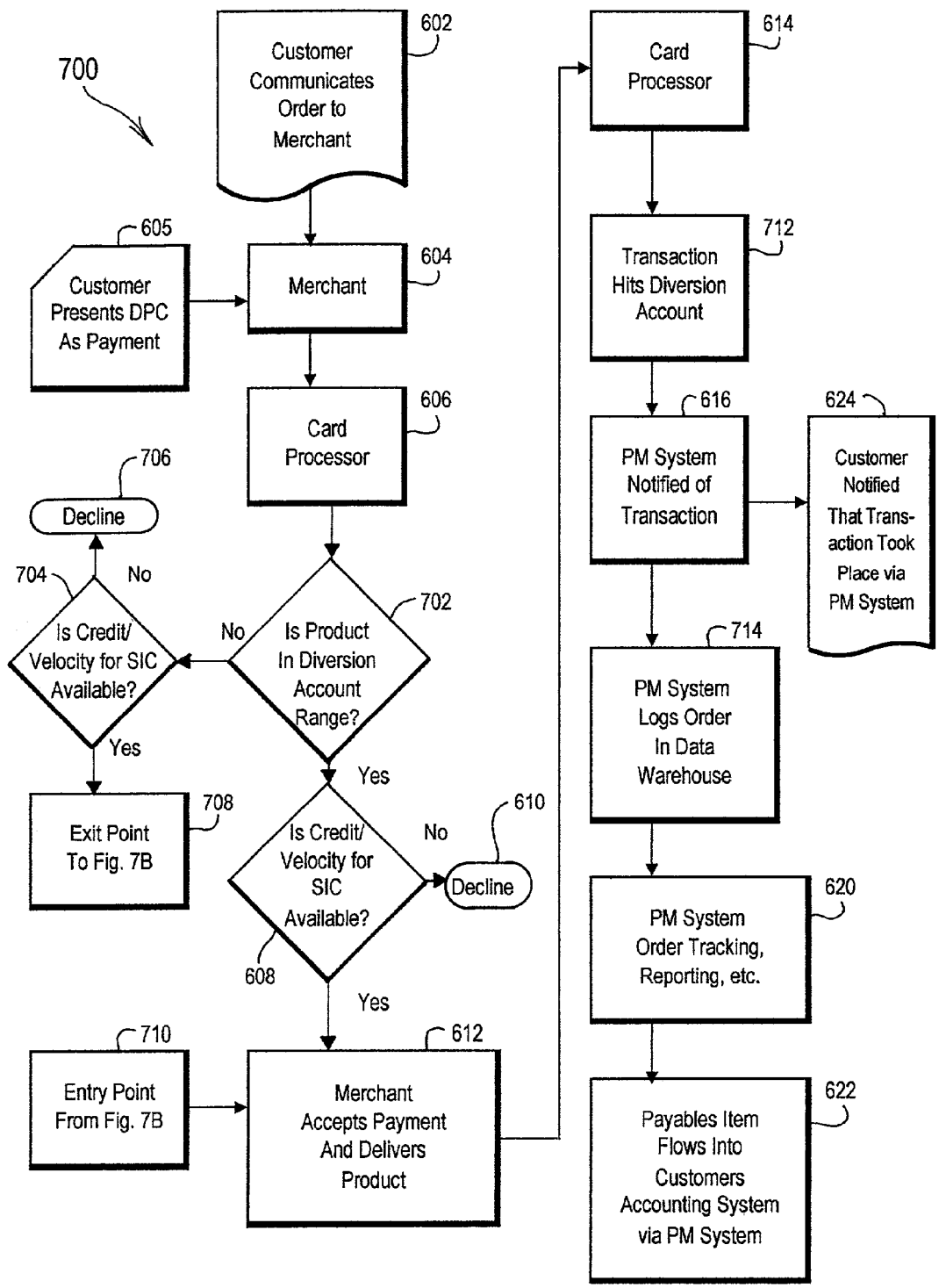
FIGS. 7A and 7B are flow diagrams for dynamic payment card processing where diversion accounts are utilized.
Figure 7B:
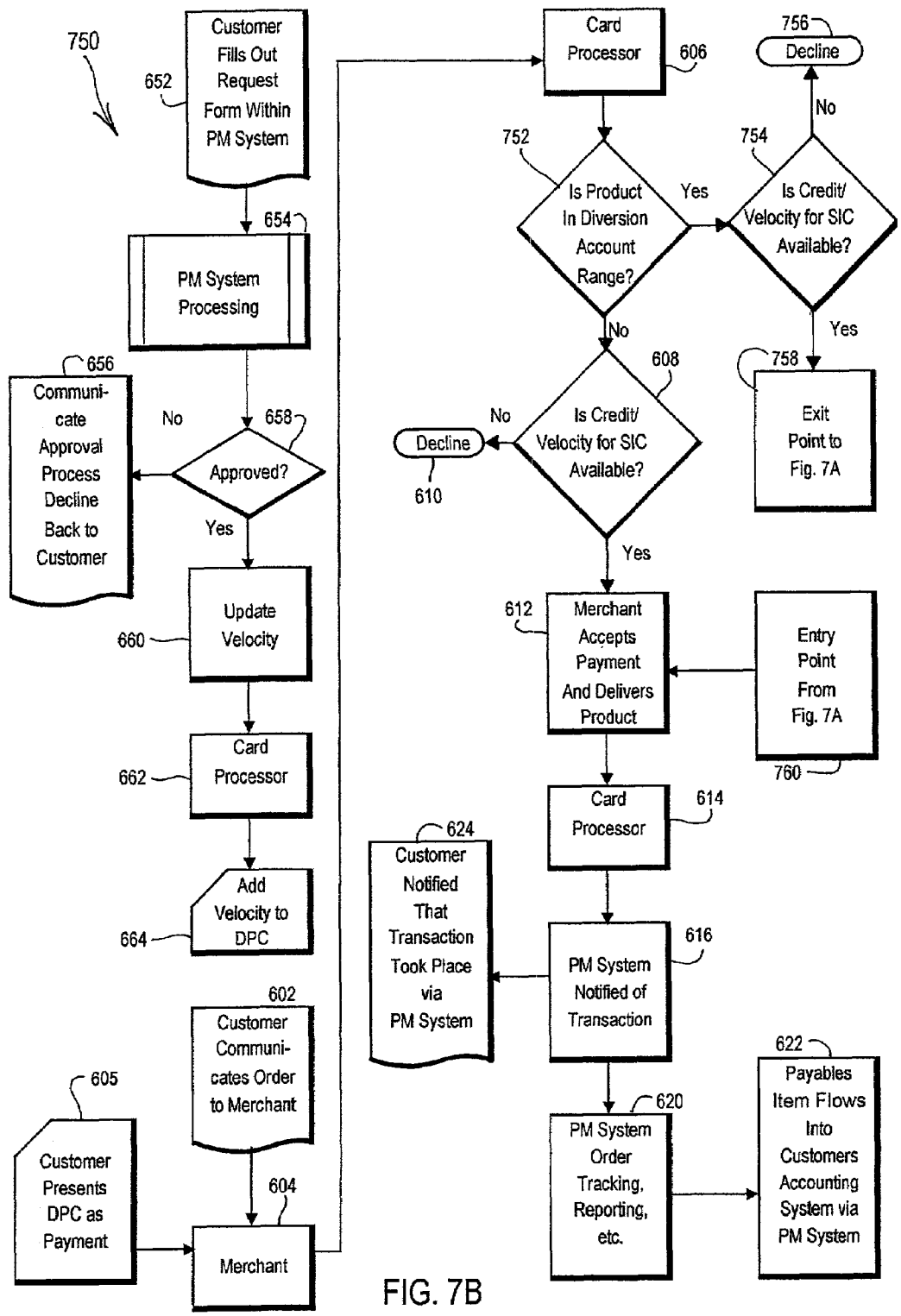

FIGS. 7A and 7B provide graphical depictions further explaining this transaction processing. FIGS. 7A and 7B are flow diagrams 700 and 750 for dynamic payment card processing where diversion accounts are utilized FIGS. 7A and 7B are similar to FIG. 6A in many respects, although block 618 for request/order synthesis has been left out of processing flow 700. As additional processing, there are blocks that allow for a purchase request through the PM system 100 to be the mechanism for handling diversion accounts.

In particular, looking to FIG. 7A, which is similar to FIG. 6A, a decision block 702 is added to determine whether the product being purchased is within a diversion account range. If the answer in block 702 is "no," then processing proceeds to block 704 where the card processor determines if the initiated transaction falls within card parameters, such as credit and velocity settings. If the answer is in block 704 "no," the approval is declined in block 706. If the answer in block 704 is "yes," then process flows continues to block 708 and on to FIG. 7B.

Looking back to decision block 702, if the answer is "yes," then processing proceeds to block 608, and the diversion accounts are utilized. The other additional blocks in this path are block 712, which identifies that the transaction is allocated to the diversion account, and block 714, where the PM system 100 logs the order data to a data warehouse for later use. In addition, block 710 provides an entry point from FIG. 7B.

FIG. 7B, which is similar FIG. 6B, has inserted a decision 752 to determine whether the product being purchased is within a diversion account range. If the answer in block 752 is "no," then processing proceeds to block 608 where the card processor determines if the initiated transaction falls within card parameters, such as credit and velocity settings. If the answer in block 608 is "no," then the approval is declined in block 610. If the answer in block 608 is "yes," then the processing continues on to block 612. It is noted that block 760 provides the entry point for block 708 from FIG. 7A. Because this path from FIG. 7A to FIG. 7B would be for a user of the DPC without first going through the request process, a synthesizing block could be added to the processing as discussed with respect to FIG. 6A.

Looking back to decision block 752, if the answer is "yes," then processing continues to the decision block 754, and the diversion account is utilized. In decision block 754, the initiated transaction is checked against DPC settings, such as credit and velocity. If the transaction falls outside allowed transactions pursuant to those settings, the transaction is declined in block 756. If the transaction falls within allowed transactions, processing flows to FIG. 7A through block 758 to block 710 in FIG. 7A.

TRANSACTION SCENARIO EXAMPLE 5B—SALLY SALES

Sally Sales is planning a regional sales meeting and is getting 20 logo shirts made up for the regional sales team. Sally has contacted an embroidering company and determined that the 20 shirts she wants to get for the sales team for the sales kickoff meeting will cost $375. Sally creates an Purchase Request in the purchasing management system 100 and submits it for approval. This request is validated against the company's purchasing policies and it is determined that she needs approval from the VP of Sales. The VP of Sales is immediately notified that she has a purchase request to approve and approves this purchase. Upon approval of this purchase request, the purchasing management system 100 increases the aggregate velocity on slot 2 of Sally's dynamic payment card by one transaction and $375.

Again, to accomplish these setting changes, appropriate function calls can be made by the purchasing management system 100 to the card processing system 130. For example, with the TSYS processing platform interface discussed above, management and control packets can be used to obtain current velocity settings and to update those settings.

Sally is informed that her request has been approved and her dynamic payment card has been enabled for a $375 purchase. Sally gives the embroidering company the go-ahead. The shirts are embroidered with ACME's logo and delivered to Sally. The embroidering company charges Sally's dynamic payment card and due to the non-T&E SIC code of the embroidering company the charge bypasses Sally's diversion account and ends up succeeding on slot 2 of her dynamic payment card.

When the card processor does its processing, the purchasing management system 100 is notified of this transaction and attaches the transaction information to Sally's purchase request for later reconciliation into ACME's accounting system and/or correlates the transaction information with Mary's payment card for future matching and reconciliation activities. The purchasing management system 100 notifies Sally that her card was used for this transaction and will offer her an HTML hyper-link into the purchasing management system 100 for follow-up actions on this purchase as driven by the company's purchasing policy. Subsequently, this payable item flows into ACME's accounting system via the purchasing management system 100 and when ACME receives their statement from PartnerBank this charge appears and is reconciled.

FIG. 6B also provides example dynamic payment card processing that would occur in the type of transaction discussed in this example for Sally Sales.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for operating a server-based system to provide dynamic management of payment mechanisms, comprising:

receiving at one or more server systems a over an electronic communication path request from within a purchasing entity to make available certain purchasing capabilities to provide pre-approved purchasing authority with respect to a payment mechanism;

communicating, prior to a purchase associated with the payment mechanism, from the one or more server systems to a payment card processing system at a payment card processor to obtain information representing approval parameters associated with the payment mechanism, the payment card processing system being a system that processes transactions initiated using the payment mechanism based upon approval parameters associated with the payment mechanism, the approval parameters being stored by the payment card processing system;

sending from the one or more server systems to the payment card processing system adjustment instructions to adjust the approval parameters for the payment mechanism so that the purchasing capabilities to provide the pre-approved purchasing authority are available prior to the purchase;

receiving at the one or more server systems over the electronic communication path transaction data associated with a transaction completed using the payment mechanism and generating by an automated procedure a synthesized purchase request filled out with the transaction data received from the payment card processing system to be submitted to a purchasing management system for approval according to purchasing policies for the purchasing entity as if the purchase request was submitted prior to the transaction; and sending from the one or more server systems to the payment card processing system adjustment instructions to reset the approval parameters at the card processor after the purchase.

2. The method of claim 1, further comprising processing the synthesized purchase request in the purchasing management system with respect to purchase policies for the purchasing entity and approving the synthesized purchase request if the purchase policies are satisfied.

3. The method of claim 1, wherein a plurality of requests are received with respect to a plurality of payment mechanisms, and wherein a plurality of requests are associated with each payment mechanism.

4. The method of claim 1, wherein the payment mechanism comprises a payment card, wherein the approval parameters comprise control settings for the payment card further comprising at least one of a credit limit, velocity controls and slot controls, and wherein the one or more server systems comprise the purchasing management system.

5. The method of claim 4, wherein at least one intermediate system processes communications between the purchasing management system and the payment card processor.

6. The method of claim 5, wherein the at least one intermediate system comprises a secure proxy system configured to provide process isolation between the purchasing management system and the card processor, to provide one or more security mechanisms for communications between the purchasing management system and the payment card processor, and to process these communications so that they are received in recognized formats.

7. The method of claim 6, wherein the at least one intermediate system further comprises an interface system that provides a communication interface for the card processor, the secure proxy system communicating with the payment card processor through the interface system.

8. The method of claim 4, further comprising associating a plurality of payment cards with the plurality of elements within a purchasing entity, the elements comprising persons, vehicles or buildings.

9. The method of claim 4, further comprising comparing parameters of an attempted purchase transaction with the control settings and authorizing the purchase transaction if the parameters are allowed by the control settings, the comparing and authorizing steps being conducted by the payment card processor.

10. The method of claim 9, wherein the control settings comprise a vendor identity code and a maximum single transaction limit.

11. The method of claim 1, wherein the purchasing policies are configurable through a network interface that provides a plurality of customizable purchasing management rules that reside on the one or more server systems.

12. The method of claim 11, wherein the network interface comprises an interface to the Internet.

13. The method of claim 1, wherein the payment mechanism comprises a dynamic payment identifier.

14. The method of claim 13, wherein the payment mechanism further comprises a payment card having the dynamic payment identifier associated with it.

15. A server-based system for providing dynamic management of payment mechanisms, comprising one or more server systems over an electronic communication path configured to receive a request from within a purchasing entity to make available certain purchasing capabilities to provide pre-approved purchasing authority with respect to a payment mechanism; to communicate, prior to a purchase associated with the payment mechanism, with a payment card processing system at a payment card processor to obtain information representing approval parameters associated with the payment mechanism that are stored and used by the payment card processing system to process transactions initiated using the payment mechanism based upon the approval parameters associated with the payment mechanism, to send to the payment card processing system adjustment instructions to adjust the approval parameters for the payment mechanism so that the purchasing capabilities to provide the pre-approved purchasing authority are available prior to the purchase, to receive at the one or more server system over the electronic communication path transaction data associated with a transaction completed using the payment mechanism and generate by an automated procedure a synthesized purchase request filled out with the transaction data received from the payment card processing system to be submitted to a purchasing management system for approval according to purchasing policies for the purchasing entity as if the purchase request was submitted prior to the transaction, and to send to the payment card processing system adjustment instructions to reset the approval parameters at the card processor after the purchase.

16. The server-based system of claim 15, wherein the one or more server systems is further configured to send adjustment instructions to adjust the approval parameters to restore the pre-approved purchasing authority based upon an occurrence of one or more selected events after completion of the transaction.

17. The server-based system of claim 15, wherein a plurality of requests are received with respect to a plurality of payment mechanisms, and wherein a plurality of requests are associated with each payment mechanism.

18. The server-based system of claim 15, wherein the payment mechanism comprises payment cards, wherein the approval parameters comprise control settings further comprising at least one of a credit limit, velocity controls and slot controls for the payment card, and wherein the one or more server systems comprise a purchasing management system.

19. The server-based system of claim 18, wherein at least one intermediate system processes communications between the purchasing management system and the payment card processor.

20. The server-based system of claim 19, wherein the at least one intermediate system comprises a secure proxy system configured to provide process isolation between the purchasing management system and the payment card processor, to provide one or more security mechanisms for communications between the purchasing management system and the card processor, and to process these communications so that they are received in recognized formats.

21. The server-based system of claim 20, wherein the at least one intermediate system further comprises an interface system that provides a communication interface for the payment card processor, the secure proxy system communicating with the payment card processor through the interface system.

22. The server-based system of claim 18, further comprising associating a plurality of payment cards with the plurality of elements within the purchasing entity.

23. The server-based system of claim 18, wherein the payment card processing system is further configured to compare parameters of an attempted purchase transaction with the control settings and to authorize the purchase transaction if the parameters are allowed by the control settings.

24. The server-based system of claim 23, wherein a vendor communicates the parameters of the attempted purchase transaction to the payment card processing system for authorization.

25. The server-based system of claim 23, wherein the control settings comprise a vendor identity code and a maximum single transaction limit.

26. The server-based system of claim 15, wherein the purchasing policies are configurable through a network interface that provides a plurality of customizable purchasing management rules that reside on one or more server systems.

27. The server-based system of claim 26, wherein the network comprises the Internet.

28. The server-based system of claim 15, wherein the payment mechanism comprises a dynamic payment identifier.

29. The server-based system of claim 28, wherein the payment mechanism further comprises a payment card having the dynamic payment identifier is associated with it.

* * * * *